United States Patent
Suda et al.

[19]
[11] Patent Number: 5,957,520
[45] Date of Patent: Sep. 28, 1999

[54] INFORMATION PROCESSING SYSTEM FOR COMPLETING OR RESOLVING AMBIGUITY OF INPUT INFORMATION AND METHOD THEREFOR

[75] Inventors: Aruna Rohra Suda; Suresh Jeyachandran, both of Yokohama, Japan

[73] Assignee: Canon Kabushiki Kaisha, Tokyo, Japan

[21] Appl. No.: 08/579,582

[22] Filed: Dec. 28, 1995

[30] Foreign Application Priority Data

Dec. 28, 1994 [JP] Japan .................................. 6-327499
Dec. 28, 1994 [JP] Japan .................................. 6-328393

[51] Int. Cl.$^6$ ..................................................... G06F 15/18

[52] U.S. Cl. ............................... 295/706; 706/54; 706/61

[58] Field of Search ........................... 364/419; 395/600, 395/310–11, 50–51, 60–61, 77, 54, 900

[56] References Cited

U.S. PATENT DOCUMENTS

| | | | |
|---|---|---|---|
| 5,151,857 | 9/1992 | Matsui | 364/419 |
| 5,329,609 | 7/1994 | Sanada et al. | 395/2.6 |
| 5,404,506 | 4/1995 | Fujisawa et al. | 395/600 |

*Primary Examiner*—Tariq R. Hafiz
*Attorney, Agent, or Firm*—Fitzpatrick, Cella, Harper & Scinto

[57] ABSTRACT

Incomplete and fuzzy portions in input information are detected by making a reference to world knowledge and knowledge of a specific field in a knowledge base prior to understanding the input information indicating a concept. The detected incomplete portion is completed and the detected fuzzy portion is resolved. The knowledge base makes a reference to knowledge of other concepts when the value of an instructed attribute of a specific concept is acquired. Moreover, a concept common to and upper than a plurality of concepts can be determined so that another word, concept or meaning is searched for from one word, concept or meaning.

17 Claims, 88 Drawing Sheets

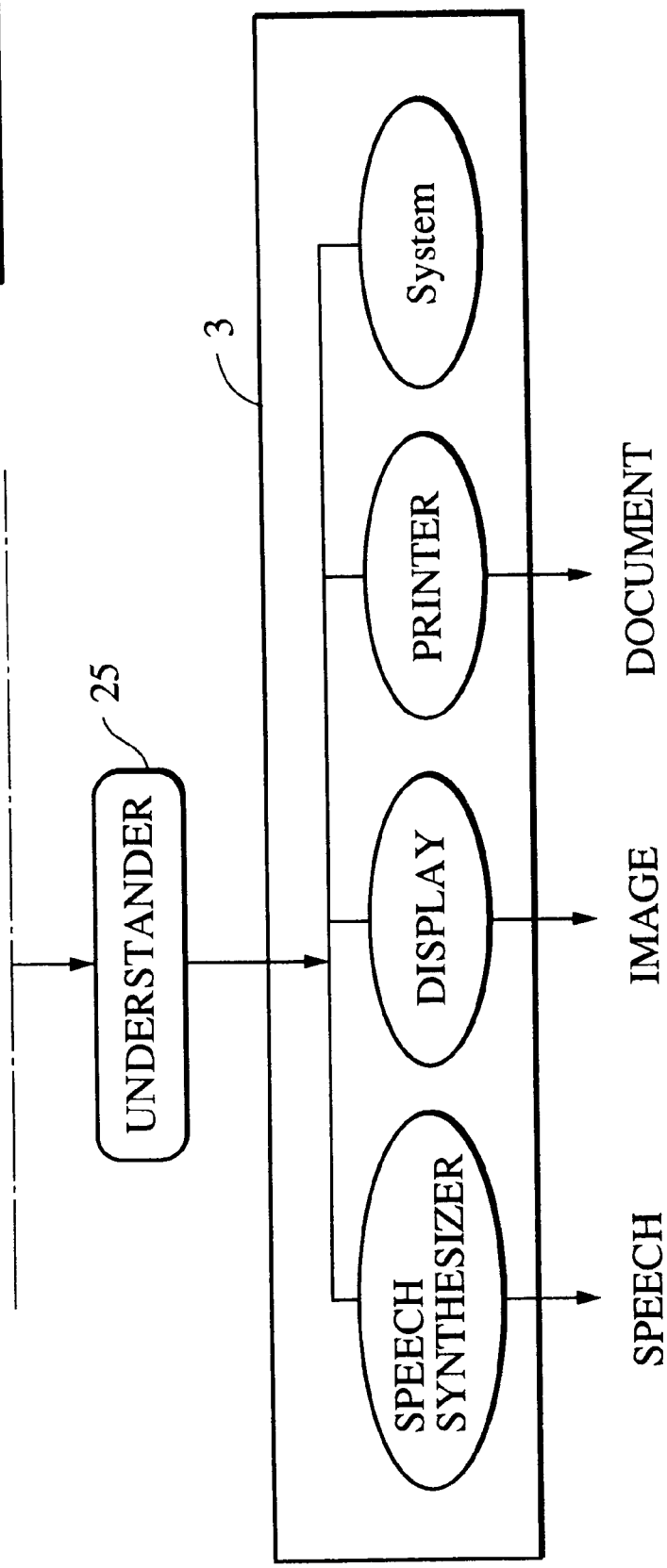

FIG. 9

Rules for Completion of Time Concept

If Time to be filled is in Future and the lowest specified slot has a value less than or equal to the value of corresponding slot in current time
then the filler of the next slot is "one greater" / "next"
    (e.g., next of month 'Dec' is 'Jan' & also the year is + 1)
    that of the filler of the time (from which it is being inferred)
    and copy rest of the higher slots from current time
else then copy all the higher slots from current time If Time to be filled is in Past and the lowest specified slot has a value less than or equal to the value of corresponding slot in current time
then the filler of the slot is "one lesser" / "previous"
    (e.g., previous of day '1st Feb' is 'S1st' & also the month is - 1 i.e., Jan)
    that of the filler of the time (from which it is being inferred)
    and copy rest of the higher slots from current time
else then copy all the higher slots from current time o o o Rules for Completion of Time Verification 1. If the Action is related to 'Work' & is in Buslness Environment
  then Check to see if it not on a Holiday (e.g., Natlonal holiday.
                           weekly holiday in Arab countries is Friday)
    If so, conflrm with user.

2. If the Action is in Future and the time is in Past
  then (a) Check if it is during year - end / year - beginning
          (e.g., people often use previous year absent mindedly
           in the year - beginning)
      (b) Check if it is a possible mistake in the Tense
          (e.g., non native speakers of langauge often make mistake in
          tense usage)

3. If the Action is in Past and the time is in Future
  then
      (a) Check if it is a possible mistake in the Tense o o o (a) Physical Objects (b) Abstract Entities (c) Space (Place)

(d) Time (Events)

(e) Driving Forces (e.g., Themes, Goals - Plans, MOPS, Scenes)

(f) Results of Driving Forces or Actions (g) Results of Actions or State Descriptors

FIG. 11

PHYSICAL OBJECT :

S1 <Name>
S2 <Function>
S3 <Abstract value>
S4 <Associated Abstract Entity>
S5 <Properties - (Countable, qualifiable by Adjectives, consummable resource, destructible... )>
S6 <Weight>
S7 <Dimensions>
...

FIG. 13 a1) Unit
- authors who are Persons
- published
- year _ published
- publisher (Organization)
- price (Money)

a2) Subcategories of Unit
. Paper
. Manuscript
. Book
. Article b1) Collection
- authors who are Persons
- published
- publisher (Organization)
- periodicity
- issue number b2) Subcategories of Collection
. Journal
. Magazine
. Document c) Personal _ documents
- sender who is a Person / Organization
- receiver who is a Person / Organization
- mode
- sending date
- received date d) Official _ documents
- issued by
- issued to
- issued ar
- issued date
- valid till e) Public _ documents
- source
- medium
- when

FIG. 14A

PERSON :

| | |
|---|---|
| S1 | <Name (First Name Middle name Surname)> |
| S2 | <Age which is Number> |
| S3 | <Telephone Number> |
| S4 | <Date of Birth which is TIME> |
| S5 | <Address which is VENUE> |
| S6 | <Social Level> |
| S7 | <Belongs to which is ORGANIZATION> |
| S8 | <Performing which isWORK> |
| S9 | <Function which is Designation> |
| S10 | <Hobbies / Area of Interests> |
| S11 | <Parents which are of type Persons> |
| S12 | <Childern which are of type Persons> |
| S13 | <Martial status> |
| S14 | <Male / Female> |

FIG. 14B

Example of Person :

| | |
|---|---|
| S1 | (Kono Gitaro) |
| S2 | 38 |
| S3 | (+81-44-549-5454) |
| S4 | (5 Oct 1847) |
| S5 | (Yokohama, Nishi-Ku, Hiranuma2-4-7) |
| S6 | 4 |
| S7 | (Canon R & D Headquarters) |
| S8 | (Compiter Design) |
| S9 | Senior Engineer |

FIG. 16

ABSTRACT ENTITY :

- S1    ⟨Name⟩
- S2    ⟨Function⟩
- S3    ⟨belongs to⟩
- S4    ⟨Associated Physical Object⟩
- S5    ⟨Properties - (Uncountable, qualifiable by Adjectives, consummable resource, Indestructible, controllable...)⟩
- S6    ⟨Contents⟩
- S7    ⟨Dimensions⟩
- ...

FIG. 17

Work Domain

- domain (set of Knowledge Domains)
- phase of work (like development ...)
- name (of the project)
- methodology (based on X's theories ...)
- since (time)
- estimated duration
- working group (of type Orgn)

FIG. 18A

ORGANIZATION :

| | |
|---|---|
| S1 | <Name> |
| S2 | <Belongs to Higher parent Organization> |
| S3 | <Owns Suborganization (s)> |
| S4 | <Orgn Type> |
| S5 | <Work Type> |
| S6 | <Work Domain> |
| S7 | <Address which is VENUE> |
| S8 | <has a Nominal head> |
| S9 | <has a Representative head> |
| S10 | <Phone Number> |
| S11 | <Fax Number> |
| S12 | <number of Persons working> |
| ... | |

FIG. 18B

Example of Organization :

| | |
|---|---|
| S1 | Canon R & D Headquarters |
| S2 | (Canon Inc) |
| S3 | (A & B Center, C & C Center, D & D Center) |
| S4 | Private |
| S5 | R & D |
| S6 | (Optice) |
| S7 | (Tokyo, Ohta-Ku, Shimomaruko 3-30-2) |
| S8 | Senior General Manager |
| S9 | Senior General Manager |
| S10 | (+81-03-3871-2111) |
| S11 | (+81-03-3971-3701) |
| S12 | 2822 |
| ... | |

FIG. 19A

KNOWLEDGE DOMAIN :
- S1      <Name>
- S2      <Owns Knowledge Domain>
- S3      <Belongs to Knowledge Domain>
- S4      <Books>
- S5      <Journale>
- S6      <Leading Research of Type Univ / Orgn.>
...

FIG. 19B

Example

- S1      Natural Language Processing
- S2      (Generation Parsing Understanding ...)
- S3      (Artificial Intelligence, Linguistics,...)
- S4      (...)
- S5      (AI Magazine, Cognitive Science,...)
- S6      ...
...

FIG. 22A

PLACE :

| | |
|---|---|
| S1 | <Name> |
| S2 | <Owns Places> |
| S3 | <Belongs to Places> |
| S4 | <has Population> |
| S5 | <has Persons> |
| S6 | <occupies Area> |
| S7 | <Located at> |

FIG. 22B

COUNTRY :

| | |
|---|---|
| S1 | <Name> |
| S2 | <State> ⌈Owns⌋ |
| S3 | <Continent> ⌈Belongs to⌋ |
| S4 | <hes Population> |
| S5 | <has Persons> |
| S6 | <occupies Area> |
| S7 | <Located at> |
| S8 | <Capital which is City> |

FIG. 22C

Example of Country :

| | |
|---|---|
| S1 | Japan |
| S2 | Tokyo, Osaka, Kanagawa, Hokkaido,... |
| S3 | Asia |
| S4 | (150 million) |
| S5 | ... |
| S6 | ... |
| S7 | ... |
| S8 | Tokyo |

FIG. 23

Venue
- name
- building name
- address
- city
- state
- region
- country
- subcontinent
- continent

FIG. 25

UNIT TIME :

S1        <Owns Unit Time>
    S2        <Belongs to Unit Time>
    S3        <Count>
    S4        <Qualifier>

TIME :

S1        <has Second>
    S2        <has Minute>
    S3        <has Hour>
    S4        <has Day>
    S5        <has Day part>
    S6        <has Week>
    S7        <has Week part>
    S8        <has Month>
    S9        <has Month part>
    S10      <has Year>
    S11      <has Year part>
    S12      <has related event>

FIG. 26 a1) Events :
- Name
- Starting time
- Ending time
- Venue
- Description
- Ser of Associated Events a2) Subcategories of Events Natural Events (e.g. floods, monsoons etc.)

Intentional (organized by animate objects
e.g. party, conference, meeting etc.)

b) Intentional

* Participatory Event (e.g., Training Program)
* Auditory Event (e.g., Conference)
* Visual Event (e.g., Domonstration, Exhibition, Show)
* Meet Event (e.g., Reception, Meeting)
* Ptrans Event (e.g., Flight)

Themes
    Mental Existence (e.g., Work for Existence, Get Reward)
    Physical Existence
        - Get _ Resource (like Money, Food) - Work
    Social Existence
        - preserve relationship
        - preserve professional status
    Recreational
        - sight seeing FIG. 28
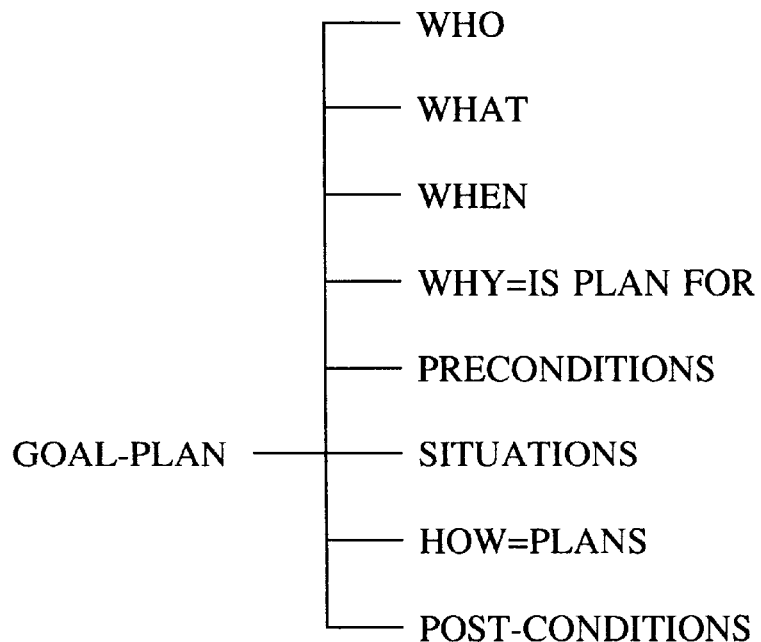
Example :
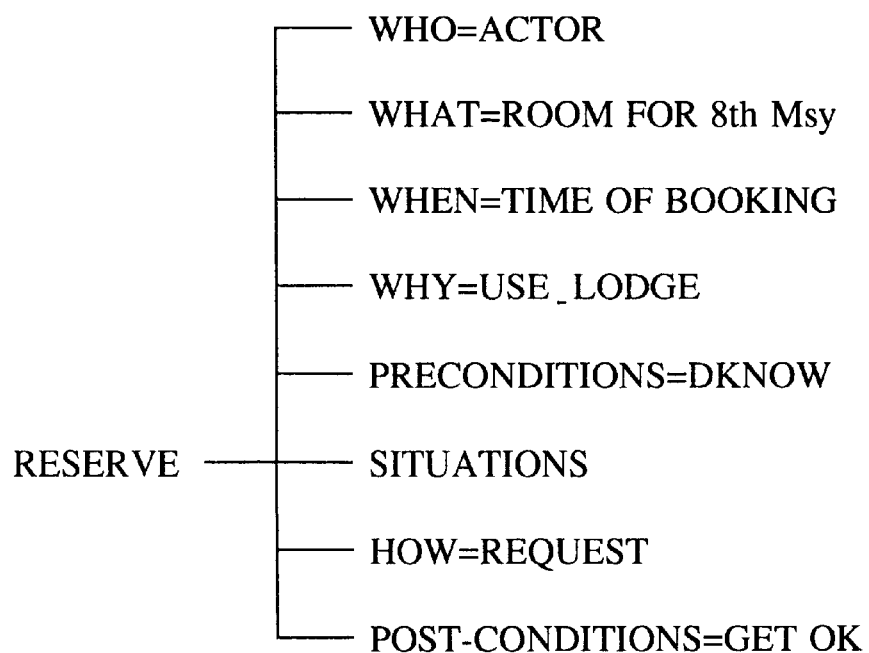

FIG. 29
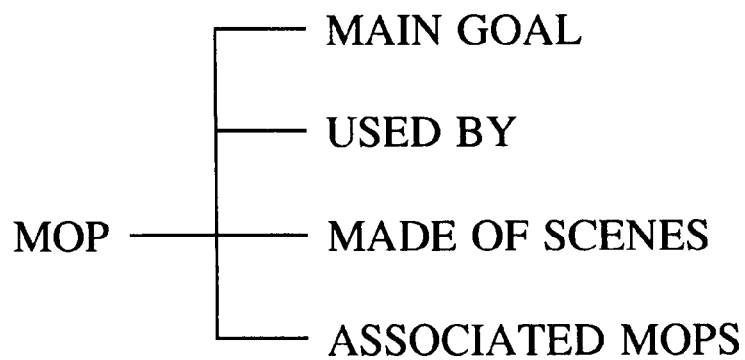
Example:
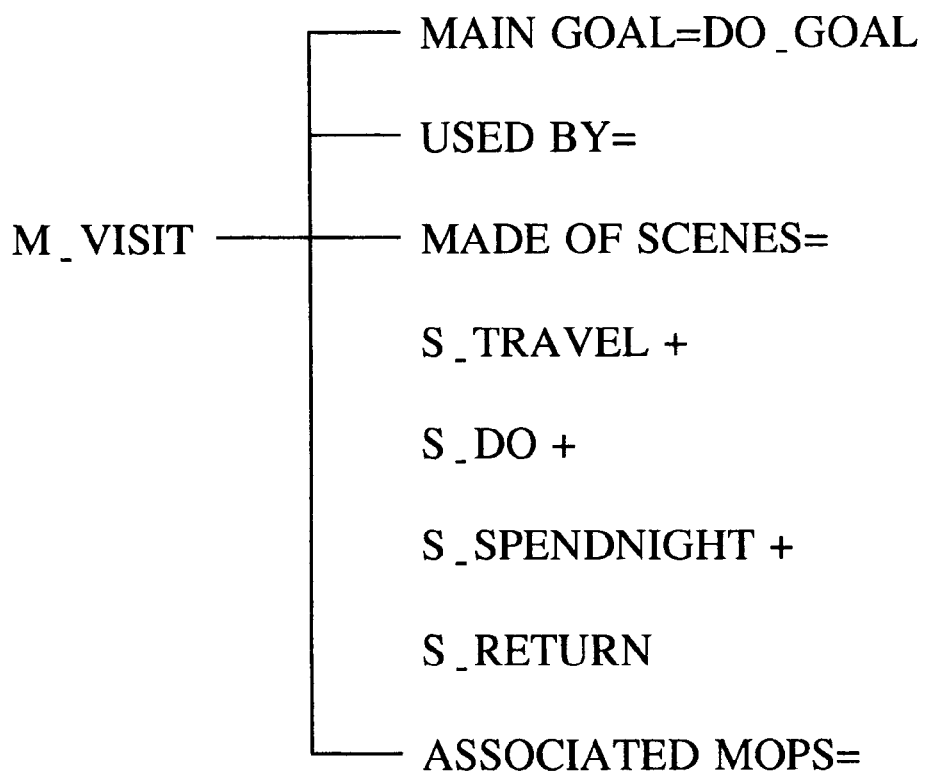

FIG. 30
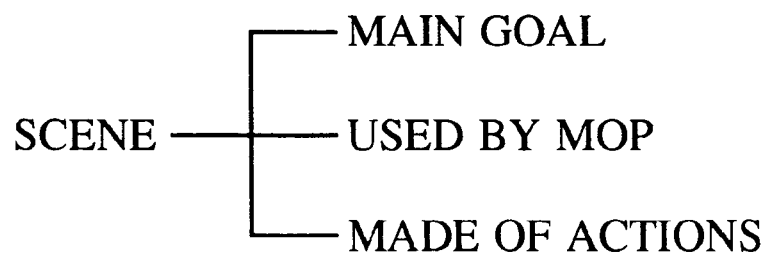
Example :
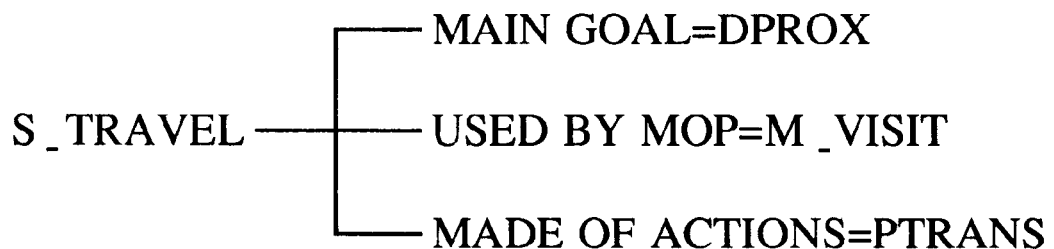

FIG. 32

| E.g., Domain | R&D | Sales |
|---|---|---|
| | M_KEEP_ABREAST | |
| S_PREP | decide area | decide broad area |
| S_DO | read/discuss | market survey/discuss |
| S_POST | summarize | report |
| | M_DO_WORK | |
| S_PREP | choose theory | choose product |
| S_DO | modify/experiment | sell |
| S_POST | integrate results | make profit |
| | M_GET_EVALUATED | |
| S_PREP | choose technique | choose feedback method |
| S_DO | present/publish | consumer feedback |
| S_POST | integrate feedback | improve product |

FIG. 34

ACTION / Results of Driving Forces

| SLOTNAME | |
|---|---|
| Actor | ⟨Person / Animate who is the agent⟩ |
| Object | ⟨which is the object of Action⟩ |
| Instrument | ⟨which is instrumental to Action / including procedures⟩ |
| Iobject - Beneficiary | ⟨Person who benefits⟩ |
| - Reason | ⟨which is an Action⟩ |
| - Direction | ⟨which can be Place or Person⟩ |
| - Via | ⟨which can be Place or Person⟩ |
| From | ⟨which can be Place or Person⟩ |
| Support | ⟨which can be Place or Organization⟩ |
| Time | ⟨which is Time⟩ |
| Connected To | |
| Tense / Modal | |
| Qualifier | |
| o o o | o o o |

FIG. 35

| | |
|---|---|
| AGREEMENT | (e.g. accept, decline, book, reservo, hire, find time, fix appointment) |
| ARRANGE | (e.g., arrange, hold) |
| ATRANS | (e,g. borrow, buy, lend, give) |
| CONNECT-ACTION | (e.g., apply, based, involve, use, imply, prove, accompany) |
| DRIVE | (e.g, drive, fly, grasp, push) |
| FALL | (e.g., blow, fall, move, rain) |
| GROW | (e.g., age, crack, dry, grow, wither) |
| HAPPEN | (e.g., happen, occur) |
| KNEADING | (e.g., kneading, crush) |
| MACT | (mental actions e.g. display, show, exhibit, demonstrate, teach, lecture, publish) |
| MBUILD | (mental buildups e.g. decide, desing, figure out, note, plan, remember) |
| MEET | (e.g., meet, visit, see, receive, pick up, drop) |
| MFEEL | (feelings e.g. thank, accept, appreciate, reward, trouble, apologize, praise, feel) |
| MPROC | (mental processes e.g. think, learm, understand, remind, remember, image, wonder visualize) |
| MSENSE | (senses e.g. see, learn, listen, hear, attend, read, enjoy, attend, perceive) |
| MTRANS | (mental transfers e.g. inform, express, extend, advise, communicate, get/give, have, convey, discuss, suggest, tell, send/receive, interact, phone, write, say, call, learn, question, query, answer, instruct, contact, verify, modify, beg, urge, congratulate, acknowledge) |
| PACT | (physical actions e.g. write, perform, check in, dance, sing) |
| PERMIT-ACTION | (e.g., allow, enable, let, try) |
| PROBABLE-ACTION | (e.g., appear, look, seem, suggest, indicate) |
| PTRANS | (physical transfers e.g. go, bring, come, forward, mail, returm, send/receive, arrive, reach, return, leave, depart, deliver, dispatch, route, tour) |
| SUBMIT | (e.g., submit) |
| TPASSAGE | (e.g. wait) |
| USE RESOURCE | (e.g., stay, waste, spend) |
| WORK | (e.g., design, develop, research, study, work) |

FIG. 36

MEET

| SLOTNAME | |
|---|---|
| Actor | ⟨Person / Animate who is the agent⟩ |
| Object | ⟨Person who is the object ⟩ |
| Instrument | |
| Iobject - Beneficiary | ⟨Person who benefits⟩ |
| - Reason | ⟨which is an Action⟩ |
| - Direction | nil |
| - Via | nil |
| From | |
| Support | ⟨which can be Place or Organization ⟩ |
| Time | ⟨which is Time⟩ |
| Connected To | |
| Tense / Modal | |
| Qualifier | |
| o o o | o o o |

FIG. 37

MEET

| SLOTNAME | |
|---|---|
| Actor | PERSON |
| Object | PERSON |
| Instrument | |
| Iobject - Beneficiary | PERSON |
|     - Reason | ACTION |
|     - Direction | nil |
|     - Via | nil |
| From | PLACE / ORGANIZATION |
| Support | TIME |
| Time | |
| Connected To | |
| Tense / Modal | |
| Qualifier | | o o o

FIG. 38

AGREEMENT

| SLOTNAME | |
|---|---|
| Actor | ⟨Person / Animate who is the agent⟩ |
| Object | ⟨which can be Accommodation / Ticket···⟩ |
| Instrument | ⟨which is instrumental to Action / Communication⟩ |
| Iobject - Beneficiary | ⟨Person who benefits⟩ |
| - Reason | ⟨which is an Action⟩ |
| - Direction | |
| - Via | ⟨which can be Person⟩ |
| From | |
| Support | |
| Time | ⟨which is Time⟩ |
| Connected To | |
| Tense / Modal | |
| Qualifier | |
| ∘ ∘ ∘ | ∘ ∘ ∘ |

FIG. 40

PTRANS

| SLOTNAME | |
|---|---|
| Actor | ⟨Person / Animate who is the agent⟩ |
| Object | |
| Instrument | ⟨which is instrumental to Action / including procedures⟩ |
| Iobject - Beneficiary | ⟨Person who benefits⟩ |
| - Reason | ⟨which is an Action⟩ |
| - Direction | ⟨which can be Place or Person⟩ |
| - Via | ⟨which can be Place or Person⟩ |
| From | ⟨which can be Place or Person⟩ |
| Support | ⟨which can be Place or Organization⟩ |
| Time | ⟨which is Time⟩ |
| Connected To | |
| Tense / Modal | |
| Qualifier | |
| o o o | o o o |

FIG. 41

PTRANS

SLOTNAME

| | |
|---|---|
| Actor | PERSON |
| Object | |
| Instrument | ACTION / VEHICLE |
| Iobject - Beneficiary | PERSON |
|        - Reason | ACTION |
|        - Direction | PERSON / PLACE |
|        - Via | PERSON / PLACE |
| From | PERSON / PLACE |
| Support | PLACE / ORGANIZATION |
| Time | TIME |
| Connected To | |
| Tense / Modal | |
| Qualifier | | o o o

PTRANS

SLOTNAME

| | |
|---|---|
| Actor | PERSON |
| Object | |
| Instrument | ACTION / VEHICLE |
| Iobject - Beneficiary | PERSON |
|        - Reason | ACTION |
|        - Direction | Vicinity of Listener's Location |
|        - Via | PERSON / PLACE |
| From | PERSON / PLACE |
| Support | PLACE / ORGANIZATION |
| Time | TIME |
| Connected To | |
| Tense / Modal | |
| Qualifier | | o o o

FIG. 42

| FORCE | DRIVEN OBJ | CHANGE | ACTION |
|---|---|---|---|
| Natural | Phy. obj. | Spetial | FALL (e.g., fall, move, rain, blow) |
| Natural | Phy. obj. | Temporal | GROW (e.g., dry, grow, age, wither, crack) |
| Natural | Human | State of Human | HAPPEN (e.g. happen, occur) |
| Natural | Nil | State of time | TPASSAGE (pass time) |
| Int. pay. | Phy. obj. | State of Resource (money, energy) | TPASSAGE (spend) |
| Int. mech. | Phy. obj. | Spatial | DRIVE (push, drive, fly, graep) |
| Int. mech. | Phy. obj. | Temporal | KNEADING |
| Int. pay. | Animate | Spatial | PTRANS (go, come) |
| Int. pay. | Animate | State of Obj/ Associated abs. entity | MSENSE |
| Int. pay. | Human | State of Associated abs. entity | MPROC, MBUILD MACT, MFEEL, |
| Int. pay. | Human, Phy. obj. | State of Phy. obj. | PACT (perform) |
| Int. pay. | Human-1, Human-2. | State of human-2. | MTRNS, AGREEMENT |

FIG. 50B (a) Q : Is Ajanta near Bombay ?
    A : Yes, they are in the same state - Maharashtra. It takes about 45min by fight...
(b) Q : Is Ajanta in West India ?
    A : Yes, it is in state - Maharashtra. It 45 minutes flight from Bombay...
(c) Q : Is Shinjuku in Japan ?
    A : Yes
(d) Q : Where is Shinjuku ?
    A : It is a Ward in Tokyo Metropolitan, in Japan.
(e) Q : Is Shinjuku a Ciry in Japan ?
    A : No, It is a Ward in Tokyo.

FIG. 55A

| Word | Word-tag | Form (other properties) |
|---|---|---|
| come | come1 | BASEFORM |
| comes | come1 | PRESTFORM |
| coming | come1 | PROGFORM |
| came | come1 | PASTFORM |
| go | go1 | BASEFORM |
| goes | go1 | PRESTFORM |
| going | go1 | PROGFORM |
| went | go1 | PASTFORM |
| gone | go1 | PARTFORM |
| book | book2 | BASEFORM |
| books | book2 | PRESTFORM |
| booking | book2 | PROGFORM |
| booked | book2 | PASTFORM |
| sent | send1 | BASEFORM |
| send | send1 | PASTFORM |
| get | get1 | BASEFORM |
| got | get1 | PASTFORM |
| get | get2 | BASEFORM |
| got | get2 | PASTFORM |
| get | get3 | BASEFORM |
| got | get3 | PASTFORM |
| reserve | reserve1 | BASEFORM |
| reserved | reserve2 | PASTFORM |
| work | work1 | BASEFORM |
| accept | accept1 | BASEFORM |
| agree | agree1 | BASEFORM |
| decline | decline1 | BASEFORM |
| discuss | discuss1 | BASEFORM |
| inform | inform1 | BASEFORM |
| travel | travel1 | BASEFORM |
| travelling | travel1 | PROGFORM-British |
| traveling | travel1 | PROGFORM-US |
| analyse | analyse1 | BASEFORM-British |
| analyze | analyse1 | BASEFORM-US |
| meet | meet1 | BASEFORM |
| visit | visit1 | BASEFORM |
| visit | visit2 | BASEFORM |
| ... | ... | ... |

FIG. 55

| | FIG. 55A |
|---|---|
| FIG. 55B | FIG. 55B |

| | | |
|---|---|---|
| book | book1 | SINGULAR |
| books | book1 | PLURAL |
| pen | pen1 | SINGULAR |
| pens | pen1 | PLURAL |
| pencil | pencil1 | SINGULAR |
| bencils | pencil1 | PLURAL |
| letter | letter1 | SINGULAR |
| letters | letter1 | PLURAL |
| ... | ... | ... |
| some | some1 | |
| every | every1 | |
| ... | ... | ... |
| i | i1 | SUBJECTIVE |
| me | i1 | OBJECTIVE |
| my | i1 | POSS_REL |
| mine | i1 | POSS_OBJ_REL |
| you | you1 | OBJECTIVE, SECOND PERSON |
| ... | ... | |

FIG. 56 e.g. go     BASEFORM
     went    PASTFORM
     gone    PARTFORM
   *goes    PRESENTFORM
   *going   PROGFORM

[* - Forms generated by rules
   Example rules are :
   a) if (BASEFORM ends in 'e' but not 'ee') then
       BASEFPRM - 'e' + 'ing' = PROGFORM
     else BASEFORM + 'ing' = PROGFORM
   b) if (BASEFORM ends in 'o' or 's' etc.)
     then BASEFORM + 'es' = PRESENTFORM
     else BASEFORM + 's' = PRESENTFORM
     (where to put this, what about nouns etc.··· → separate rule base ? )
]

FIG. 57

| Wordtag | category | | Position Information | Rules | Nounform |
|---|---|---|---|---|---|
| come1 | verb | | wform, *Iobj_direc, *From, *Iobj_reason, *Instrument, *Time | | |
| go1 | verb | | wform, *Iobj_direc, *From, *Iobj_reason, *Instrument, *Time | focus (Object) | |
| send1 | verb | | wform, Object, *Iobj_benf, *from, *Iobj_via, *Instrument, *Iobj_reason | focus (Iobj) | |
| get1 | verb | | wform, Iobj_benf, Object, *Iobj_via, *from, *Instrument, *Iobj_reason | | |
| get2 | verb | | wform, Object, *From, *Instrument, *Time | | |
| get3 | verb | | wform, Object, *From, *Instrument, *Time | | |
| book2 | verb | | wform, Object, *From, *Instrument, *Time | | |
| reserve1 | verb | | wform, Object, *From, *Instrument, *Time | | |
| accept1 | verb | | wform, Object, *Iobj_benf, *Iobj_reason, *Time | | |
| agree1 | verb | | wform, Object, *Iobj_benf, *Iobj_reason, *Time | | |
| decline1 | verb | | ... | | |
| inform1 | verb | | ... | | |
| discuss1 | verb | | wform, *Object, *Instrument, *support, *Iobj_reason, *Time | | discussion |
| work1 | verb | | wform, Iobj_benf, *Object, *Instrument, *Support, *Time | | |
| meet1 | verb | | wform, *Object, *Instrument, *Support, *Time | | |
| visit1 | verb | | wform, *Object, *Support, *Iobj_reason, *Support, *Time | | |
| visit2 | verb | | wform, Object, *Iobj_reason, *Support, *Time | | |
| accommodate1 | verb | | wform, *Object, *Suppor, *Time1 | | accommodation |
| book1 | noun | Countable, Neuter, Common_Noun | wform, *Object, *Suppor, *Time | | |
| | | | wform, *Object, *Time | | |
| | | | name, wform, *contains | | |
| | | | name, wform, *contains, *authors | authors = NIL | |
| pen1 | noun | Countable, Neuter, Common_Noun | | | |
| pencil1 | noun | Countable, Neuter, Common_Noun | | | |
| workdomain1 | noun | UnCountable, Neuter | | | |
| letter1 | noun | Countable, Neuter, Common_Noun | wform, *Methodology, *Since | | |
| i1 | pronoun | First_Person, Singular, Common | | | |
| we1 | pronoun | First_Person, Plural, Common | | | |
| you1 | pronoun | Second_Person, Singular, Common | | | |
| he1 | pronoun | Third_Person, Singular, Masc | | | |
| she1 | pronoun | Third_Person, Singular, Fem | | | |
| it1 | pronoun | Third_Person, Singular, Neuter | | | |
| ... | | | | | |

FIG. 58

| word-tag | Concept & Conditions |
|---|---|
| come1 | PTRANS (Object-Nil, Iobj_direc-Vicinity of Listener's location, Instrument-Vehicle) [or] |
| go1 | PTRANS (Object-Nil, Iobj_direc-Vicinity of Listener's location, Instrument-Vehicle) |
| send1 | PTRANS (Object-Nil, Iobj_direc-Place, From-Place, Instrument-Vehicle) |
| get1 | PTRANS (Object-Movable, Iobj_benf-Person, Iobj_via-Person, Insrument ! = Actor, Iobj_direc Event or Building, Instrument-Vehicle or Person or Action) |
| get2 | PTRANS (Object-MovablePhysicalObject, Iobj_benf-Actor, Instrument-Post, from ! = Actor) |
| get3 | ATRANS (Object-MovablePhysicalObject, Iobj_benf-Actor, Instrument-Post, from ! = Actor) |
| book2 | MTRANS (Object-MtransNoun or MbuildNoun or MbuildNounform or Mfeel or Action, Iobj_benf-Actor, Instrument-communication, from ! = Actor) |
| reserve1 | AGREEMENT (Object-Ticket or Building or Accommodation, Instrument-Action or communication) |
| accept1 | AGREEMENT (Object-Ticket or Building or Accommodation, Instrument-Action or communication) |
| agree1 | AGREEMENT (Object-Action or Offer, Mode+ve) |
| decline1 | AGREEMENT (Object-Action, rel-agreement) |
| inform1 | AGREEMENT (Object-Action or Offer, Mode-ve) |
| discuss1 | MTRANS (Object-MtransNoun or MbuildNoun or MbuildNounform or Mfeel or Action, Iobj_benf-Person,Instrument-communication, from-Person) |
|  | MTRANS (Object-MtransNoun or MbuildNoun or MbuildNounform or Mactobj or Action or SubMact, Iobj_benf-Person, Iobj_val-Nil, Instrument-communication, from-Nil, support-Building or Organization or Event) |
| work1 | WORK (Object-Work_domain or Project,···) |
| attend1 | MSENSE (Object-Event,···) |
| meet1 | MEET (Object-Person, Iobj_benf-Person,···) |
| visit1 | MEET (Object-Person,···) |
| visit2 | MSENSE (Object-Building,···) |
| accommodate1 | PCONFIG (Obj-Person, Actor-Physical Object, Support-Living Building) |
| book1 | PUBLIC-DOCUMENT (Published-Yes, Periodicity = nil···) |
| newspaper1 | PUBLIC-DOCUMENT (Published-Yes, Periodicity = Daily,···) |
| pen1 | WRITING-TOOL (Contains-Ink,···) |
| pencil1 | WRITING-TOOL (Contains-Graphite,···) |
| letter1 | PRIVATE-DOCUMENT (From-Person/Organization, Addressed to-Person/Organization, Written on-paper,···) |
| ··· | ··· |

FIG. 59 book1 - written work or composition,··· book2 - reserve (a place, accommodation···)

reserve1 - order or set aside (seats, accommodation···)

come1 - movement towards where the listener is go1 - movement away from where the speaker is pencil1 - instrument for writing, drawing on paper pen1- instrument for writing with ink on paper

PUBLIC - DOCUMENT

Slotname

S1 <has s Name>
S2 <is written by Authors who are Person (s)>
S3 <contains Abstract Entity>
S4 <is a published material>
S5 <has a Price>
S6 <is Published by an Organization>
o o o    o o o

FIG. 75

| | | | |
|---|---|---|---|
| John Smith | M | 45 Rochester Univ. | Professor ... |
| John Williams | M | 40 Columbia Univ. | Asst. Prof. ... |
| Boris Decker | M | 42 ABC corporation | Manager ... |
| Mary Becker | F | 35 Canon USA | Manager ... |
| ... | | | |

FIG. 76

C1    MTRANS

| SLOTNAME | KNOWLEDGE STRUCTURE |
|---|---|
| Actor | PERSON |
| Object | LETTER (...) |
| Instrument | |
| Iobject - Beneficiary | C2 |
|       - Reason | ACTION |
|       - Direction | |
|       - Via | |
| From | |
| Support | |
| Time | TIME |
| Connected To | |
| Tense | |
| Qualifier | |

C2    PERSON

PERSON :

| | |
|---|---|
| S1 | (neme - Boris) |
| S2 | |
| S3 | |
| S4 | TIME |
| S5 | VENUE |
| S6 | |
| S7 | ORGANZATION (ABC Corporation) |
| S8 | |
| S9 | |
| ... | |

FIG. 77

```
PERSON :
    S1      (Boris Decker)
    S2      42
    S3      ...
    S4      TIME (...)
    S5      VENUE (City - New York,...)
    S6
    S7      ORGANIZATION (ABC Corporation (Addr (New York...)...)
    S8
    S9      Manager
    ...
```

RECEIVER DETAILS

Letter To :

| | | Boris |
|(first name)|(middle name)|(family name)|

ABC Corporation
(Organization)

(Division)

FIG. 79

C3 MEET

| SLOTNAME | KNOWLEDGE STRUCTURE |
|---|---|
| Actor | PERSON |
| Object | C2 |
| Instrument | |
| Iobject - Beneficiary | PERSON |
|       - Reason | ACTION |
|       - Direction | |
|       - Via | |
| From | |
| Support | C5 |
| Time | TIME |
| Connected To | |
| Tense | |
| Qualifier | |

C4

PERSON :

| S1 | (name - John Smith) |
|---|---|
| S2 | |
| S3 | |
| S4 | TIME |
| S5 | VENUE |
| S6 | |
| S7 | C5 |
| S8 | |
| S9 | |
| ... | |

C5

ORGANIZATION :

| S1 | (Duke University) |
|---|---|
| S2 | ORGANIZATION |
| S3 | ORGANIZATION |
| ... | |

FIG. 81

C6 MEET

| SLOTNAME | KNOWLEDGE STRUCTURE |
|---|---|
| Actor | PERSON |
| Object | PERSON |
| Instrument | |
| Iobject  - Beneficiary | PERSON |
|        - Reason | ACTION |
|        - Direction | |
|        - Via | |
| From | |
| Support | PLACE / ORGANIZATION |
| Time | C7 |
| Connected To | |
| Tense | |
| Qualifier | |

C7

```
TIME :
    S1      <has Second>
    S2      <has Minute>
    S3      <has Hour>
    S4      <has Day>       10
    S5      <has Day part>
    S6      <has Week>
    S7      <has Week part>
    S8      <has Month>
    S9      <has Month part>
    S10     <has Year>
    ...
```

FIG. 82

TIME :
S1   <has Second>
S2   <has Minute>
S3   <has Hour>
S4   <has Day>           DAY (10)
S5   <has Day part>
S6   <has Week>
S7   <has Week part>
S8   <has Month>         MONTH (5)
S9   <has Month part>
S10  <has Year>          YEAR (1993)
...

C8 MEET

| SLOTNAME | KNOWLEDGE STRUCTURE |
|---|---|
| Actor | PERSON |
| Object | C9 |
| Instrument | |
| Iobject - Beneficiary | PERSON |
|        - Reason | ACTION |
|        - Direction | |
|        - Via | |
| From | |
| Support | (C10 of PERSON (Boris)) |
| Time | TIME |
| Connected To | |
| Tense | |
| Qualifier | |

C9

| PERSON : | | |
|---|---|---|
| | S1 | (name - John Smith) |
| | S2 | |
| | S3 | |
| | S4 | TIME |
| | S5 | VENUE |
| | S6 | |
| | S7 | |
| | S8 | |
| | S9 | |
| | ... | |

C10

| ORGANIZATION : | | |
|---|---|---|
| | S1 | ( ) |
| | S2 | ORGANIZATION |
| | S3 | ORGANIZATION |
| | ... | |

FIG. 84

C8 MEET

| SLOTNAME | KNOWLEDGE STRUCTURE |
|---|---|
| Actor | PERSON |
| Object | C9 |
| Instrument | |
| Iobject - Beneficiary | PERSON |
|        - Reason | ACTION |
|        - Direction | |
|        - Via | |
| From | |
| Support | (C10 of PERSON (Boris)) |
| Time | TIME |
| Connected To | |
| Tense | |
| Qualifier | |

C10

ORGANIZATION :

| S1 | (ABC Corporation) |
|---|---|
| S2 | ORGANIZATION |
| S3 | ORGANIZATION |
| ... | |

FIG. 85

C11 MTRANS

| SLOTNAME | KNOWLEDGE STRUCTURE |
|---|---|
| Actor | PERSON |
| Object | C12 |
| Instrument | |
| Iobject - Beneficiary | PERSON |
|        - Reason | ACTION |
|        - Direction | |
|        - Via | |
| From | |
| Support | |
| Time | C13 |
| Connected To | |
| Tense | |
| Qualifier | |

C12

KNOWLEDGE DOMAIN :

S1      NLP
    S2
    S3      Artificial Intelligence
    ...

C13

TIME

S1
    ...
    S12      (>Conference (Name - AAAI
                            on - C12))
    ...

INFORMATION PROCESSING SYSTEM FOR COMPLETING OR RESOLVING AMBIGUITY OF INPUT INFORMATION AND METHOD THEREFOR

BACKGROUND OFF THE INVENTION

1. Field of the Invention

The present invention relates to an information processing system which makes a reference to a knowledge base in accordance with input information so as to complete or resolving ambiguity of the input information and a method therefor, and more particularly to an information processing system which makes a reference to a knowledge base to output information of a required type.

2. Related Background Art

Hitherto, there have been developed systems of a type which infers a requirement indicated by information in accordance with the information supplied. In the case where an input in a natural language to the conventional system is performed, a CA (Conceptual Analyzer), which analyzes the input so as to output its concept, or a syntactic-analyzing parser cannot resolve the ambiguity of the input. Thus, the conventional system cannot sometimes analyze the uniqueness of the input. Accordingly, there arises a necessity that the fuzziness of the input to validate the concept prior to performing the process for executing the command inputted to the command interface.

With an interface of a type for receiving an input which is not written in a natural language, for example, a menu-selectable interface, a process for completing the input to validate the concept is required prior to performing a next step if a partial input is performed.

Hitherto, dictionaries have been available each of which is formed into a CD-ROM or the like which contains the digitized contents of a dictionary in the form of a book. The dictionary of the foregoing type enables a user to detect the meaning of a desired word. Moreover, digitized dictionaries of another type exist in which words in two languages are written, such as an English-Japanese dictionary and a Japanese-English dictionary. The foregoing dictionaries are intended to be used mainly by a human being.

There has been available a system of a type for supplying, to a predetermined system, information in a specific form which can be processed by a machine. For example, a natural language parser based on a syntax requires a part of speech of a word in a domain of the language which is the subject to be parsed. A machine translation system contains a dictionary in two languages for mapping from one language to another language.

However, the conventional systems have been designed for a specific purpose and, thus, the dictionary for a human being cannot be used by the system. For example, a dictionary for analyzing a natural language cannot be used to generate the natural language or the opposite cannot be performed due to the difference in the contents.

Accordingly, a plurality of independent dictionaries must be developed and controlled to unify a plurality of subsystems.

Information (information, such as concept of a word) required for a computer system to perform a natural language process is not contained in a dictionary for a human being. Thus, a user cannot search for a word by using the meaning of the word.

SUMMARY OF THE INVENTION

Accordingly, an object of the present invention is to provide an information processing system capable of completing incomplete portion of input information to output complete information and a method therefor.

Another object of the present invention is to provide an information processing system capable of searching for a variety of required types of information from a knowledge base in accordance with input information.

According to one aspect of the present invention, there is provided an information processing system comprising: input means for inputting information indicating a concept; a knowledge base for storing knowledge; detection means which makes a reference to the knowledge base to detect an incomplete portion of the inputted information supplied from the input means; completing means for completing the incomplete portion detected by the detection means by making a reference to the knowledge base; and output means for outputting the inputted information, the incomplete portion of which has been completed by the completing means.

According to another aspect of the present invention, there is provided an information processing system comprising: input means for inputting information indicating a concept; a knowledge base for storing knowledge; detection means which makes a reference to the knowledge base to detect a fuzzy portion of the inputted information supplied from the input means; resolving means for resolving the fuzzy portion detected by the detection means by making a reference to the knowledge base; and output means for outputting the inputted information, the fuzzy portion of which has been resolved by the resolving means.

According to another aspect of the present invention, there is provided an information processing method comprising the steps of: inputting information indicating a concept; detecting an incomplete portion of the information inputted in the inputting step by making a reference to a knowledge base; completing the incomplete portion detected in the detecting step by making a reference to the knowledge base; and outputting the inputted information, the incomplete portion of which has been completed in the completing step.

According to another aspect of the present invention, there is provided an information processing method comprising the steps of: inputting information indicating a concept; detecting a fuzzy portion of the information inputted in the inputting step by making a reference to a knowledge base; resolving the fuzzy portion detected in the detecting step by making a reference to the knowledge base; and outputting the inputted information, the fuzzy portion of which has been resolved in the resolving step.

According to another aspect of the present invention, there is provided an information processing system comprising: concept input means for inputting information indicating a concept; a concept knowledge base having knowledge of concepts expressed by words and conditions for use; a meaning knowledge base having knowledge of meanings of the words; a grammar knowledge base having knowledge of relationships among words and other words in a case where the word is used in a sentence; instruction means for instructing the type of required knowledge; searching means for making a reference to at least one of the knowledge bases in accordance with information indicating a concept inputted by the concept input means so as to search for the knowledge of a type instructed by the instruction means; and output means for outputting a result of search performed by the searching means.

According to another aspect of the present invention, there is provided an information processing system comprising: meaning input means for inputting information indicating a meaning; a concept knowledge base having knowledge of words, concepts expressed by the words and conditions for use; a meaning knowledge base having knowledge of meanings of the words; a grammar knowledge base having knowledge of relationships among words and other words in a case where the word is used in a sentence; instruction means for instructing the type of required knowledge; searching means for making a reference to at least one of the knowledge bases in accordance with information indicating a meaning and inputted by the meaning input means so as to search for the knowledge of a type instructed by the instruction means; and output means for outputting a result of search performed by the searching means.

According to another aspect of the present invention, there is provided an information processing system comprising: a knowledge base for storing values of predetermined and plural attributes of objects, categories of the objects and mutual relationships among the plural categories as knowledge; instruction means for instructing the object and the attribute; reading means for reading a value of an attitude of an object instructed by the instruction means from the knowledge base; and control means for controlling the reading means to make a reference to the mutual relationships stored in the knowledge base to read knowledge of other objects concerning the value read by the reading means.

According to another aspect of the present invention, there is provided an information processing system comprising: a knowledge base for storing values of predetermined and plural attributes of objects, categories of the objects and mutual relationships among the plural categories as knowledge; instruction means for instructing a plurality of objects; reading means for reading knowledge of concerning objects of the plural objects instructed by the instruction means from the knowledge base while making a reference to the mutual relationships; and determining means for determining a common portion of the knowledge read by the reading means.

Other objectives and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 9 shows an example of a rule for completing time and a rule for validating the time;

FIG. 11 shows the structure of a concept of an object;

FIG. 13 shows the structure of a written material;

FIGS. 14A and 14B show the structure of a person and its example;

FIG. 16 shows properties of the abstract entity;

FIG. 17 shows the structure of a work domain;

FIGS. 18A and 18B show the structure of an organization and its example;

FIGS. 19A and 19B show the structure of a knowledge domain and its example;

FIGS. 22A and 22B show SPACE and the knowledge structure of a country while FIG. 22C shows an example of a Country;

FIG. 23 shows the structure of Venue;

FIG. 25 shows the concept structure of time;

FIG. 26 shows the structure of an event;

FIG. 28 shows the structure of a Goal-Plan;

FIG. 29 shows the structure of MOP;

FIG. 30 shows the structure of a scene;

FIG. 32 shows the structure of a goal and plan depending upon a domain;

FIG. 34 shows the structure of an action;

FIG. 35 shows an example of an action;

FIG. 36 shows the structure of MEET;

FIG. 37 shows a draft instance of MEET;

FIG. 38 shows the structure of AGREEMENT;

FIG. 40 shows the structure of PTRANS;

FIG. 41 shows the structure of PTRANS;

FIG. 42 shows the relationship between Driving forces and an action;

FIGS. 50A and 50B show a hierarchy of a place and an example of a dialogue concerning the place;

FIG. 55 shows the relationship between FIGS. 55A and 55B, which show an example of the structure of a form portion;

FIG. 56 shows the conjugations rules of verbs;

FIG. 57 shows an example of a grammar portion;

FIG. 58 shows an example of a conceptual portion;

FIG. 59 shows an example of a meaning portion;

FIG. 60 shows the structure of "Public Document";

FIG. 75 shows the contents of a data base concerning a person;

FIG. 76 shows an example of input to the pre-understander;

FIG. 77 shows an instance which has been completed;

FIG. 78 shows an example of input;

FIG. 79 shows a draft instance;

FIG. 81 shows a draft instance;

FIG. 82 shows a final instance;

FIG. 83 shows a draft instance;

FIG. 84 shows a final instance; and

FIG. 85 shows a draft instance.

DETAILED DESCRIPTION OF THE INVENTION

Figure 1:
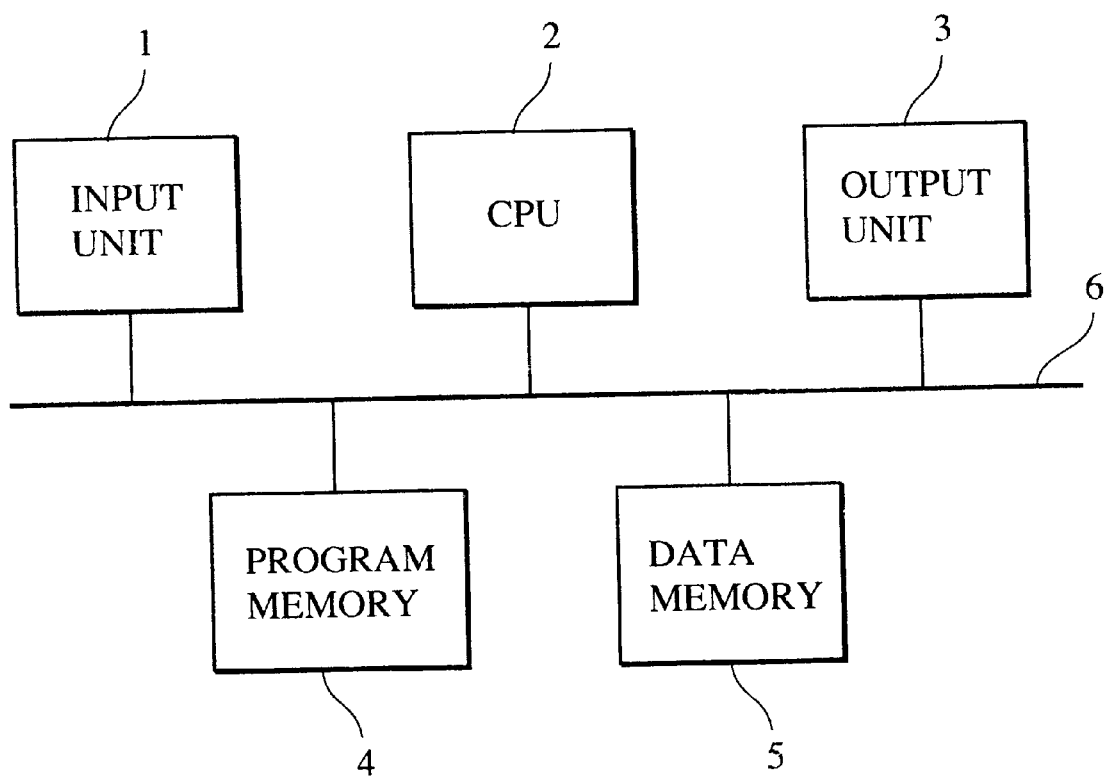
FIG. 1 is a block diagram showing the hardware structure of a natural language processing apparatus according to an embodiment of the present invention.

Referring to the drawings, a preferred embodiment of the present invention will now be described.

FIG. 1 is a block diagram showing the hardware structure of an embodiment of a natural language processing system according to the present invention.

Referring to FIG. 1, an input unit 1 inputs information in a natural language. Although the input information is hereinafter called a "sentence", the apparatus according to the present invention is able to process information having a predetermined regular structure even if the sentence is incomplete in a grammatical viewpoint.

The input unit 1 is a unit for inputting information, for example, a speech recognizing apparatus for inputting and recognizing a speech, a keyboard for inputting characters with keys thereon, a character recognizing apparatus for optically reading characters from a document to recognize the contents of the document, an online or offline manual character recognizing apparatus, or a receiving apparatus for receiving information from another system, for example, an apparatus for receiving a result of recognition performed by a character recognizing system. Moreover, information created in another process in the apparatus according to the present invention may be inputted. As an alternative to this, their combination which enables selection may be employed.

The CPU 2 performs calculations and logical determinations required to perform a process, the CPU 2 controlling elements connected to a bus 6.

An output unit 3 is a unit for outputting information, for example, a speech synthesizing apparatus for synthesizing and outputting character information, a display unit, such as a CRT or a liquid crystal display unit, a printer for printing out character on a sheet for a document, or a transmission apparatus for transmitting information to another apparatus, such as a data base. Moreover, an output in the apparatus according to the present invention may be an input for another processing portion of the apparatus, for example, a conceptual analyzer. As an alternative to this, their combination which enables selection may be employed.

A program memory 4 is a memory for storing programs including a processing procedure in accordance with flow charts with which the CPU 2 controls the operation of the apparatus according to this embodiment. The program memory 4 may be a ROM or a RAM into which a program is loaded from an external storage apparatus.

A data memory 5 stores data formed in a variety of processes and stores knowledge in a knowledge base to be described later. The data memory 5 is, for example, a RAM including a knowledge base which must be previously loaded prior to performing the process from a nonvolatile external storage medium or to which reference is made as the need arises.

The bus 6 transfers an address signal for instructing a component to be controlled by the CPU 1, control signals for controlling the components and data to be communicated between the components.

Figure 2A:
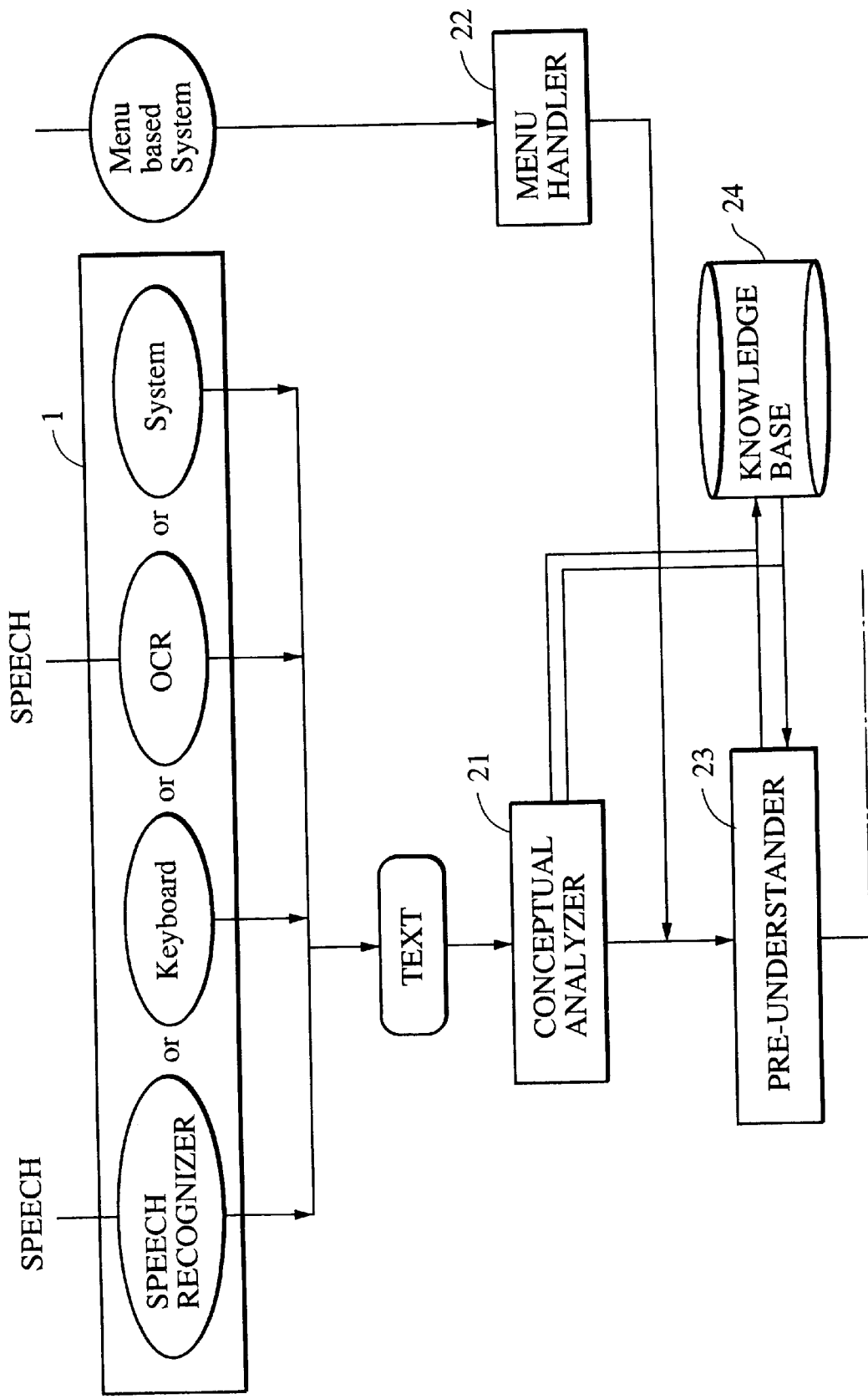
FIG. 2 shows the relationship between FIGS. 2A and 2B, which are block diagrams showing the functional structure of the natural language processing system.

FIG. 2 is a block diagram showing the functions of the natural language processing system according to this embodiment of the present invention.

A CA (Conceptual Analyzer) 21 uses the knowledge in a knowledge base 24 to analyze natural language information inputted by a user so as to convert the meaning of the contents into a concept for expressing the meaning.

The CA 21 is different from the conventional sentence analyzer which initially analyzes the syntax of the input natural language information to give meaning to the analyzed sentence structure. As an alternative to this, the CA 21 gets meaning concept equivalent to the input information from the input information to restore the same. The CA 21 performs the process while predicting the goal of the latter information in accordance with the previous information in viewpoints of context, moaning and grammar.

A menu handler 22 handles information of menu items selected by a menu-selectable system.

The CA 21 cannot analyze an input in a natural language in such a manner that no ambiguous portion remains. Accordingly, prior to understanding the input contents performed by an understander 25 there arises a requirement for resolving the fuzziness and validating the concept. A pre-understander 23 receives a list of concepts as a result of an analysis performed by the CA 21 or an output from the menu handler 22 in the case of the natural language input and uses the knowledge (for example, general knowledge, such as data and time and domain knowledge) in the knowledge base 24 to validate and complete the input information so as to update the contents and correct an error made by a user. The pre-understander 23 resolves the fuzziness of the input to add the concept, which could not be added to another concept in the analysis performed by the CA 21, with the help of the knowledge of the system or the user.

Figure 3:
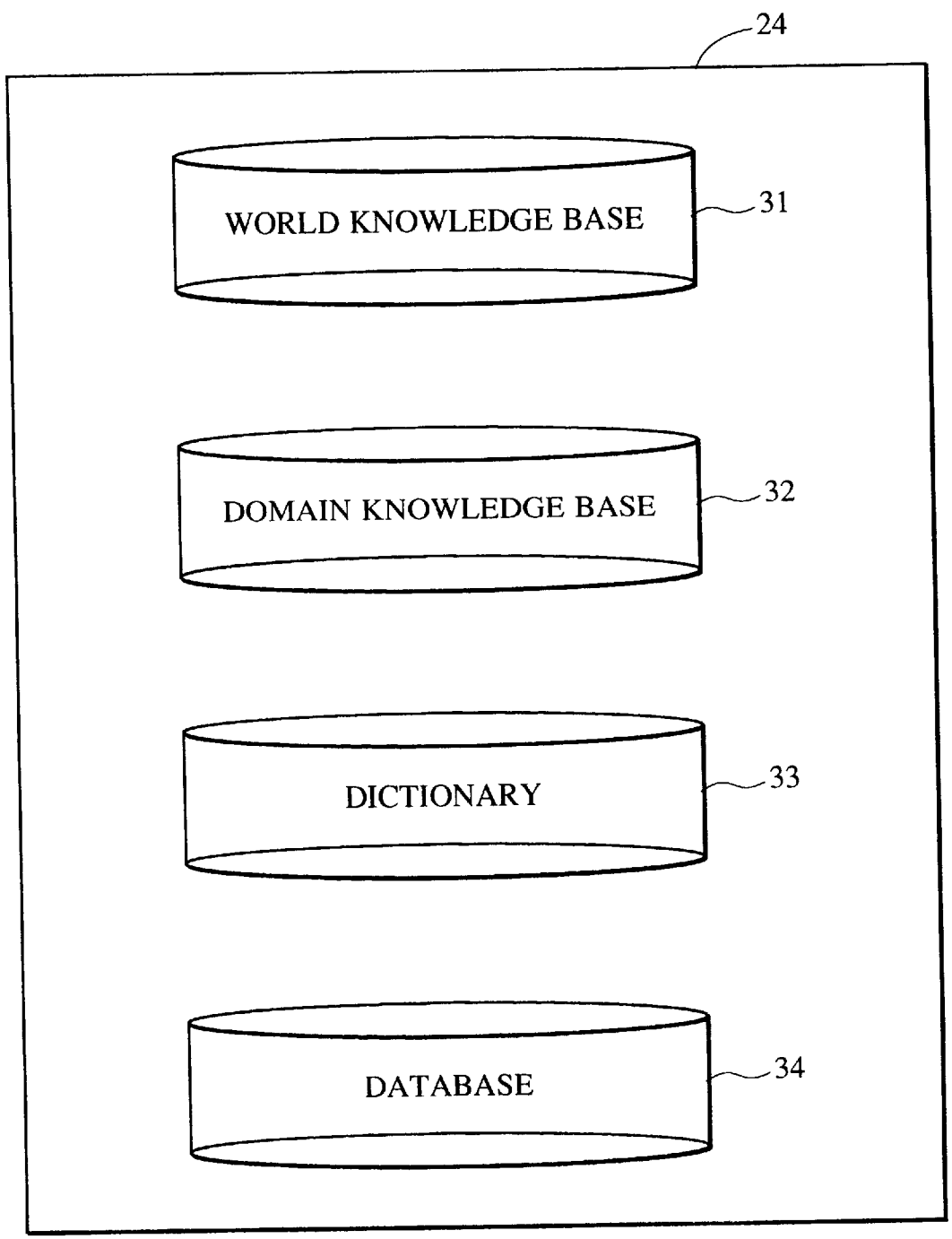
FIG. 3 is a diagram showing the structure of a knowledge base.

FIG. 3 is a diagram showing the structure of the knowledge base 24 comprising a WKB (World Knowledge Base) 31, a DKB (Domain Knowledge Base) 32, a dictionary 33 and a data base 34. The WKB 31 has world knowledge. The DKB 32 has knowledge, such as goal and plan models. The dictionary 33 is a language knowledge base (Linguistic Knowledge Base) having knowledge of a language similar to a usual dictionary. The data base 34 stores personal information and the like.

Figure 4:
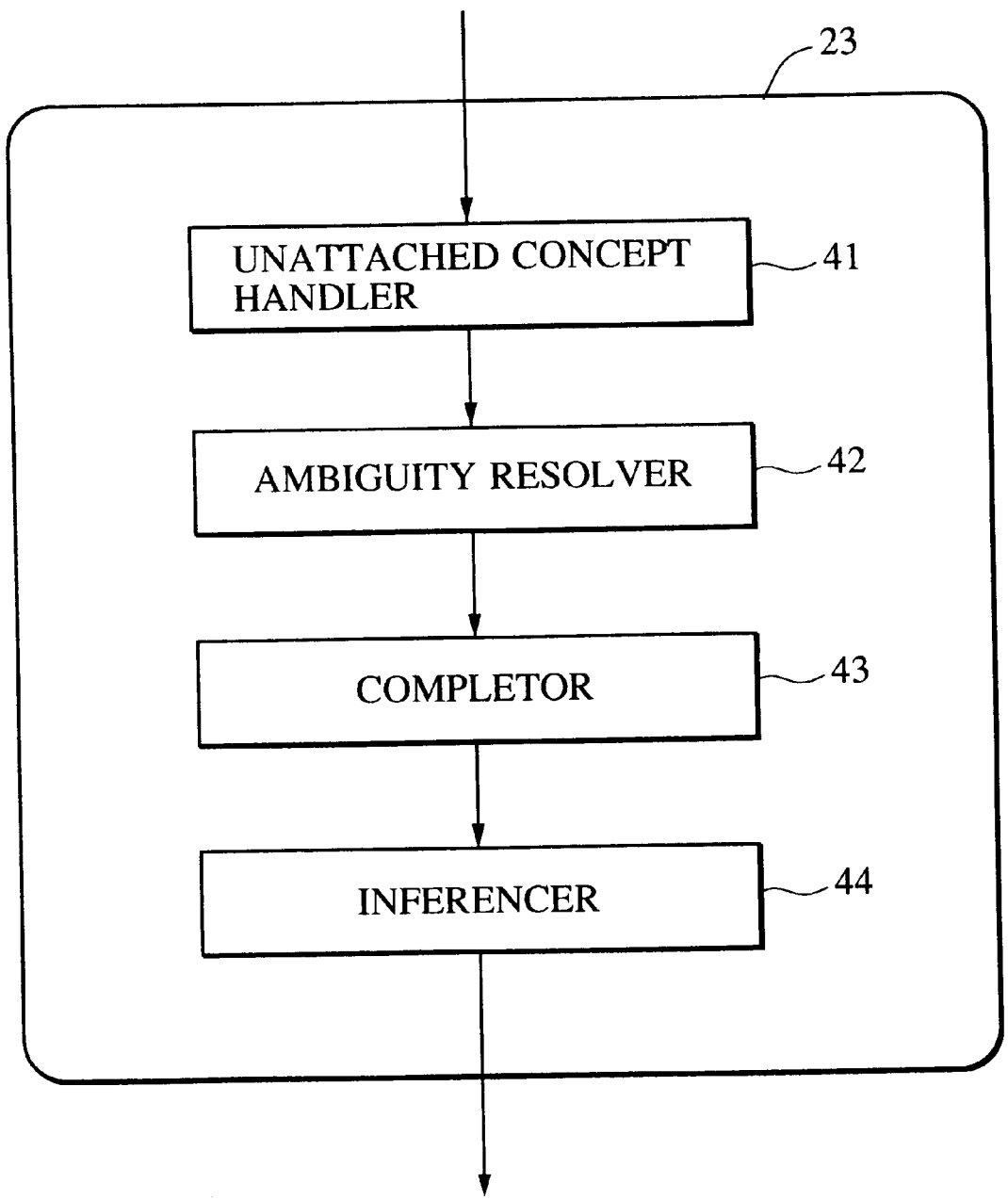
FIG. 4 is a block diagram showing the functional structure of a pre-understander.

FIG. 4 is a block diagram showing functions of the pre-understander 23. An unattached concept handler 41 adds the concept, which could not be added to another concept in the analysis performed by the CA 21, by using the knowledge of the system or by making queries to the user. An ambiguity resolver 42 resolves fuzziness of a portion, which could not be uniquely determined or a fuzzy word in the natural language input, by using the knowledge base. A completor 43 outputs a draft instance made by the CA 21 or the menu handler 22 in such a manner that blank instances of all slots in the knowledge structure are filled as much as possible. The completor 43 validates, completes and updates the draft instance in accordance with the knowledge in the knowledge base 24 and the rule. During the foregoing process, the completer 43 applies the rule of the user model to correct an error made by the user. The result of the process performed by the completor 43 is transferred to an inferencer 44.

Figure 5:
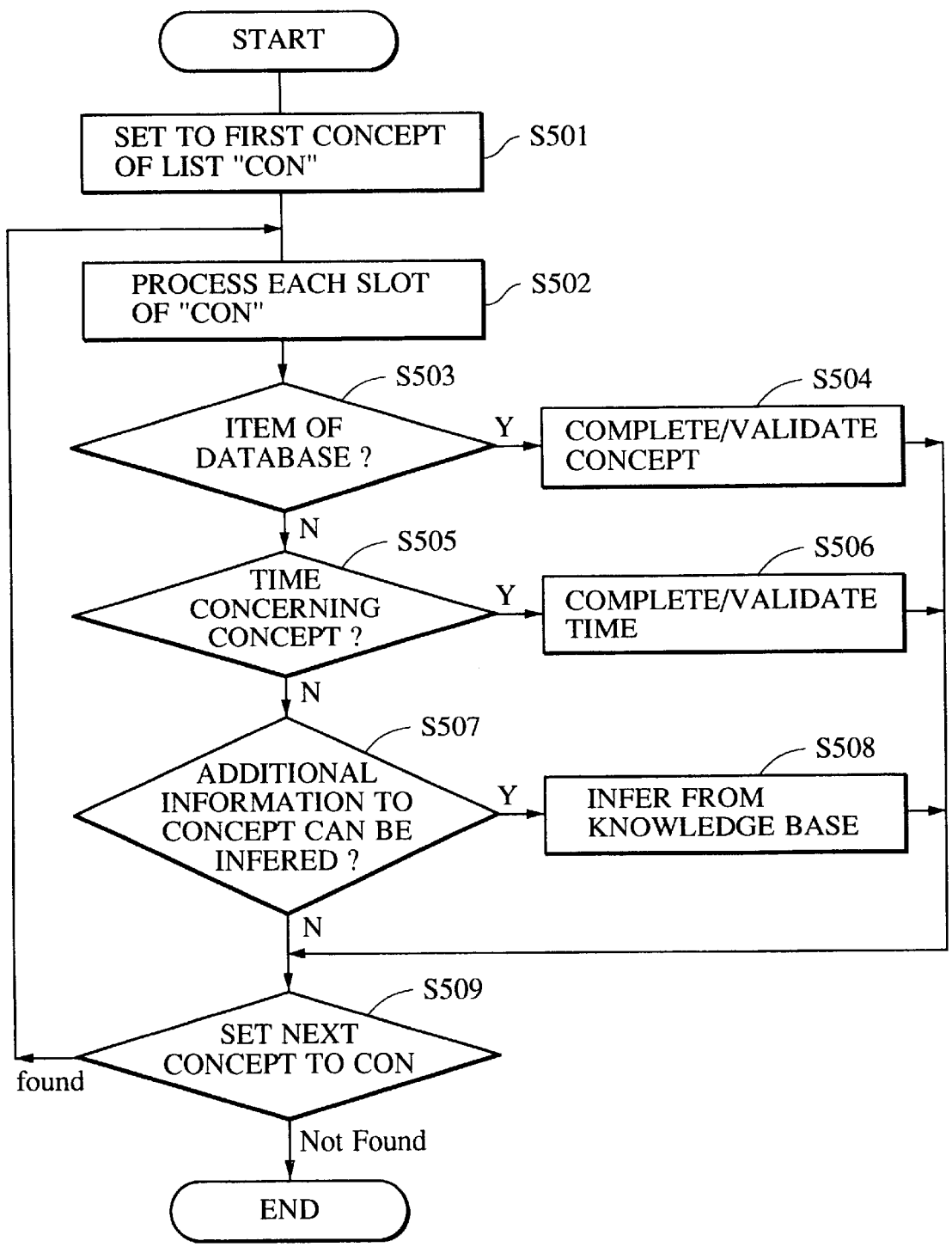
FIG. 5 is a flow chart of a procedure of a process to be performed by a completor.

FIG. 5 is a flow chart of the procedure of the process to be performed by the completer 43. Each concept slot in the input concept list must be validated or completed or is filled with the draft instance so as to be validated or completed.

Initially, the first concept in the list is set to concept Con (step S501), and each slot of the set concept Con is processed (step S502). If a determination has been performed that the subject is an item of the data base, confirmation of the validity of the concept and completion of the same are performed (steps S503 and S504). If a determination is performed that the subject is time relating to the concept, confirmation of the validity of the time and completion of the same are performed (steps S505 and S506). In steps S505 and S506 an error model about the date (for example, many people tend to use the last year at the beginning of the new year), a model of a user error and the tense of the sentence are checked.

Figure 6:
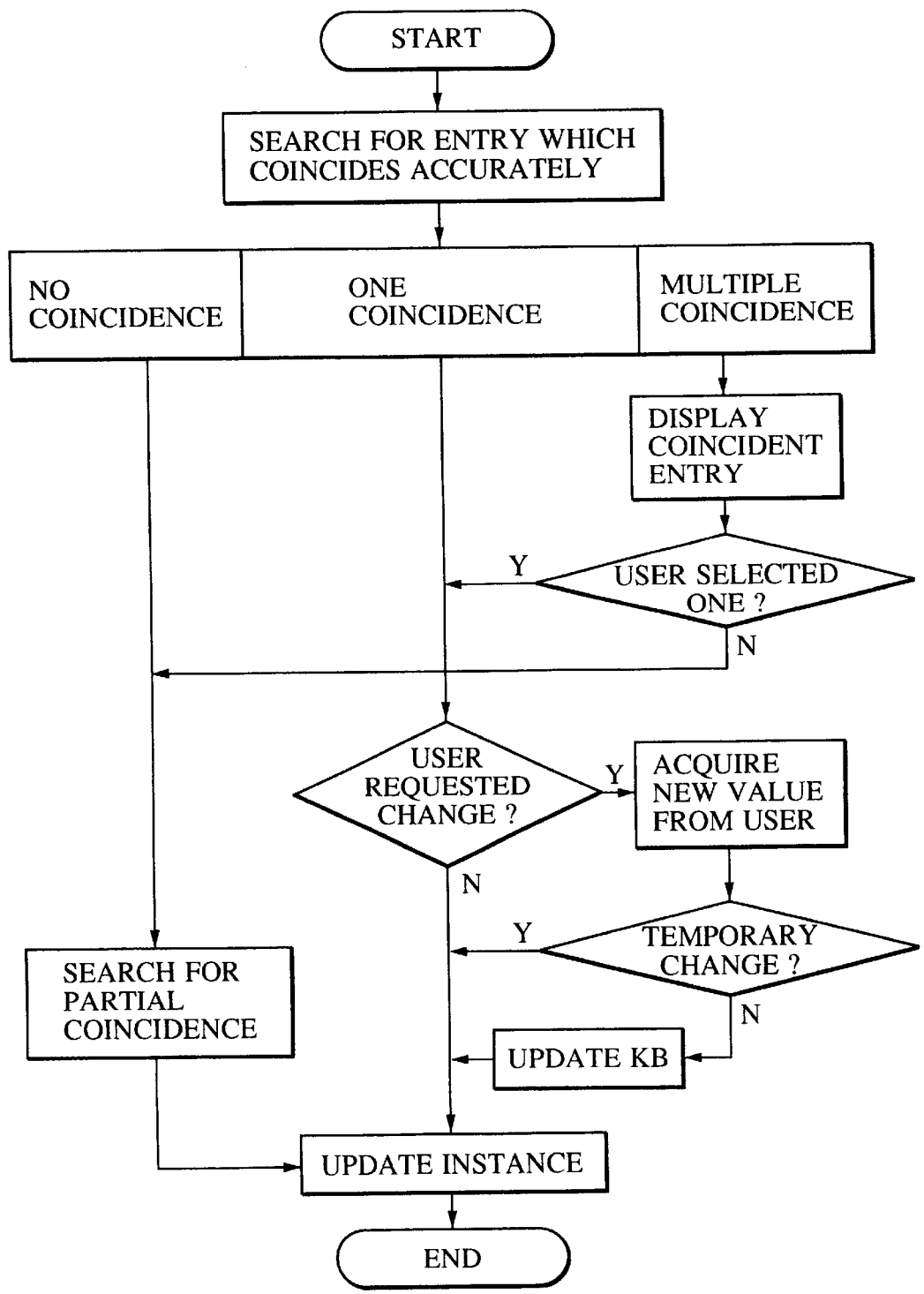
FIG. 6 is a flow chart of a detailed procedure of a matching process.
Figure 7:
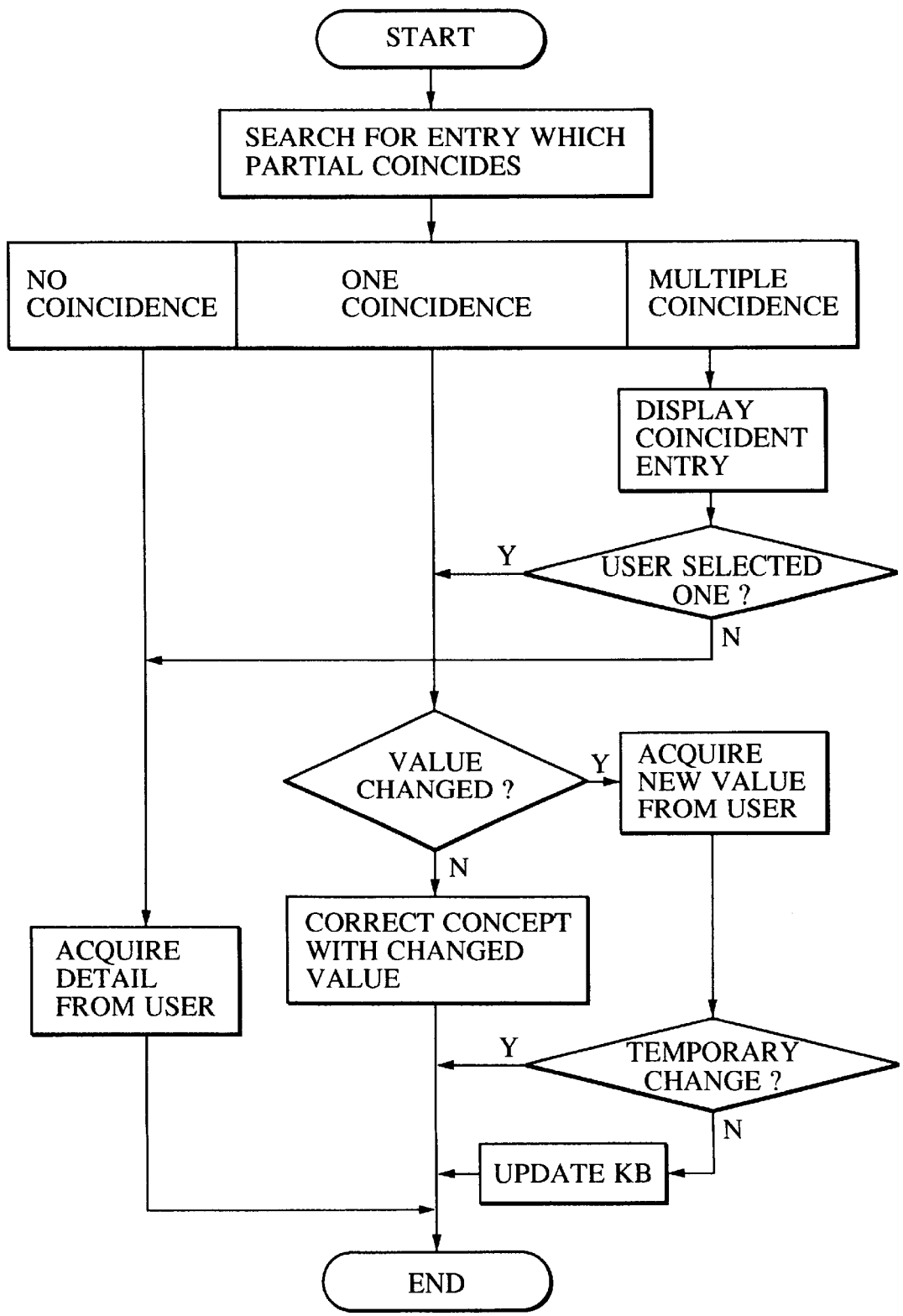
FIG. 7 is a flow chart of a detailed procedure of a partial matching process.

If a determination is performed that further information can be inferred with respect to the concept, an inference is made from the knowledge base (steps S507 and S508). Then, whether a next concept can be acquired from the list is determined. If a next concept can be acquired, the next concept is set to Con (step S509) and the operation returns to step S502. If any next concept exists, the operation is completed. For example, a concept expressing an item (an appropriate noun or the like) in the data base is processed as shown in FIGS. 6 and 7. A search shown in FIG. 6 is performed in a concerning data base so that an accurately matching entry is acquired. To specify one concept concerning the input as shown in FIG. 6, different processes are performed in accordance with the number of detected entries. Then, validation and completion are performed. Thus, the instance of the concept is updated with an acquired value so that the draft instance is made to be a valid instance.

FIG. 7 is a flow chart showing a detailed procedure of a partial matching process. The foregoing search is performed in a concerning data base so that an entry, which partially matches, is acquired. Similarly to the accurate matching shown in FIG. 6, the search is narrowed toward one concept and then validation and completion are performed.

Figure 8:
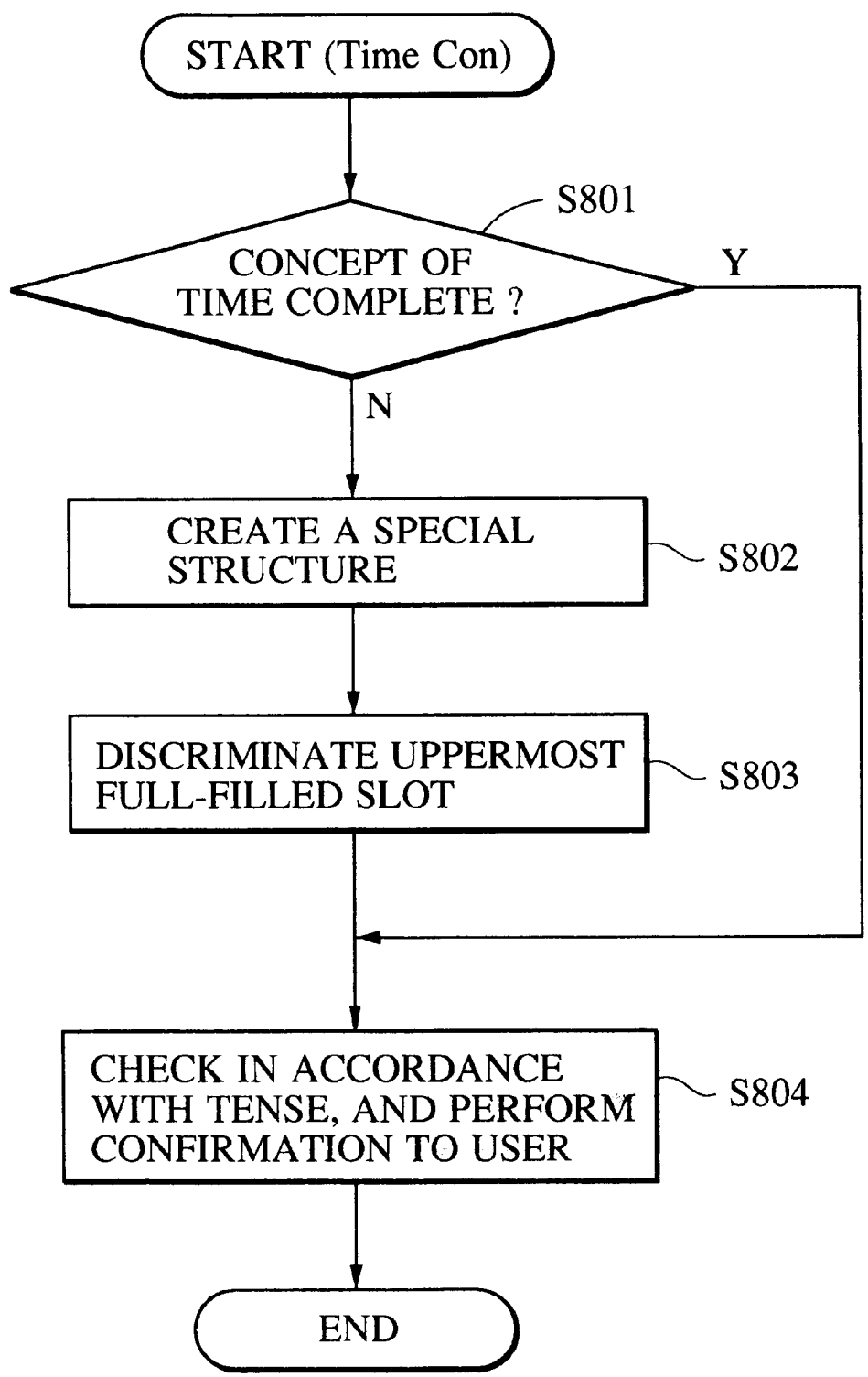
FIG. 8 is a flow chart of a process for validating and completing time.

FIG. 8 is a flow chart of a process for performing validation and completion concerning the time. If the portion of the time is not completely filled, the uppermost filled slot is determined (steps S801 and S802). Then, the upper slot is filled in accordance with the context, the present time and other rules (step S803). Moreover, a potential error is checked in accordance with the tense and the like causes the user to perform a confirmation (step S804).

FIG. 9 shows an example of a rule for completing the time and that for validating the time. If the tense of the action is future and the time is past, either of the tense or the time must be corrected. Specifically, the previous year is frequently erroneously written in place of the new year, to be written.

Figure 10:
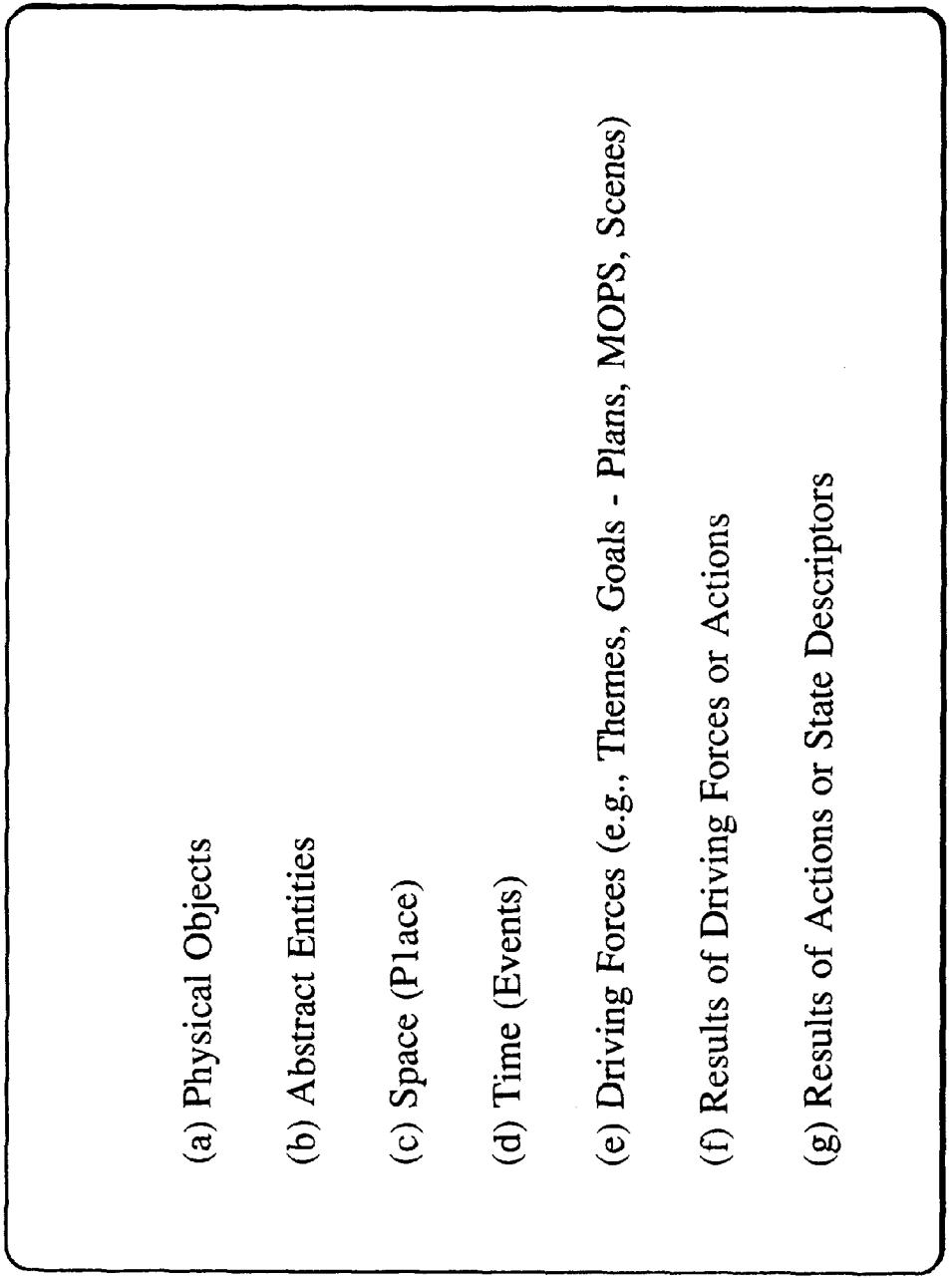
FIG. 10 shows the contents of a knowledge base of world knowledge.

FIG. 10 shows the contents of the general world knowledge base 31. The general world knowledge is classified into (a) to (g). FIG. 11 shows the structure of the concept of physical objects. Physical objects consist of all objects physically existing in natural world and each having weight, dimensions and the like. Each physical object is, as shown in FIG. 11, related to a variety of characteristics unique for the physical object. Referring to FIG. 11, "Function" is, for example, existence in the case of a human being, and "Abstract Value" is the life in the foregoing case. "Associated Abstract Entity" is sunset in the case of sun. As the "Property", countable, qualifiable by adjectives, consumable resource, desctructible and the like.

Figure 12:
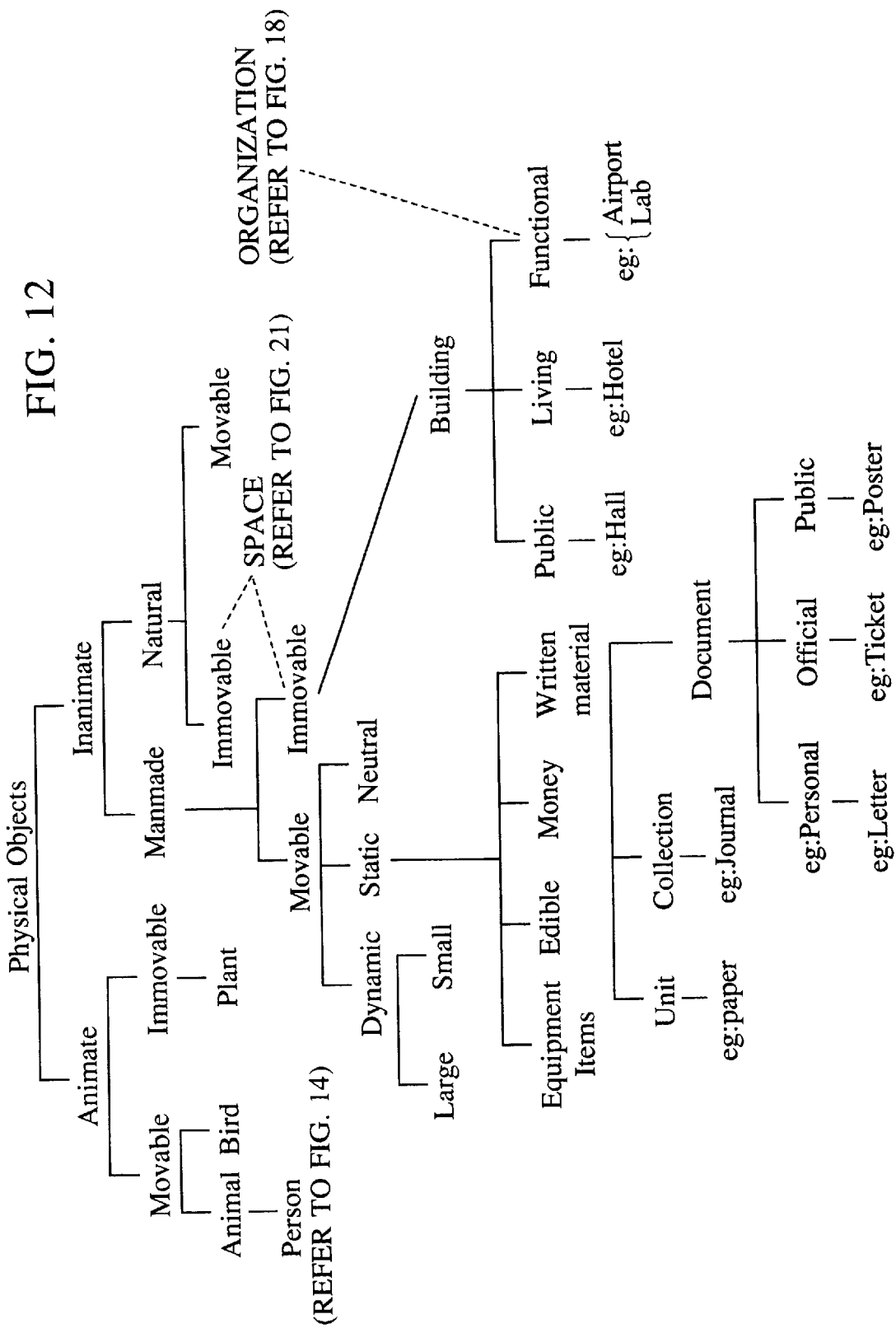
FIG. 12 shows a knowledge structure existing below the object.

FIG. 12 shows main types of knowledge structures existing below physical objects. Physical objects are classified into animates (all living organism including plants) and inanimates. The animates are classified into movable animates and immovable animates. The immovable animates include plants, while the movable animates are classified into birds and animals. As shown in FIG. 12, a person is below the animal. As shown in FIG. 12, the inanimates are classified into natural inanimates and manmade inanimates. The natural inanimates are classified into movable inanimates (sand, rock, water and the like) and immovable inanimates. (mountain, plain, sea and the like). The latter inanimates are also deduced from the space and the like. The manmade inanimates are classified into movable type and immovable type. The movable type is classified into dynamic type (automobiles, airplanes, spontaneously movable type), static type (objects, such as a box or a pen, which can be lifted and carried) and neutral type (for example, a bicycle which can be moved spontaneously as the dynamic object and which can be lifted easily as the static object). The dynamic objects are classified into large transporting means such as airplanes and trains and small transporting means such as buses and automobiles, the dynamic objects including, in the structure thereof, slots of speed and owner.

The static objects are classified into money (having a slot of the type of money (check or cash), equipment/machine items, items which can be edited, written materials and the like. The written materials are, as shown in FIG. 13, classified into units (relating to one topic) and collections (relating to a plurality of topics). The unit has slots as indicated in (a1) and subcategories as indicated in (a2). Identically, the collection has slots indicated in (b1) and subcategories as indicated in (b2).

The documents belonging to (b2) are classified into personal documents (for example, letters, facsimile sheets, memorandums and the like), official documents (for example, tickets, visas, passports and the like), and public documents (for example, time tables, public announcements, advertisements and the like). The structures of the documents are indicated in (c), (d) and (e).

Referring back to FIG. 12, the inanimates, manmade and immovable objects (buildings, bridges and the like) are also deduced from SPACE and have specific positions. The buildings are classified into public buildings (which mainly are buildings for leisure, such as halls, museums, zoos and the like), living buildings (hotels, restaurants, homes and the like) and functional buildings (offices, universities, airports, laboratories and the like). The public building has a slot for which the building is well-known. The living building has a slot indicating an owner (or owning institute) and another slot indicating residents. The functional building is also deduced from ORGANIZATION and therefore has properties (functions, works, addresses) of the ORGANIZATION.

FIG. 14A shows the structure of a person. As shown in FIG. 14A, a person remains the name slot of the physical object which is classified into first name, middle name and surname. All animates have ages, that is, time elapsing from births. Moreover, a person has slots indicating telephone number, birth day, address, social standing, belonging organization, work (including present work, previous work, usual work and another work), designation, hobby, parents, children and the like. FIG. 14B shows the structure of a person having name Kono Gitaro.

Figure 15:
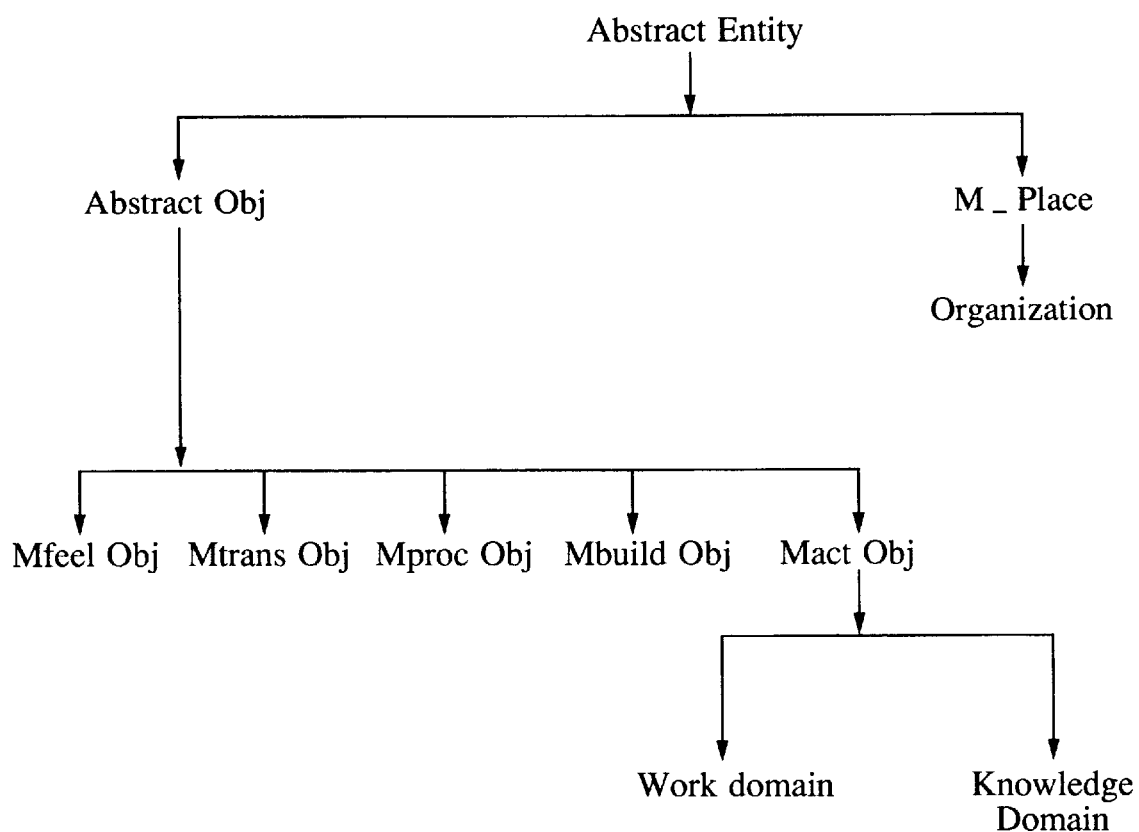
FIG. 15 shows the structure existing below an abstract entity.

FIG. 15 shows the knowledge structure below the abstract entity. The foregoing structure has no physical entity and exists in only mind, the structure including gratitude, idea, beauty, trip, fear, knowledge of physics, chemistry and the like and skills. The abstract entity has subcategories M_Place (organization and the like) and Abstract Obj. The latter subcategory is classified into M_Feel Obj (gratitude, favor), M_Trnas Obj (information), M_Proc Obj (opinion, view), N_build obj (design, plan, and result) and Mact Obj (knowledge domain and work domain).

FIG. 16 shows main properties of the abstract entity. Referring to FIG. 16, slot S3 indicates the organization, to which the person belongs and the place in which the entity exists. Slot S4 indicates a relative object, for example, sun with respect to sunset. FIG. 17 shows the structure of a work domain belonging to Mact Obj.

FIG. 18A shows the detailed structure of a multi-level-linked organization. Slot S2 indicates a higher parent organization to which the organization belongs, and slot S4 indicates the type of the organization, such as a government, a benefit obtaining organization or an academic organization. Slot S5 indicates the type of the work, such as manufacturing, development or trade. The foregoing information is used as information indicating the type of a work in which a person engages. Slot S8 indicates a nominal head and S9 indicates a representative head each of which is the post. FIG. 18B shows an example of an organization.

Figure 20:
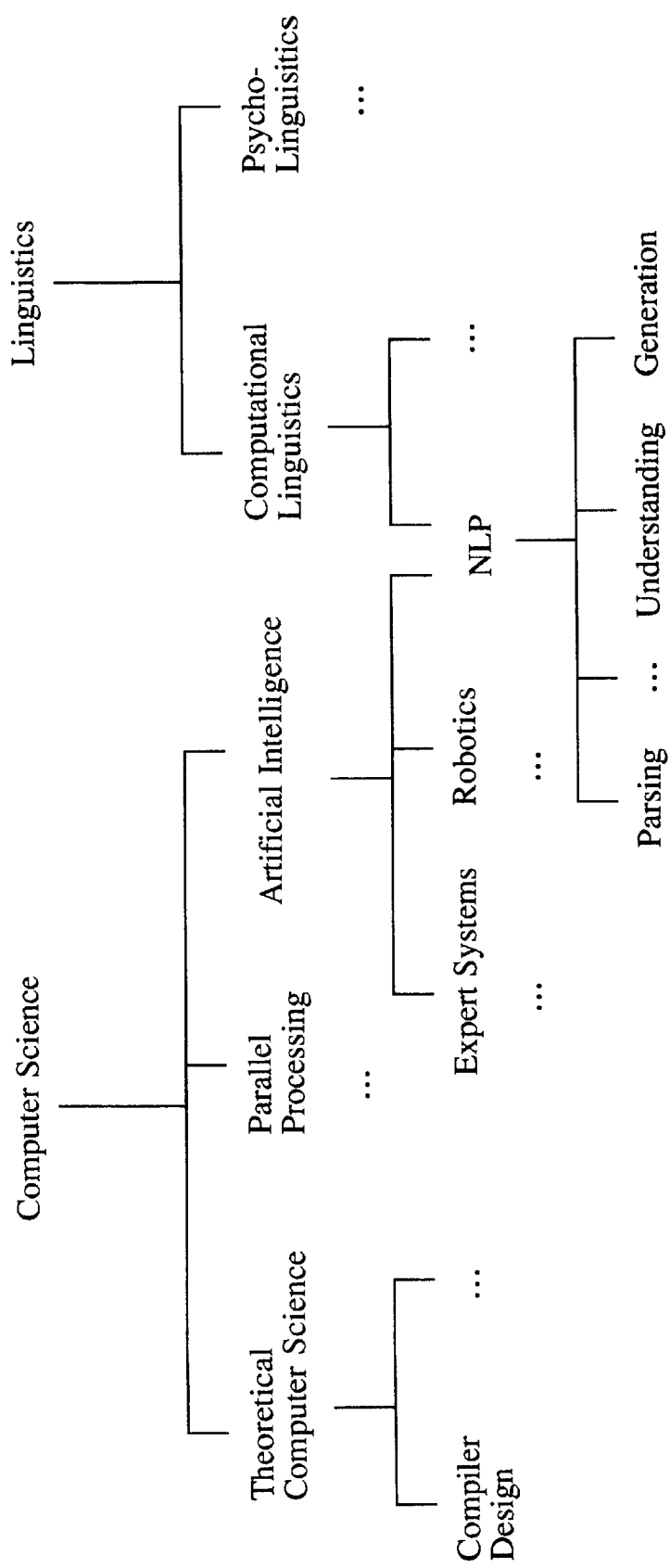
FIG. 20 shows an example of a hierarchy of the knowledge domain.
Figure 21:
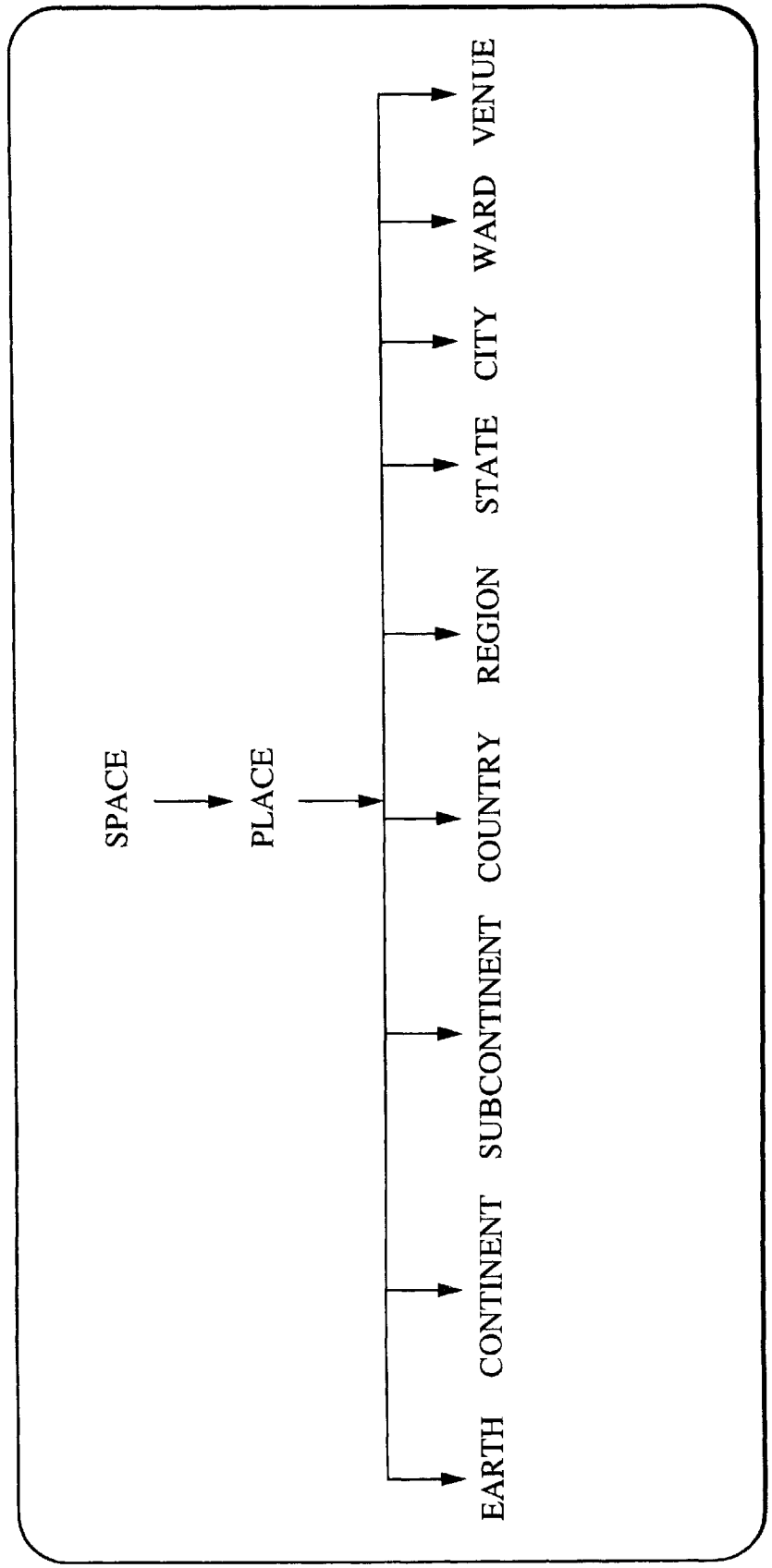
FIG. 21 shows a knowledge structure below SPACE.

FIGS. 19A and 19B show the structure and an example of the knowledge domain. FIG. 20 shows an example of a hierarchy of the knowledge domain. FIG. 21 shows the knowledge structure under SPACE, the knowledge structure consisting of a spatial quantity, such as range, distance and volume. Referring to FIG. 21, subcontinent includes a portion of the continent, such as North America, South America, and South East Asia. Region indicates England or Scotland in the case of U.K, and Hokkaido or Honshu (including regions, such as Kanto and Kansai) in the case of Japan. State can be replaced by a county or province. FIG. 22A shows the structure of the place. Slot S2 indicates owns place, slot S3 indicates the place belonging to the place, and slot S7 indicates geographical position, for example, the latitude and longitude. FIG. 22B shows the structure of a country. In the case of a country, slot S2 indicates the state, and S3 indicates the continent. Slot S8 indicates capital. Moreover, properties except those shown in FIG. 22B are government, summer time, requirement for a visa, present state (an advanced nation or a developing country), currency, temperature and the like. FIG. 22C shows the structure of Japan. Slots in the case of a city indicate the relationship to another place. (the distance or the direction), the sightseeing spot. FIG. 23 shows the structure of Venue.

Figure 24:
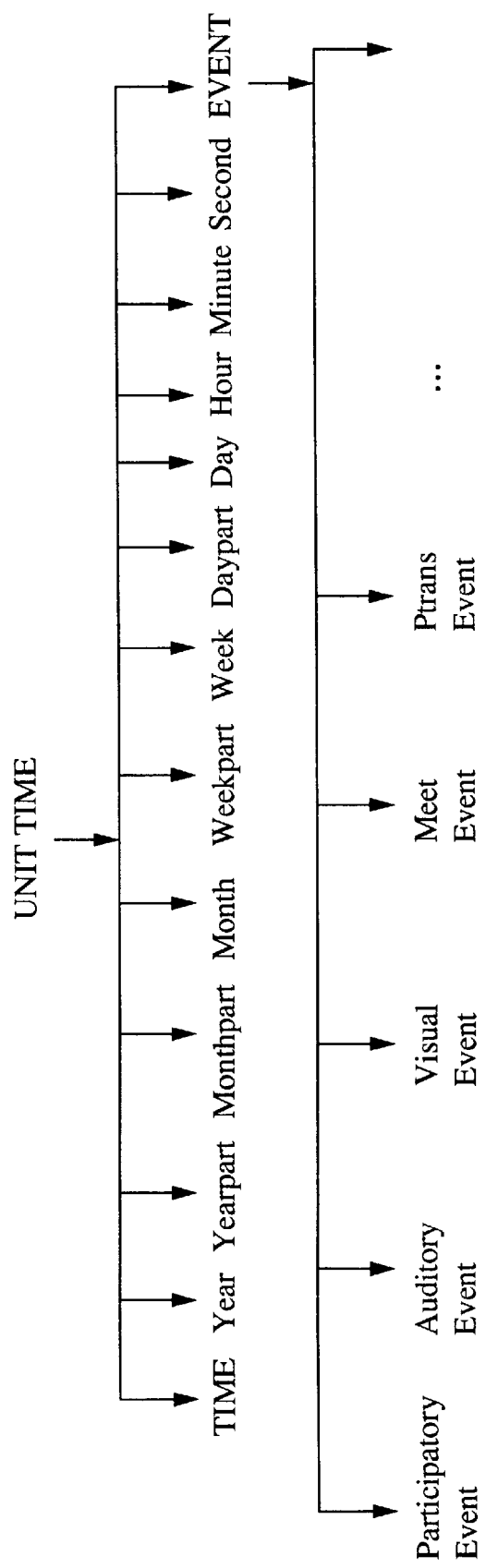
FIG. 24 shows a knowledge structure below unit time.

FIG. 24 shows the knowledge structure below unit time. The unit time indicates the concept concerning time, such as day or month. Time has a quality which passes and which is not allowed to retroact. Time has properties which is a source, which can be consumed and which cannot be controlled. FIG. 25 shows the conceptual structure of time. As indicated by slots S1 and S2, the classification of the time has relationship of inclusion similar to the case of the place. FIG. 26 shows the structure of an event, in which (a1) shows the structure and (a2) shows subcategory. Intentional, which is the subcategory, is classified as indicated by (b).

Figures 27A, 27B:
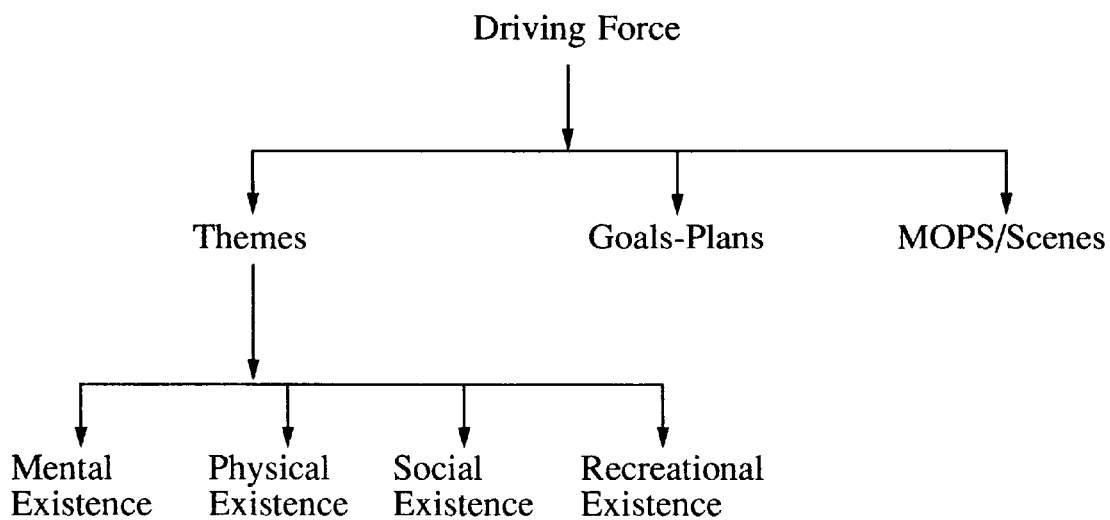
FIGS. 27A and 27B show the knowledge structure below DRIVING FORCES and Themes.

FIG. 27A shows the structure below DRIVING FORCES. The forces below DRIVING FORCES attain sets of actions. Driving forces have properties, type (natural or intentional), type of the object (subject of the action, for example, whether all physical objects or only human being), and a set of results (expected object or another probability). As shown in FIG. 27A, Driving forces are classified into Themes, Goal-Plans and MOPS/Scenes. Themes are classified as shown in FIG. 27B. FIG. 28 shows the structure of Goal-Plan. Goal-Plans are intentional psychological driving forces for causing an animated for performing a plan to perform an action to achieve the plan. Referring to FIG. 28, WHO is a processor of Goal, and WHAT is information of Goal. SITUATION is a factor indicating the possibility when selection is performed from a usual or an alternative plan or a normal factor. HOW is a plan for achieving Goal and includes a normal plan and an alternative plan. POST-CONDITIONS include a set of results and expected goals.

FIG. 29 shows the structure of MOP. MOPS is a generalized plan for use to resolving a variety of Goals and, in the specified sequential order, forms scenes to be executed. FIG. 30 shows the structure of the scene. The scene is a set of fixed actions which do not require planning, the scene being executed for satisfying the main goal or an MOP to which the main goal must be attached.

Figure 31:
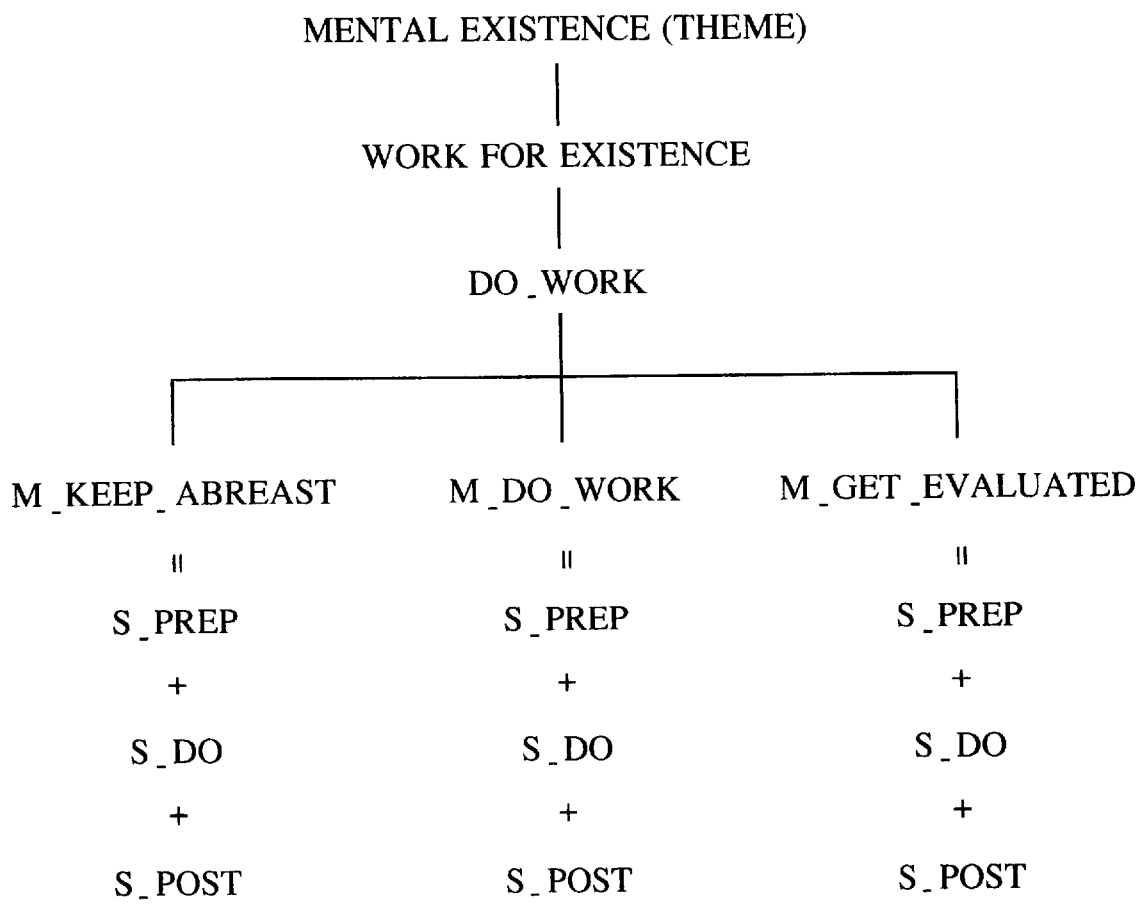
FIG. 31 shows the hierarchy of a generalized goal and plan.

FIG. 31 shows the hierarchy of a generalized goal and plan below Mental Existence. Work For Existence has three goals DKNOW, DO_WORK and PRESENT/PUBLISH in accordance with the stage of Work. Prior to starting a new work, learning of the work must be performed (DLEARN). Even if the work is continued, keeping with progress in the subject field is required (DKNOW for M_KEEP_ABREAST). M_DO_WORK is the actual contents of the work, and the final phase for evaluating the results of the work is realized by a goal Present/Publish (M_GET_EVALUATED).

Figure 33:
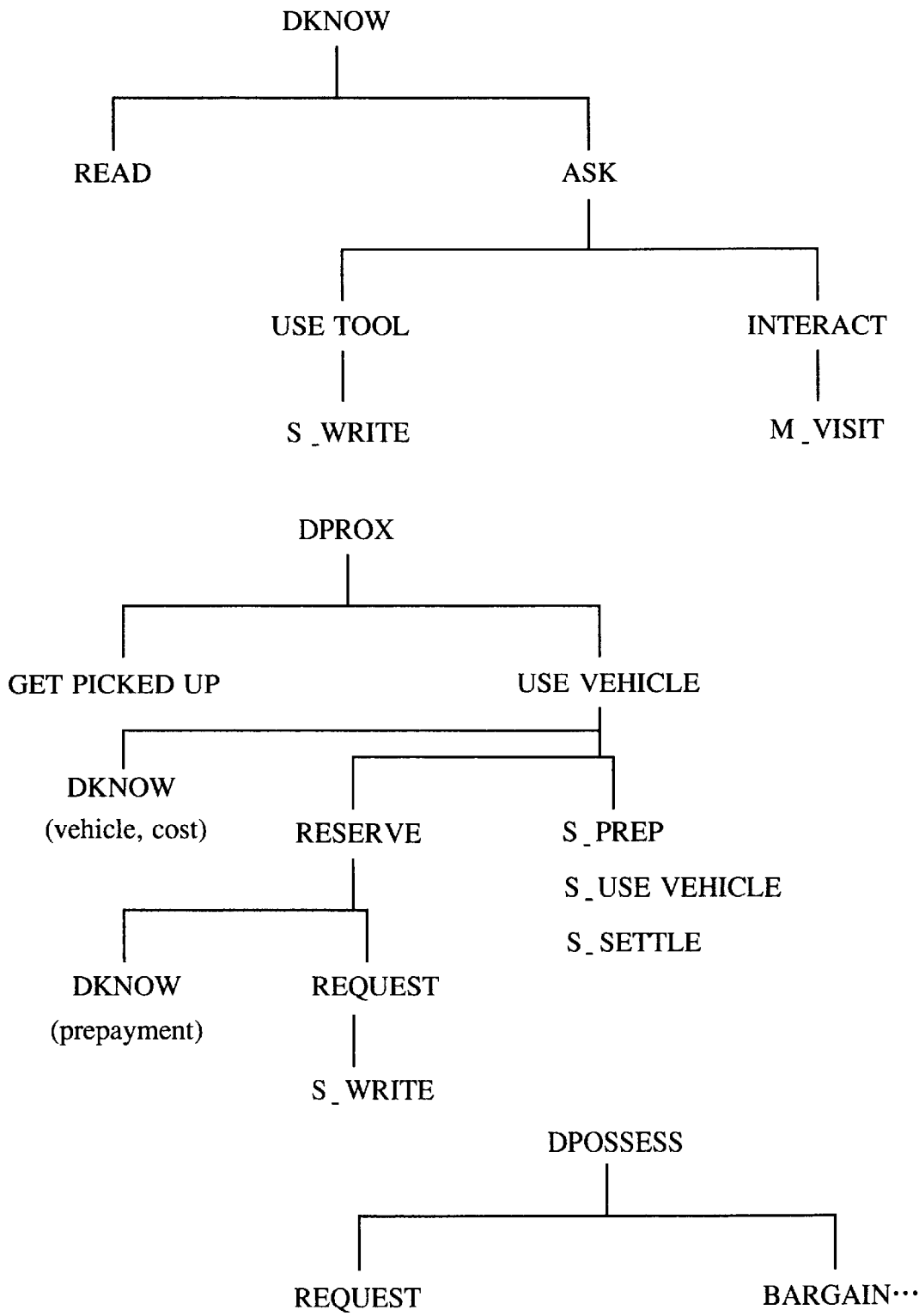
FIG. 33 shows a basic goal.
Figure 39:
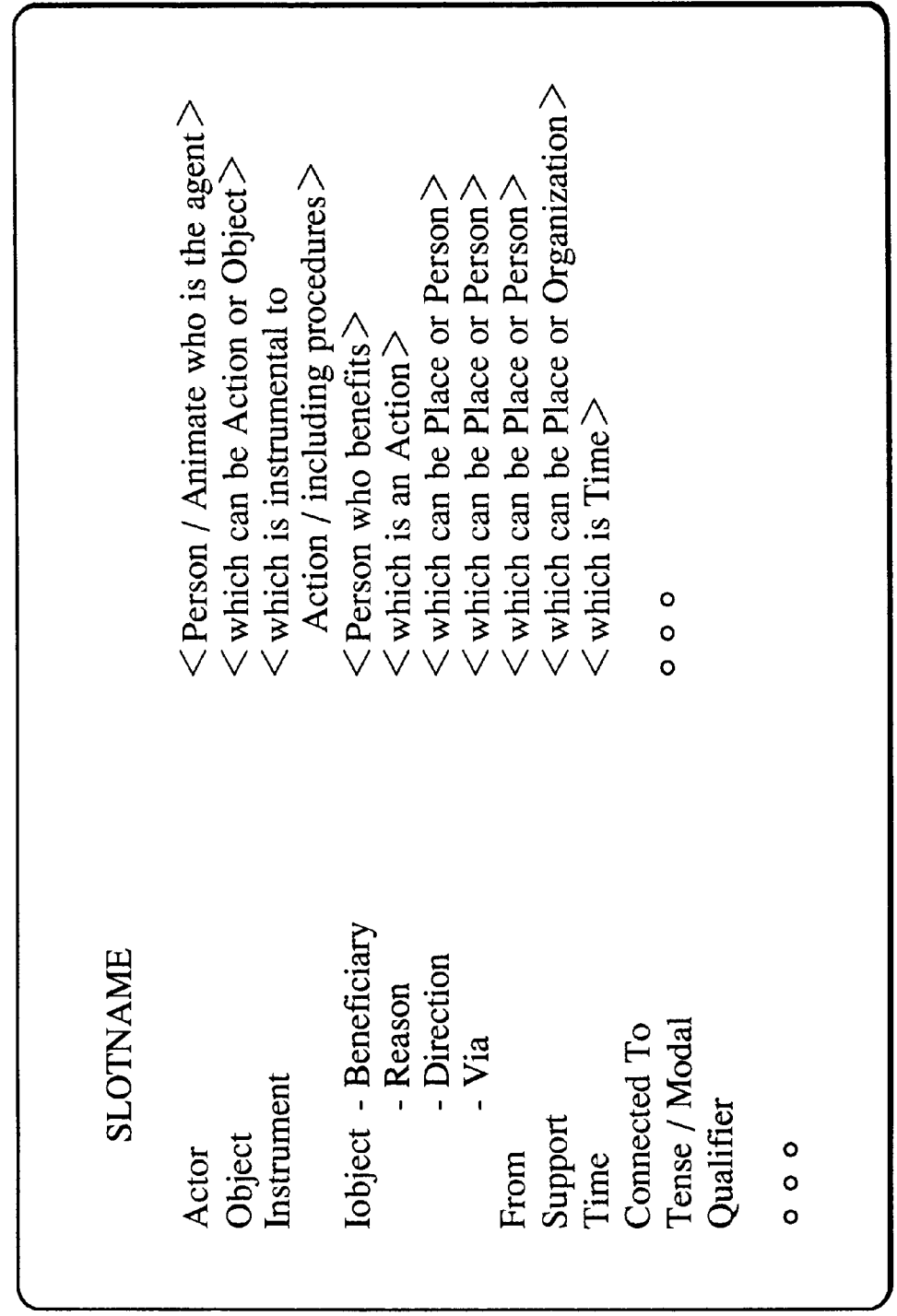
FIG. 39 shows the structure of MTRANS.

FIG. 32 shows a goal and plan structure depending upon the domain and applied to two domains, R & D and sales. FIG. 33 shows a basic goal. For example, DPROX is a goal to reach a specific place and includes a goal using a vehicle or a goal in which the person is allowed to get into a vehicle. FIG. 34 shows the structure of the action. FIG. 35 shows an example of the action. FIG. 36 shows the structure of MEET. FIG. 37 shows the draft instance of MEET. FIG. 39 shows the concept structure of MTRANS. FIG. 40 shows the concept structure of PTRANS. FIG. 41 shows the concept structure of PTRANS.

FIG. 42 shows the relationship between Driving forces and actions. Referring to FIG. 42, "Int." represents International, "psy." represents psychological and "mech." represents mechanical. Driving forces change a state of an object, on which the force acts, and a state of a concerning abstract entity and cause spatial and time changes.

Figure 43:
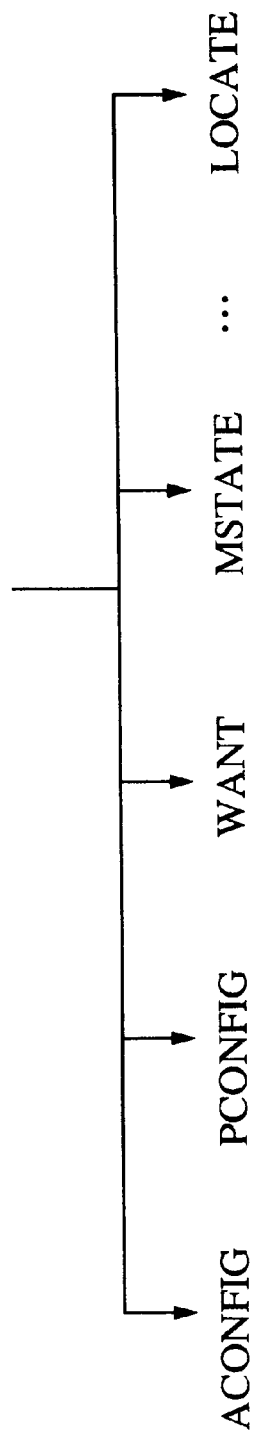
FIG. 43 shows an example of a state descriptor, which is a result of an action.

FIG. 43 shows an example of a state descriptor which is a result of an action. The state descriptor describes a state of an entity and the relationship among two or more entities. ACONFIG is a state descriptor of an abstract entity, an object, a result of driving forces (adverb), or the relationship between abstract structures during the time. Verbs expressing "John is in the army.", "John is angry with Mary." and the like are covered. An abstract attribute, such as "the kite is blue" is covered with the foregoing class. Moreover, there are exemplified by thankful, be obliged, a month is of thirty days, and John is a boy. ESCHEDULE is an event scheduler which is a state descriptor of an event, LOCATE is a state descriptor of a space, MSTATE is a descriptor of a psychological state, PCONFIG is the physical relationship between objects or between an object and space and covers-verbs expressing "John is in Tokyo.", "The book is on the table.", "Delhi is in India." and the like. WANT is a state descriptor of the driving forces.

Figure 44:
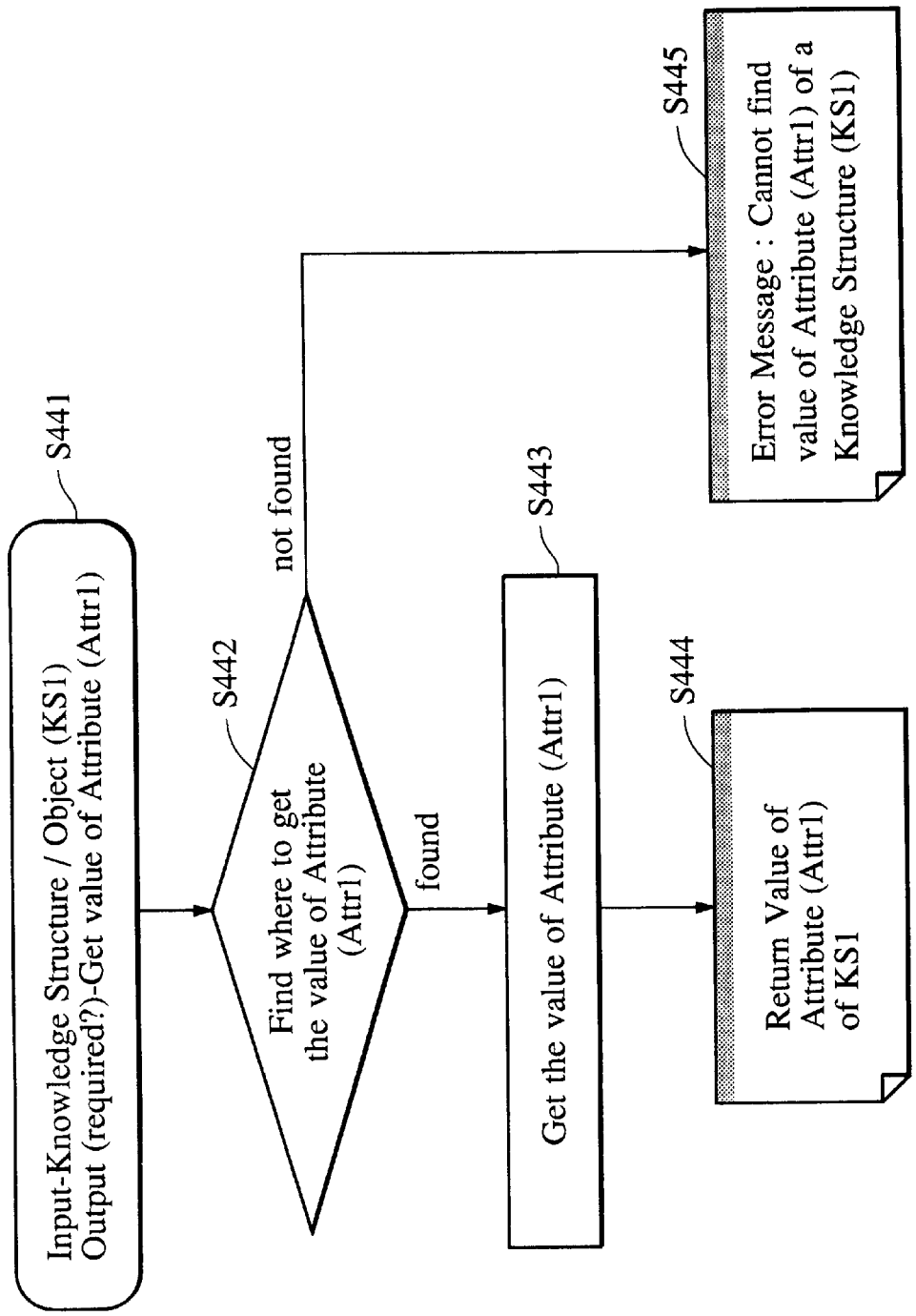
FIG. 44 is a flow chart for detecting a specific attribute value of a certain fact.
Figure 45:
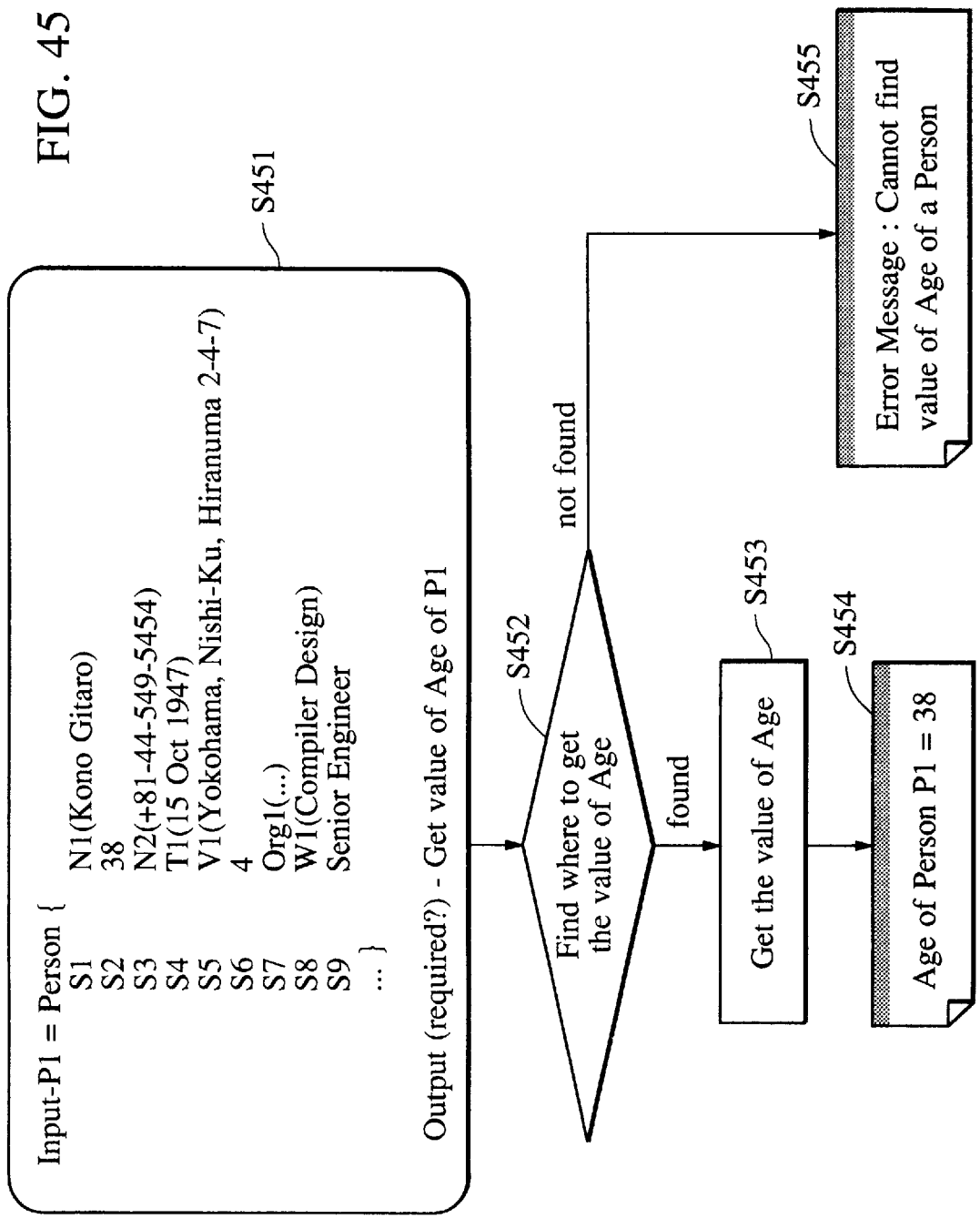
FIG. 45 is a flow chart of a process for detecting the age from a knowledge structure of a person.

A procedure for acquiring required information from the knowledge base 24 will now be described. FIG. 44 is a flow chart for detecting an attribute value of a fact. Knowledge structure KS1 is input to the system and the value of attribute Attr1 is required as an output (step S441). While using knowledge about the knowledge structure of the knowledge base 24, a portion (a slot) in the knowledge structure KS1, from which the attribute Attr1 can be acquired, is detected (step S442). If the slot could be found, the value of the attribute Attr1 is acquired to return it to the requester (steps S443 and S444). If no slot could be found, an error message is returned (step S445). FIG. 45 is a flow chart of an example for inputting knowledge structure P1 of a person and requiring the age of the person. As shown in FIG. 14A, since the age is in slot S2, the values in the slot S2 are searched for and output.

Figure 46:
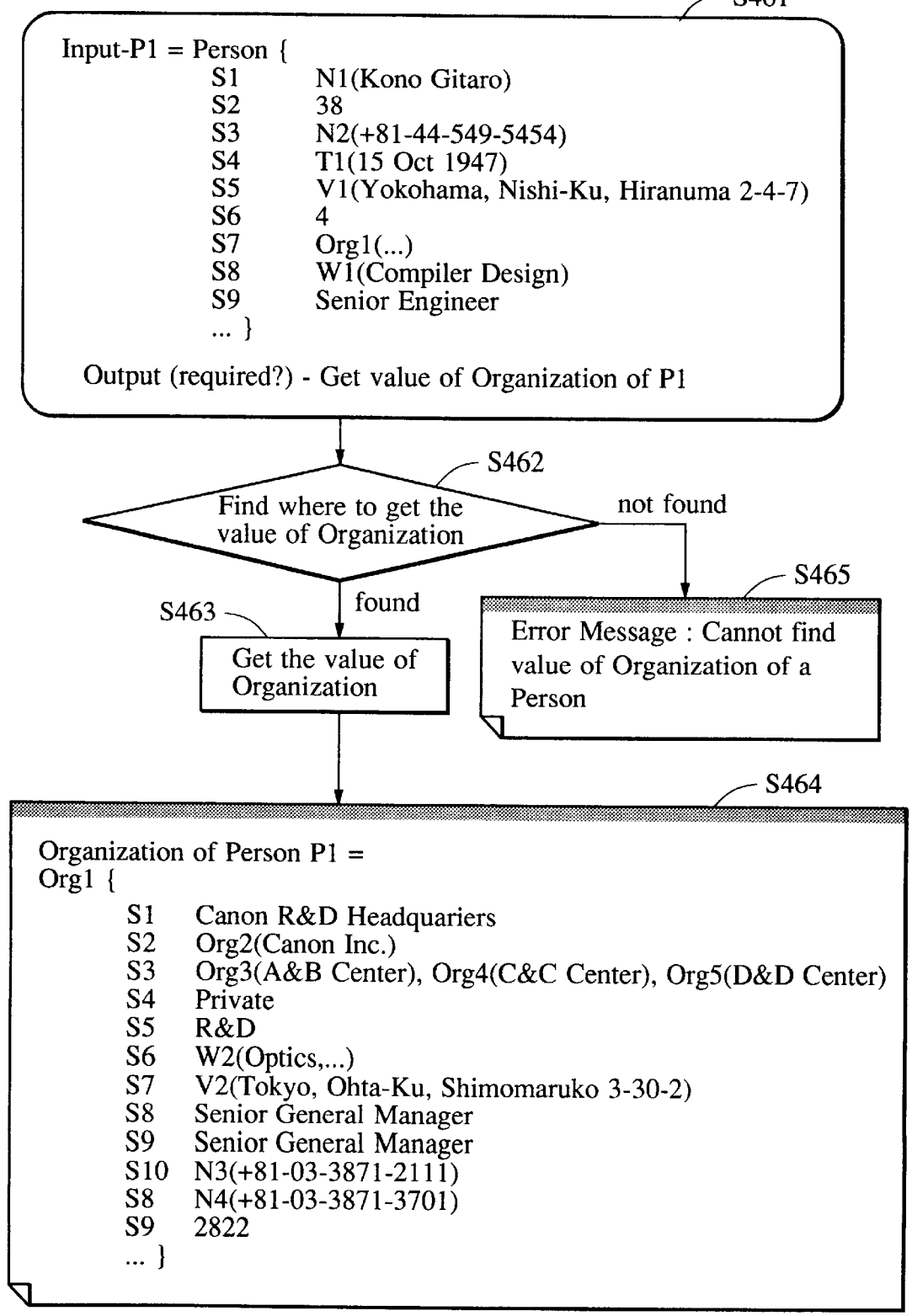
FIG. 46 is a flow chart of a process for making a reference to and searching for another knowledge structure in accordance with a given knowledge structure.

FIG. 46 is a flow chart of a case where a reference to another knowledge structure is made in accordance with a given knowledge structure. In this case, knowledge structure P1 of the same person is input to require the organization in accordance with the flow chart. As shown in FIG. 14A, since organizations are contained in slot S7 and the value in the slot S7 is a pointer to the knowledge structure org1 of the organization, the knowledge structure org1 is searched for and output.

Figure 47:
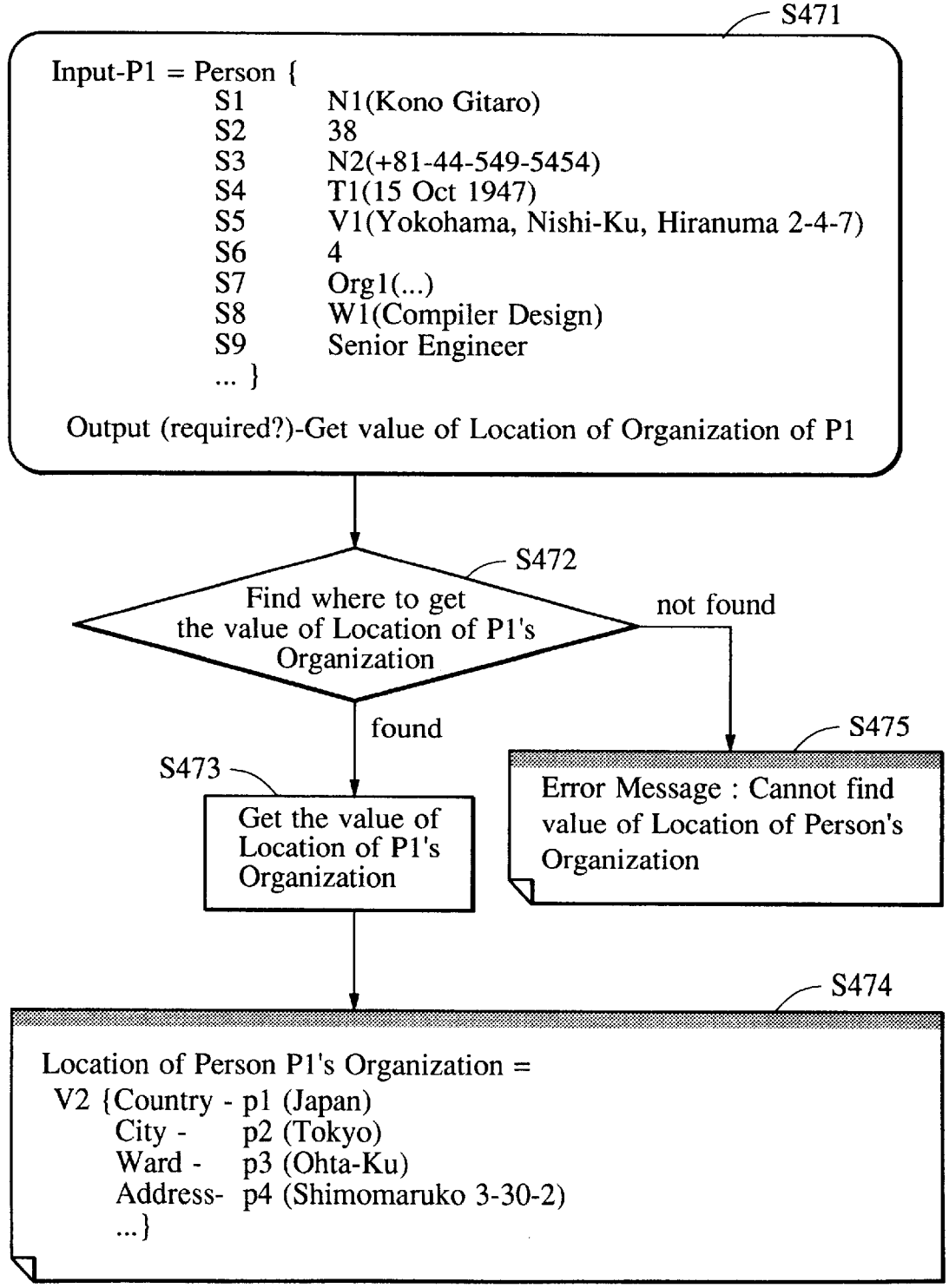
FIG. 47 is a flow chart of a process for detecting a place of an organization to which a person belongs in accordance with the knowledge structure of a person.

FIG. 47 is a flow chart of a case where a reference to the attribute of another knowledge structure is made in accordance with a given knowledge structure. In this case, the knowledge structure P1 of the same person as in the foregoing case is input to require the place of the organization to which the person belongs. Since the organization is in the slot S7 and the value in the slot S7 is a pointer for the knowledge structure Org1 as shown in FIG. 1A, the knowledge structure Org1 is searched for. Since the place is in the slot S7 of the knowledge structure of the organization and the value in the slot S7 of the knowledge structure Org1 is a pointer for the knowledge structure V2 of Venue as shown in FIG. 18A, the knowledge structure V2 is searched for and output.

Figure 48:
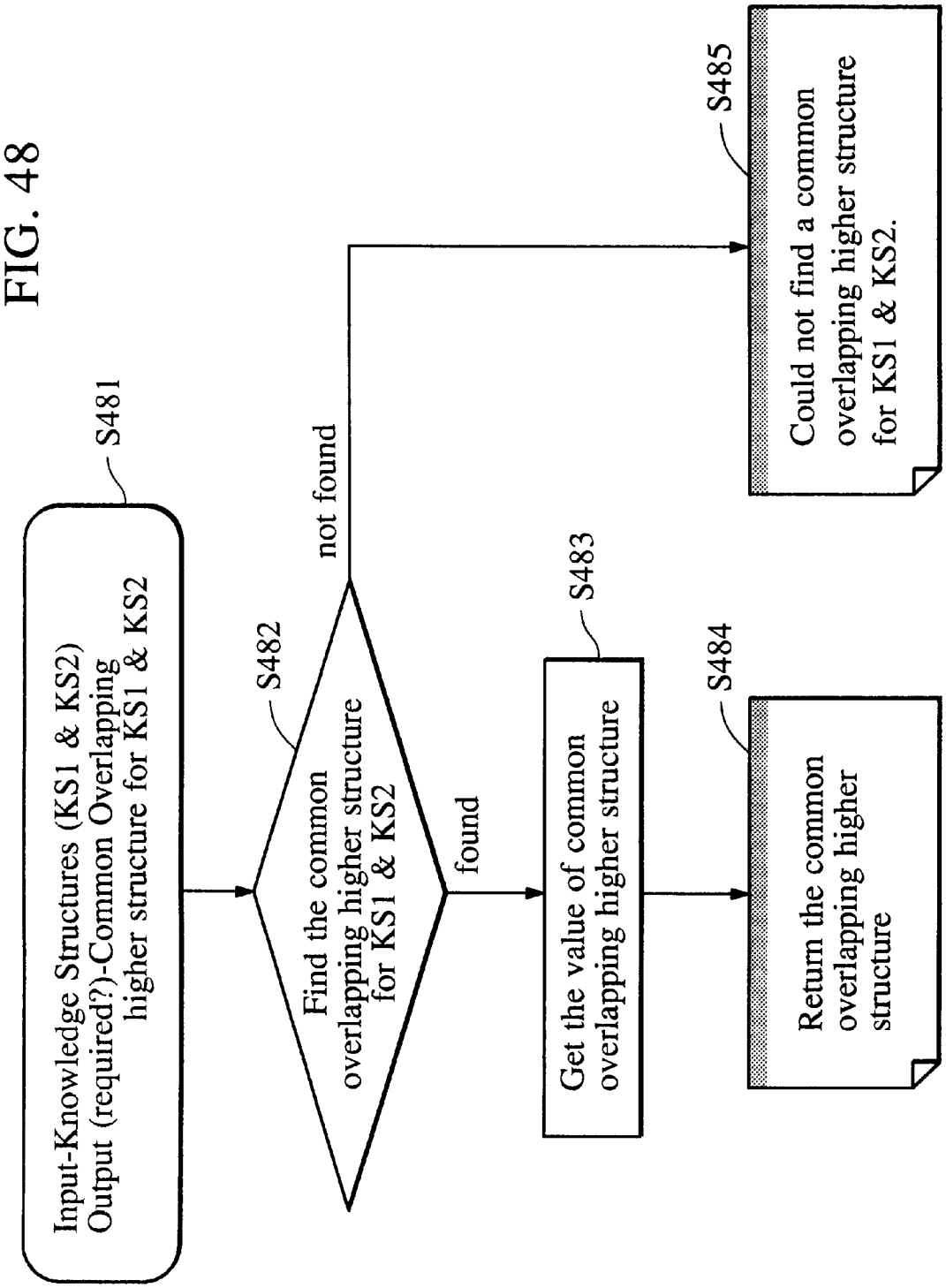
FIG. 48 is a flow chart of a process for detecting a structure common to and upper than two or more knowledge structures.
Figure 49:
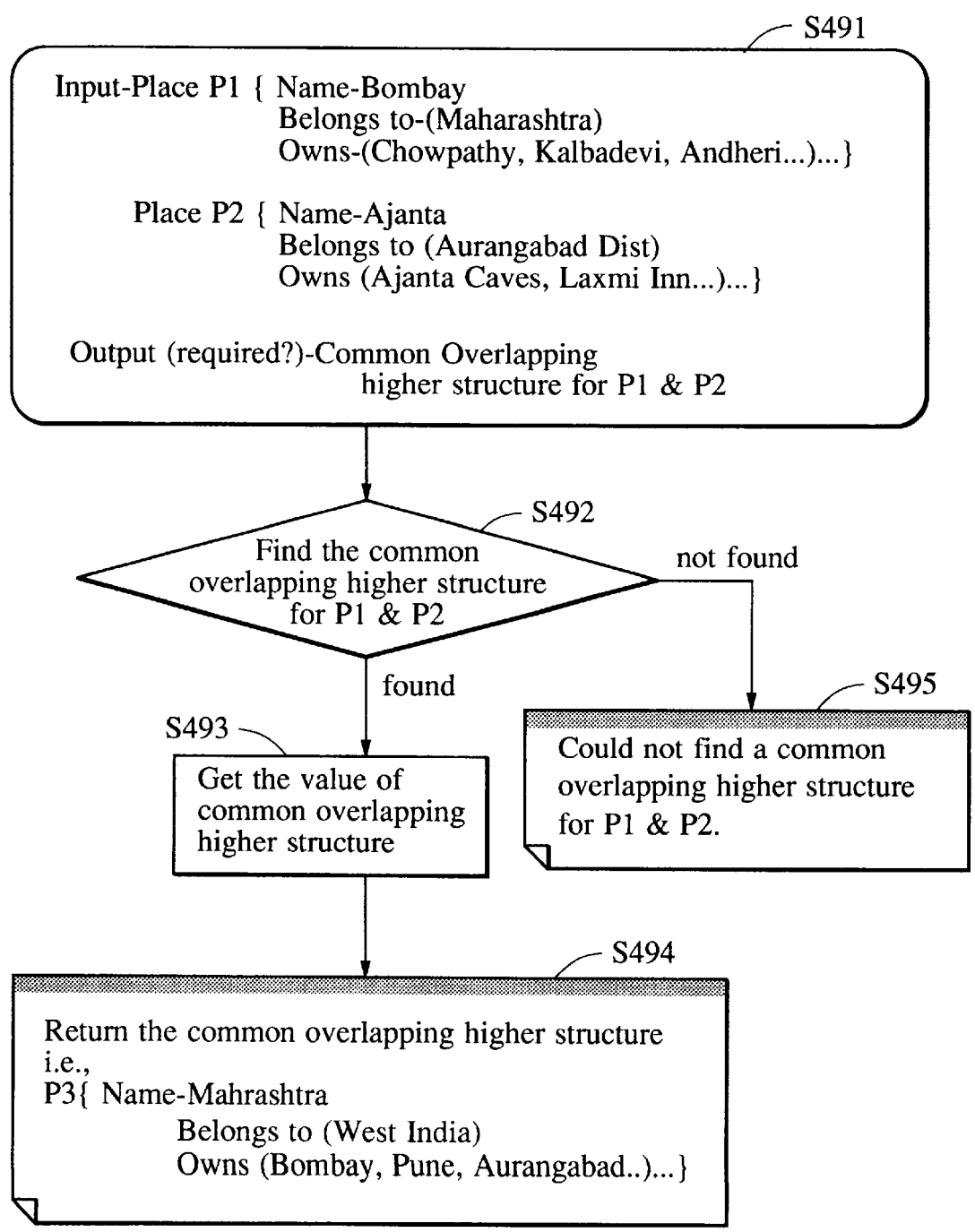
FIG. 49 is a flow chart of a process for detecting a structure common to and upper than knowledge structures of two or more places.
Figure 50A:
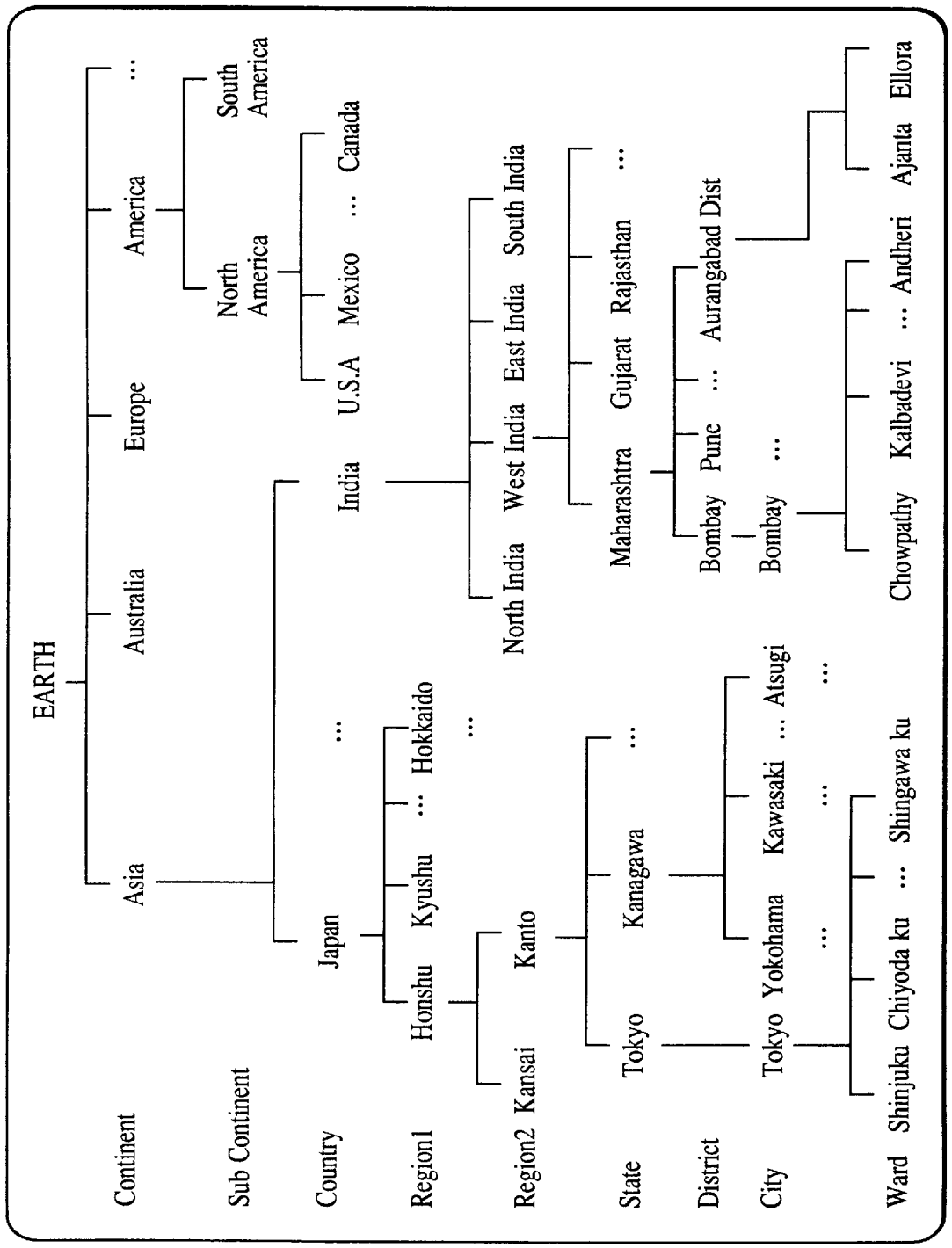

FIG. 48 is a flow chart for detecting the upper structure common to two or more knowledge structures. Knowledge structures KS1 and KS2 are input to the system and an upper structure commonly covering the knowledge structures KS1 and KS2 is required as the output (step S481). While using the knowledge about the knowledge structure of the knowledge base 24, slot "belongs to" in each of the knowledge structures KS1 and KS2 is acquired. By using the acquired value, fetching to a knowledge structure which becomes parent is performed. Similarly, slot "owns" is used to perform fetching to a structure, which becomes a child. Matching of the structures concerning the knowledge structures KS1 and KS2 is examined to acquire a common and upper structure (step S482). If a common structure could be found, the structure is acquired to return it to the requester (steps S483 and S484). If no common structure could be found, an error message is returned (step S485). FIG. 49 is a flow chart of a specific example in which knowledge structures P1 and P2 of the place are input and a common and upper structure is required. Since the place has a hierarchy as shown in FIG. 50A, passing through the slots "belongs to" and "owns" enables common and upper structure P3 is acquired and output.

As described above, the knowledge structure provided with the slots "belongs to" and "owns" enables the upper structure common to the knowledge structures of the two places to be specified. Therefore, in a case where, for example, a letter about a visit is written with a letter writing system, a convenience can be obtained in a case where a sentence processing rule is employed in accordance with the distance from the address of a sender and that of a receptor. In a case where a query is made in a dialogue as shown in FIG. 50B, the upper structure common to the knowledge structures of the two places is examined to specify the conclusive and positional relationships so that a response as shown in FIG. 50B can be performed.

Figure 51:
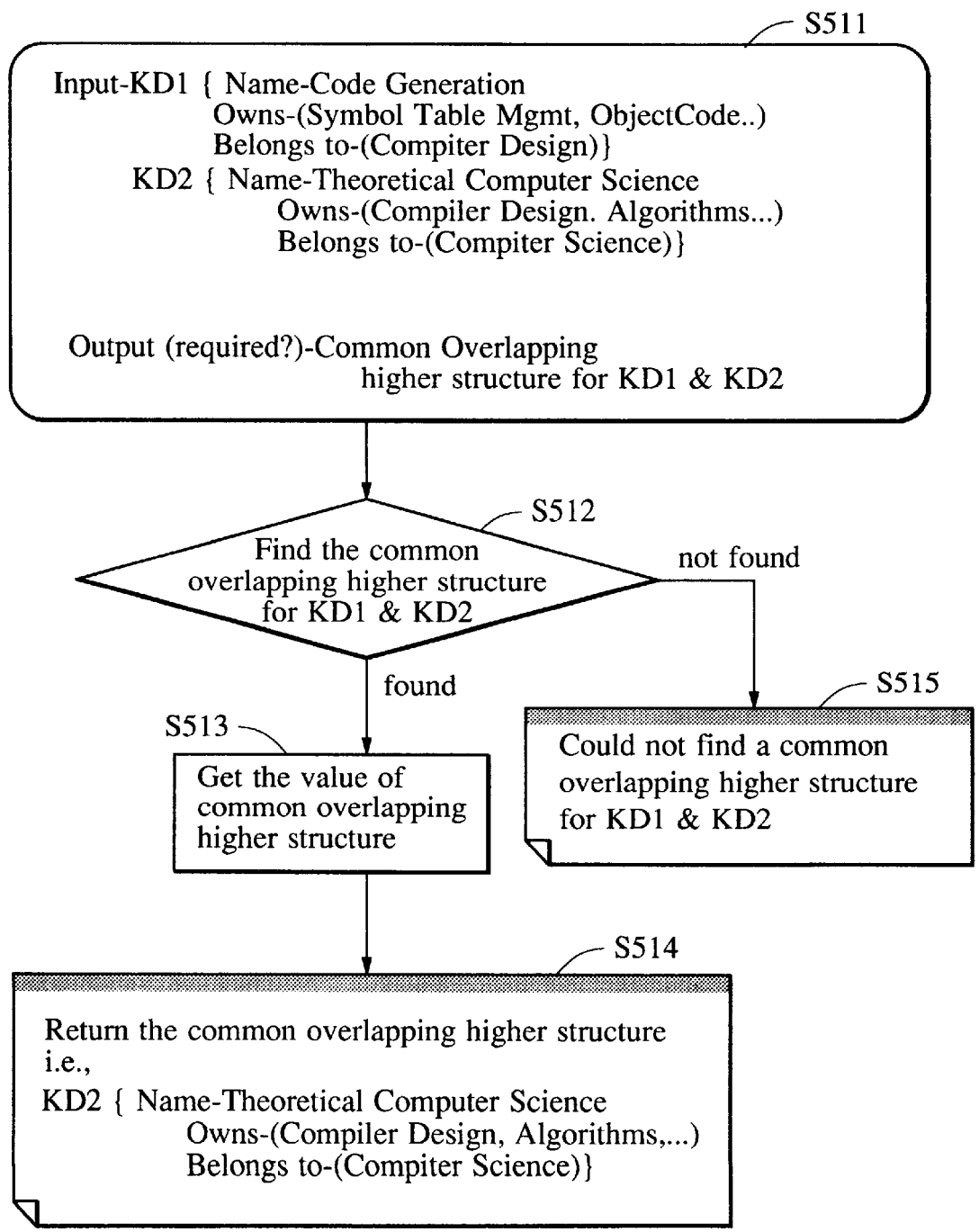
FIG. 51 is a flow chart of a process for detecting a structure common to and upper than two knowledge domains.

FIG. 51 is a flow chart of another example for detecting an upper structure common to two knowledge structures such that an upper structure common to two knowledge domains KD1 and KD2 is acquired. Since the knowledge domain has a hierarchy as shown in FIG. 20, passing through the slots "belongs to" and "owns" enables the knowledge domain KD2 to be acquired as a common and upper structure so as to be outputted.

As described above, the knowledge structure provided with the slots "belongs to" and "owns" enables the upper structure common to the knowledge structures of the two knowledge domains to be specified. Therefore, in a case where the work of the user is, with a letter writing system reviewed to a person the user does not know well, the degree of the description can be determined in accordance with the result of a comparison between the work of the user and that of the receiptor. If the common knowledge domain is in a very high hierarchy, a determination is performed that common points between the two persons are few and detailed description cannot be understood by the receiptor. If the common knowledge domains considerably approximate, it is important to describe the details of the work in view of causing the receiptor to be interested in the user. If the contents of the works approximate, names of concerning facts, for example, the name of a meeting can be expressed by abbreviated designations. To examine the upper structure common to the knowledge structures of the organization enables a determination of the hierarchy at which the organizations, to which the two persons belong, are different from each other, to be performed.

If a query "What is a journal ?" is made, an answer "Journal is a type of written material which is periodical and deals with one specialized knowledge domain." can be made in accordance with the classification of the knowledge as shown in FIG. 12.

Figure 52:
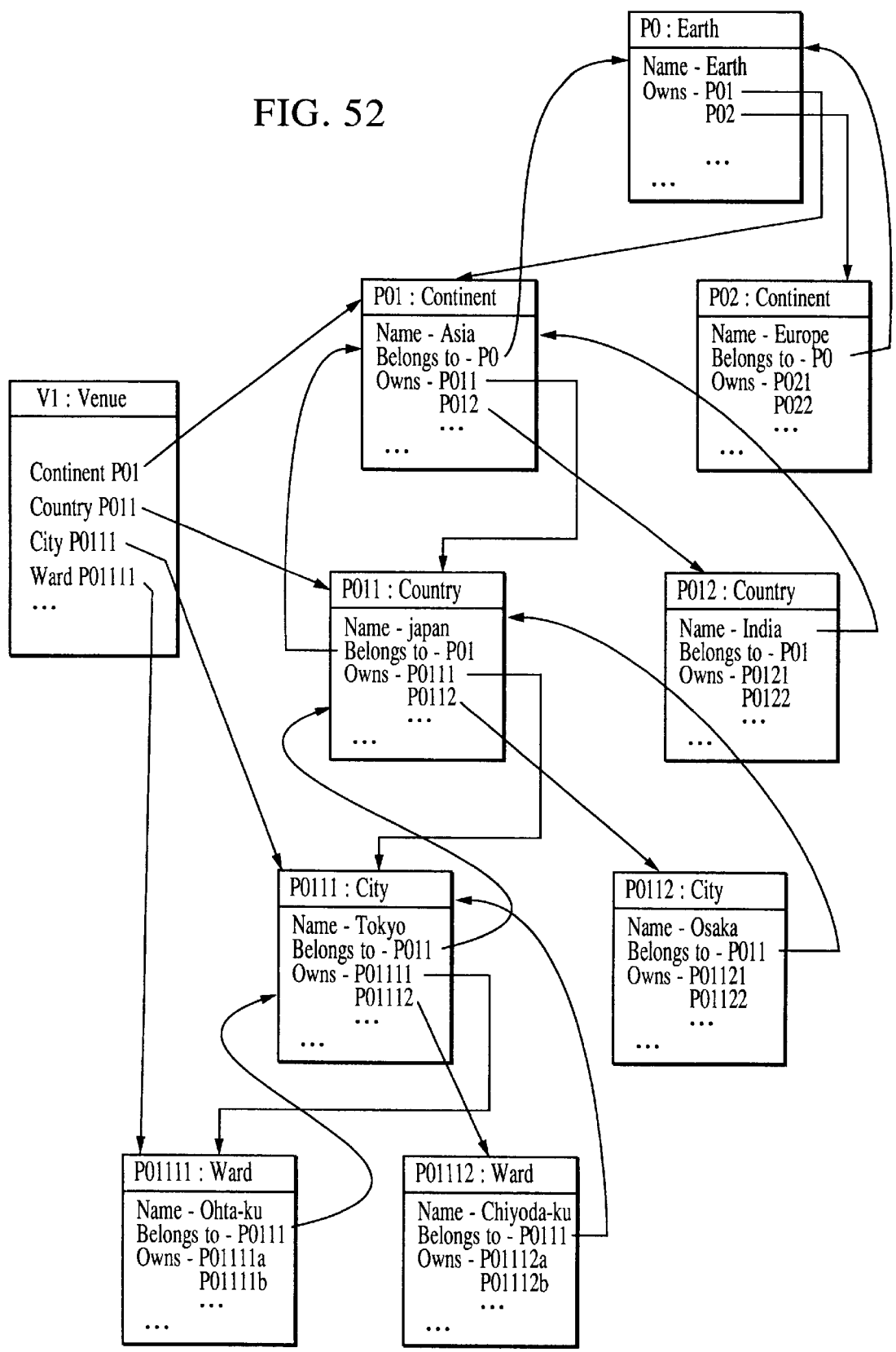
FIG. 52 shows the relationship between a knowledge structure of a certain Venue and another knowledge structure.

In the case where the slot for the knowledge structure (see FIG. 23) of Venue is a pointer for another structure as shown in FIG. 52 in the case described with reference to FIG. 47, a reference can be made to the pointed structure and reference to upper and lower structures can be performed in accordance with the slot "belongs to" and "owns".

The structure and a method of searching for the dictionary 33, which is the linguistic knowledge base, will now be described.

Figure 53:
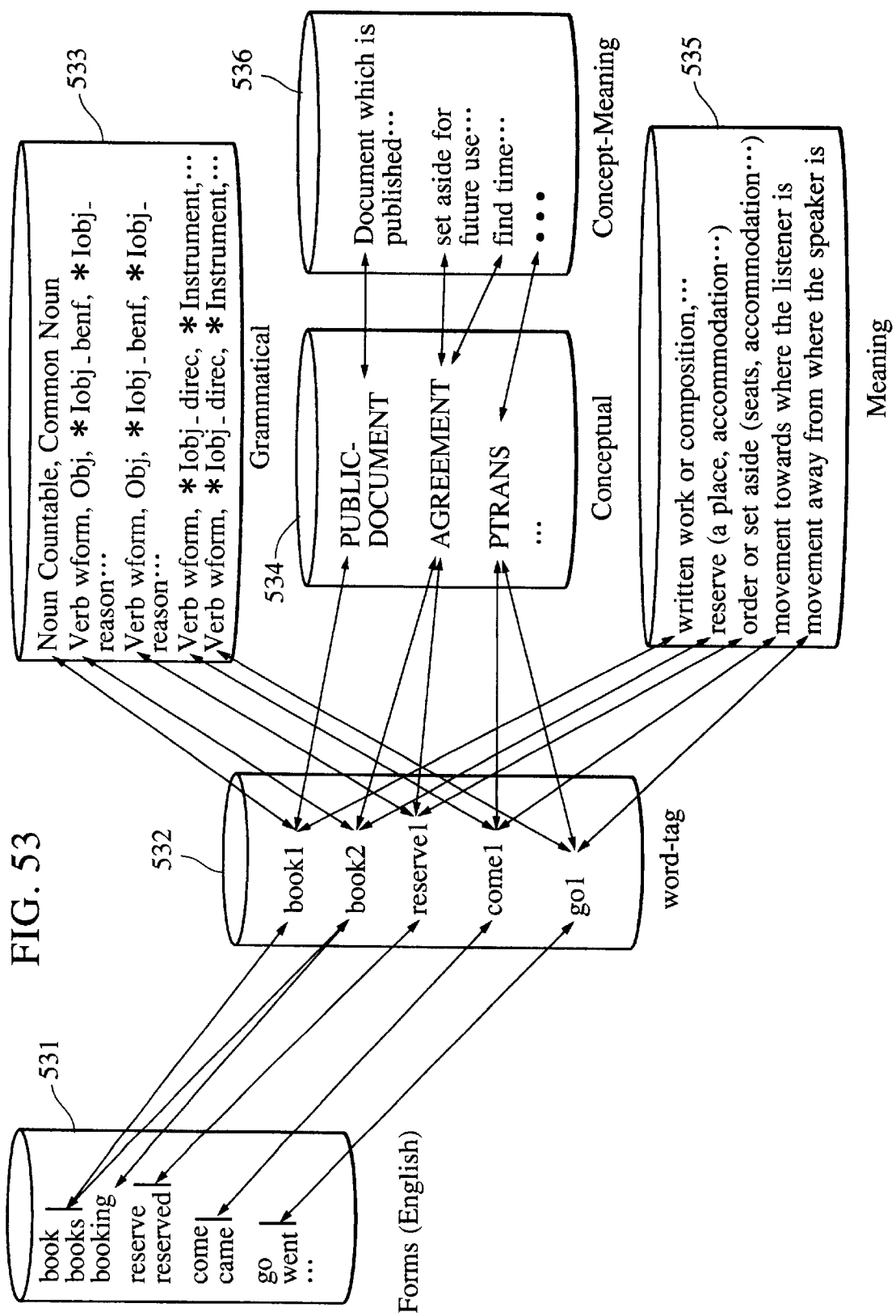
FIG. 53 is a block diagram showing the structure of a dictionary according to the embodiment of the present invention.

FIG. 53 is a block diagram showing the structure of the dictionary 33. A form portion 531 stores word groups in a variety of expression forms employed in the sentences written in a natural language. In a word tag portion 532, one word tag corresponds to one meaning of a word. In a grammar portion 533, grammar information of each word is written. In a concept portion 534, the concepts of words are written. In a meaning portion 535, meanings of words are written. Each word tag is correlated to a word in the form portion 531, the meaning in the grammar portion 533, the concept in the concept portion 534 and the meaning in the meaning portion 535. A concept meaning portion 536 is correlated to the concept in the concept portion 534 In the foregoing dictionary, different word tags are assigned to different meanings of one word and one meaning corresponds to one word tag. Therefore, since an English word "book" has two meanings, two word tags correspond to the word "book" such that a word tag for a noun, the meaning of which is an object formed by binding paper sheets on which an article has been written, and a word tag for a verb, the meaning of which is to reserve something, correspond to the same.

Figure 54:
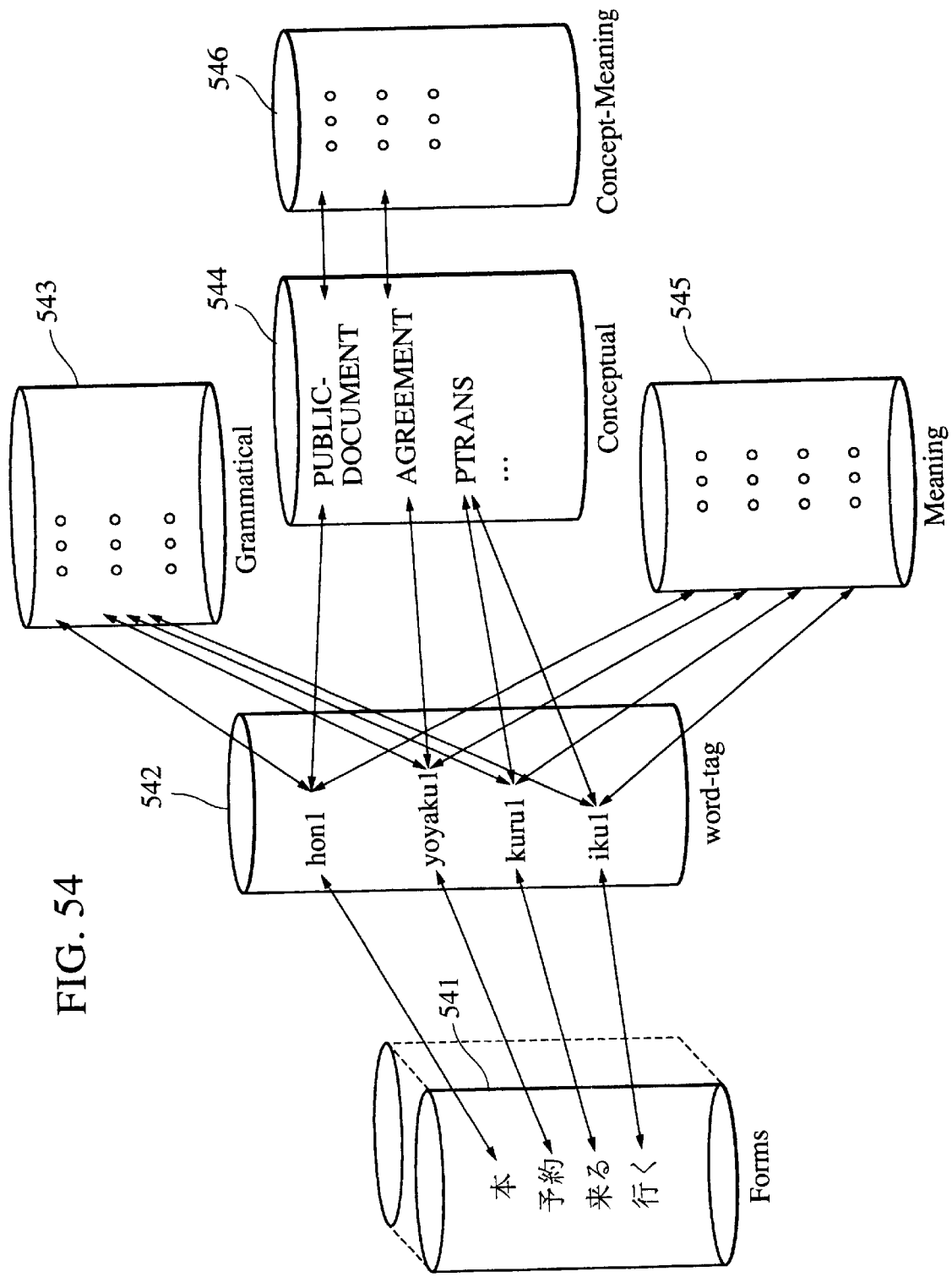
FIG. 54 is a block diagram showing the structure of a Japanese dictionary.

FIG. 54 is a block diagram showing the structure of a Japanese dictionary.

A form portion 541 stores Japanese word groups in a variety of expression forms employed in the sentences written in a natural language. In a word tag portion 542, one word tag corresponds to one meaning of a word. In a grammar portion 543, grammar information of each Japanese word is written. In a concept portion 544, the concepts of words are written. In a meaning portion 545, meanings of words are written. Each word tag is correlated to a word in the form portion 541, the meaning in the grammar portion 543, the concept in the concept portion 544 and the meaning in the meaning portion 545. A concept meaning portion 546 is correlated to the concept in the concept portion 544. Although the form portion 541, the word tag portion 542, the grammar portion 543 ad the meaning portion 545 are peculiar to the language, the concept portion 544 and the concept meaning portion 546 can be made to be common to a plurality of languages. Thus, a plurality of languages can be made to correspond to one another.

FIG. 55 shows an example of the structure of the form portion 531. The form portion 531 has a structure in which words, word tags and grammar forms are made to correspond to one another. As the grammar form, verbs have PASTFORM (past form), PRESFORM (present form), and PROGFORM (progressive form). In the case of a noun, SINGULAR and PLURAL are provided. In the case of a pronoun, SUBJECTIVE and OBJECTIVE are provided. Another category may be provided. In the case of a noun for example, classifications may be performed between countable nouns and uncountable nouns and between common nouns and proper nouns.

Since the conjugated forms of verbs are mainly formed in accordance with fixed rules, only verbs which are specially conjugated against the rules may be stored in the form portion. FIG. 56 shows the rules. Also as for the plural forms of nouns, only exceptions of the rules may be stored. Moreover, the foregoing dictionary contains differences between British English and American English and between colloquial expressions and literary style.

FIG. 57 shows an example of the grammar portion 533. The grammar portion 533 stores information, which is syntax about each word, and information about the position of the word when it is used in a sentence written in a natural language. For example, a plurality of position information items are stored to be adaptable to the active voice, the passive voice or the crucial point of the description in the case of a verb. In the case of a noun, the structure of a noun phrase is determined depending upon the crucial point or the important point. The position information specifies the sequential order in which the required attribute of the concept of the word must be written. For example, position information of a verb "go" is Actor, wform, and "Iobj_direc. Therefore, each slot is determined to be Actor (because the position information is Actor) and Verb (because the form is wform). The objective direction (specified by Iobj_direct) appears in only the foregoing sequential order. Symbol " represents a preposition case marker which indicates that the subject slot has a preposition. The preposition is specified in accordance with the rule for the preposition.

In the form of a noun, a noun, for example, "discussion" tacitly indicates an action and requires information of a slot for a verb derived from the foregoing word, that is "discuss". Entry of a noun of the foregoing type is performed such that a word tag of the corresponding verb is stored.

FIG. 58 shows an example of the concept portion 534. Since the concept portion 534 is a mapping from a word tag to a concept and each word tag has one concerning concept, the mapping is in the form of a multiplicity to one. Thus, reciprocal mapping requires a rule or a condition. The foregoing rule attains information for limiting a variety of slots in the knowledge structure of the concept to indicate a specific word tag. The limitation includes a limitation for filling a slot or a limitation about the type of the concept that can be taken by a specific slot. Since the rule is formed to correspond to a specific concept type, each word tag has a unique rule. The rules are arranged in such a manner that the two rules can be distinguished from each other if word tags corresponding to two different concepts reach one word.

The sequential order of the rules is arranged from a rule for a specific concept to a general concept. For example, a rule for "come" is special as compared with that for "go" and the rule for "come" is given priority. For example, a generating portion of a natural language processing system has a structure such that when access is made to a dictionary in accordance with the type of a concept, it extracts a row having a column, which coincides with the type of the concept to perform a selection from the row in accordance with the rule. The word tag of the extracted row is used to access another dictionary. An analyzing portion of the natural language processing system is used to access the dictionary with the word tag to take a rule of a row having the foregoing word tag so as to use the rule to generate a request with respect to the slot of the concept.

FIG. 59 shows an example of the meaning portion 535. The meaning portion 535 stores three meanings and usages of words each having a word tag. A synonym dictionary and an antonym dictionary have similar structures. FIG. 60 shows the structure of "Public Document".

Figure 61:
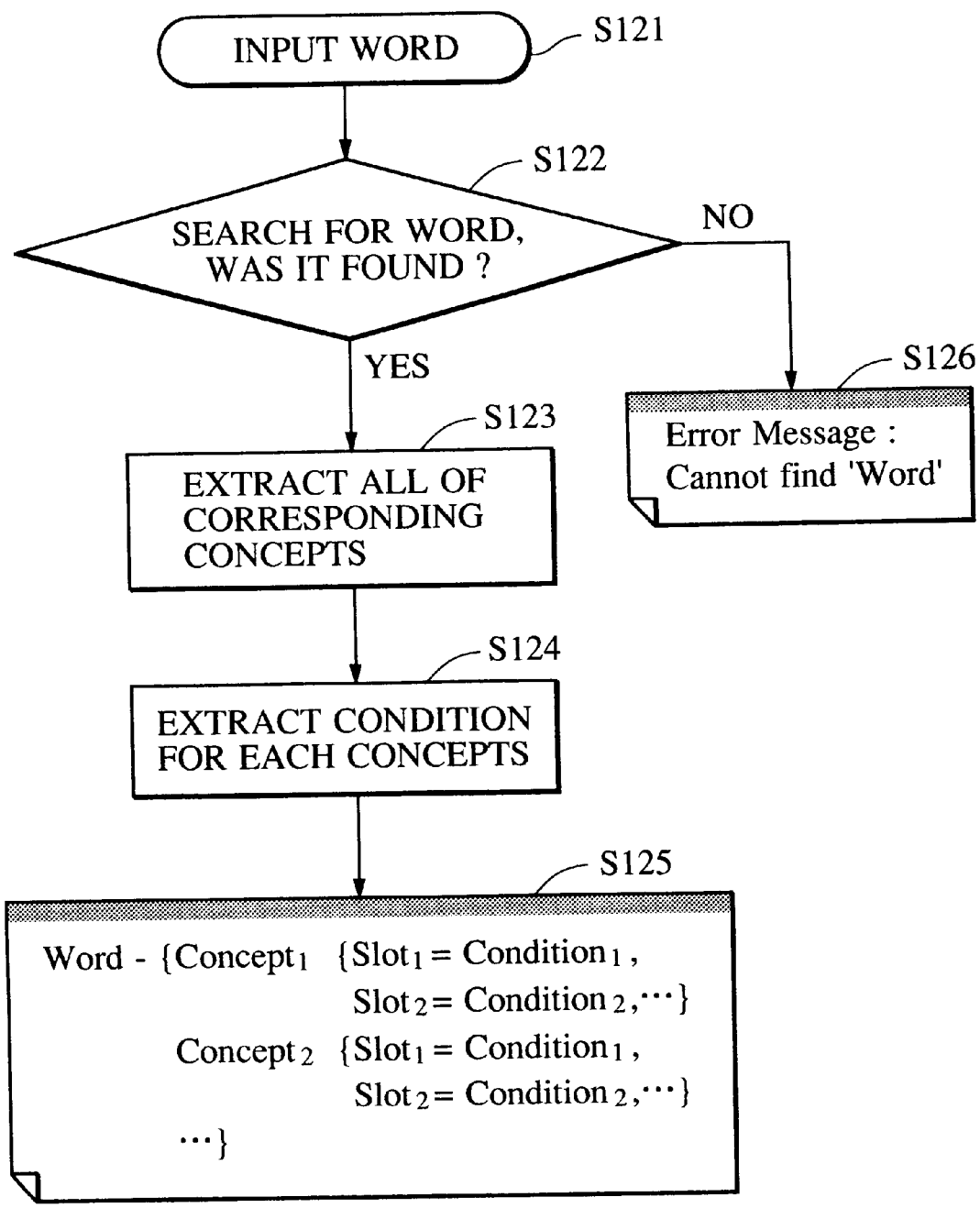
FIG. 61 is a flow chart of a process for searching for a concept corresponding to a word.

A procedure for searching for the contents of the foregoing dictionary will now be described. FIG. 61 is a flow chart of a process for searching for a concept corresponding to a word.

In step S121 a word in a natural language is input to the system to set an output of a concept. In step S122 the form portion 531 of the dictionary 33 is searched for to detect an inputted word. If the word could be found, all concepts corresponding to the word tags in the form portion 531 are extracted from the concept portion 534 in step S123. In step S124 conditions for the extracted concepts are extracted. In step S125 the concepts and conditions are output If the word could not be found in step S122, an error message is displayed in step S126.

Figure 62:
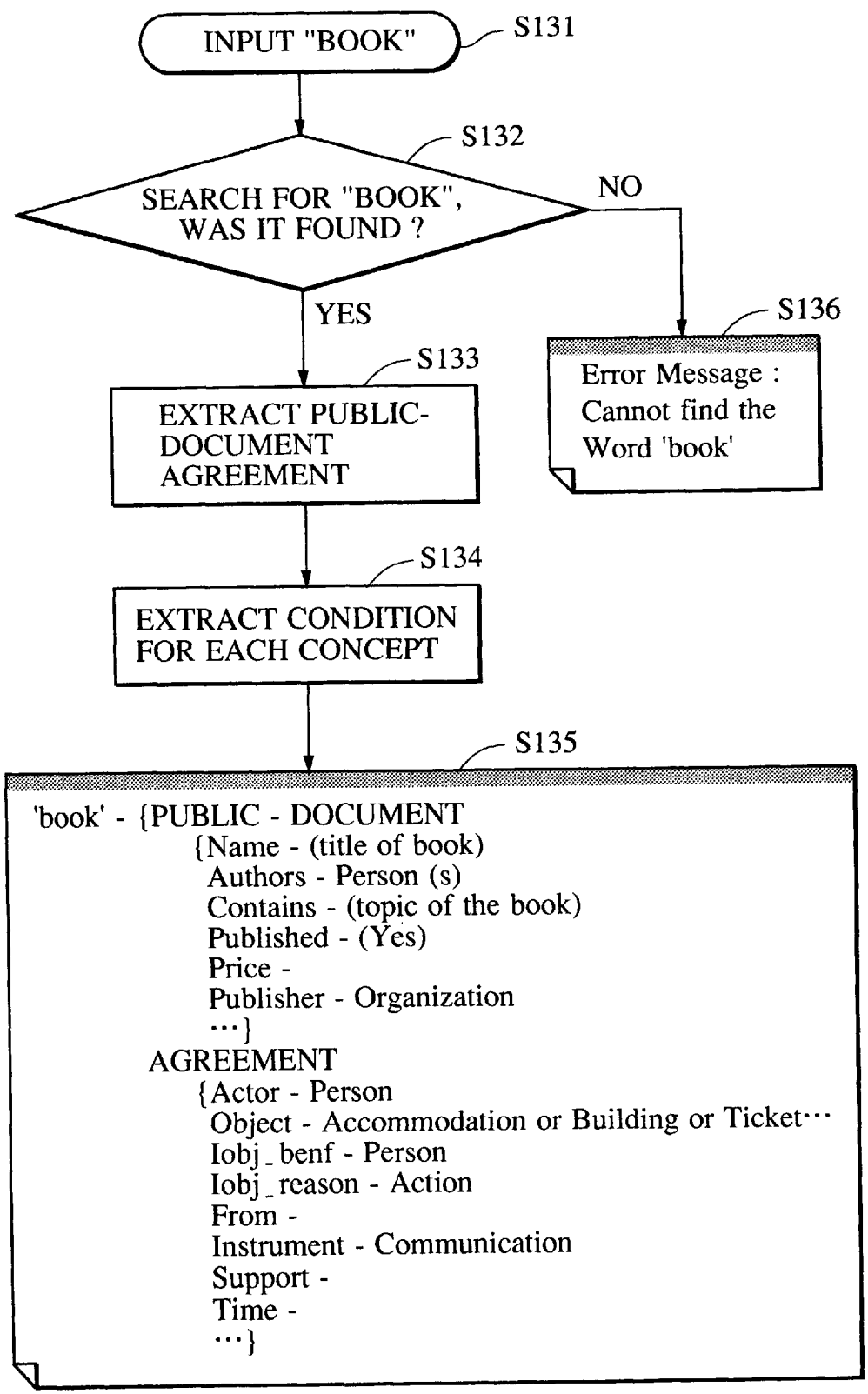
FIG. 62 is a flow chart of a process for searching for a concept corresponding to a word "book"

The procedure for searching for the contents of the foregoing dictionary will now be described specifically. FIG. 62 is a flow chart of a process for searching for a concept corresponding to a word "book". In step S131 the word "book" input to the system and output of the concept is set. In step S132 the form portion 531 of the dictionary 33 is searched for to detect the inputted word "book". Since two word tags book1 and book2 are provided as shown in FIG. 55, PUBLIC-DOCUMENT AND AGREEMENT, which are concepts corresponding to the respective word tags, are extracted from the concept portion 534 in step S133. In step S134 conditions for the respective concepts are extracted from the knowledge structure and the dictionary 33 shown in FIGS. 60 and 38. In step S135 the concepts and the conditions are outputted. If no word could be found in step S132, an error message is displayed in step S136.

Figure 63:
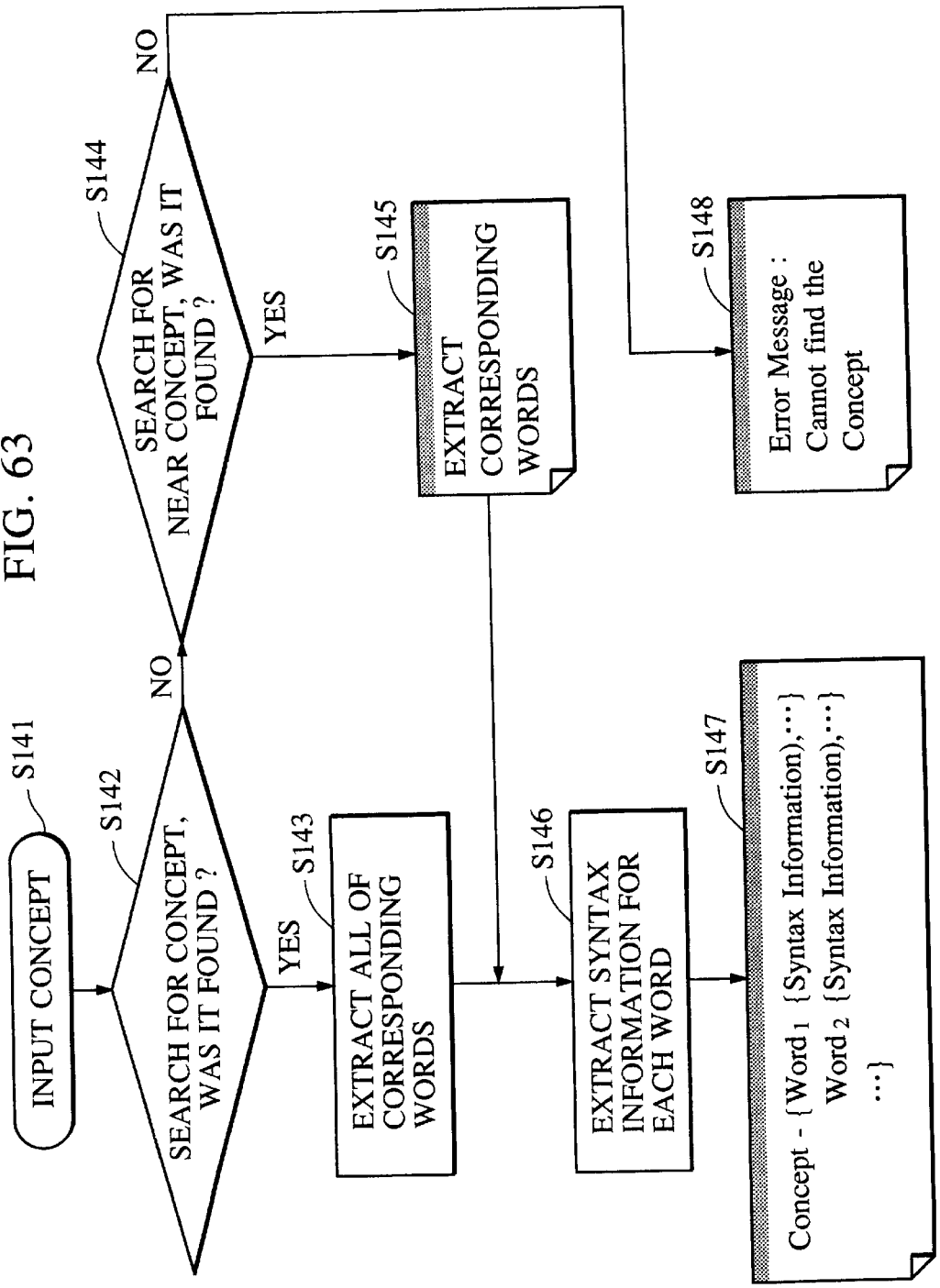
FIG. 63 is a flow chart of a process for searching for a word corresponding to a concept.

FIG. 63 is a flow chart of a process for searching for a word corresponding to a concept. In step S141 a concept expressing the word is inputted to the system to set an output of the corresponding word in a natural language. In step S142 the concept portion 534 of the dictionary 33 is searched for to detect the inputted concept. If the concept could be found, all words corresponding to the word tag in the concept portion 534 are extracted from the form portion 531 in step S143. If the inputted concept could not be found in the concept portion 534, a concept near the inputted concept is searched for in step S144. In step S145 corresponding words are extracted from the form portion 531 In step S146 syntax information corresponding to the word tag of the extracted word is extracted from the grammar portion 533. In step S125 the word and the syntax information are outputted. If no concept near the inputted concept could not be found in step S144, an error message is displayed in step S148.

Figure 64:
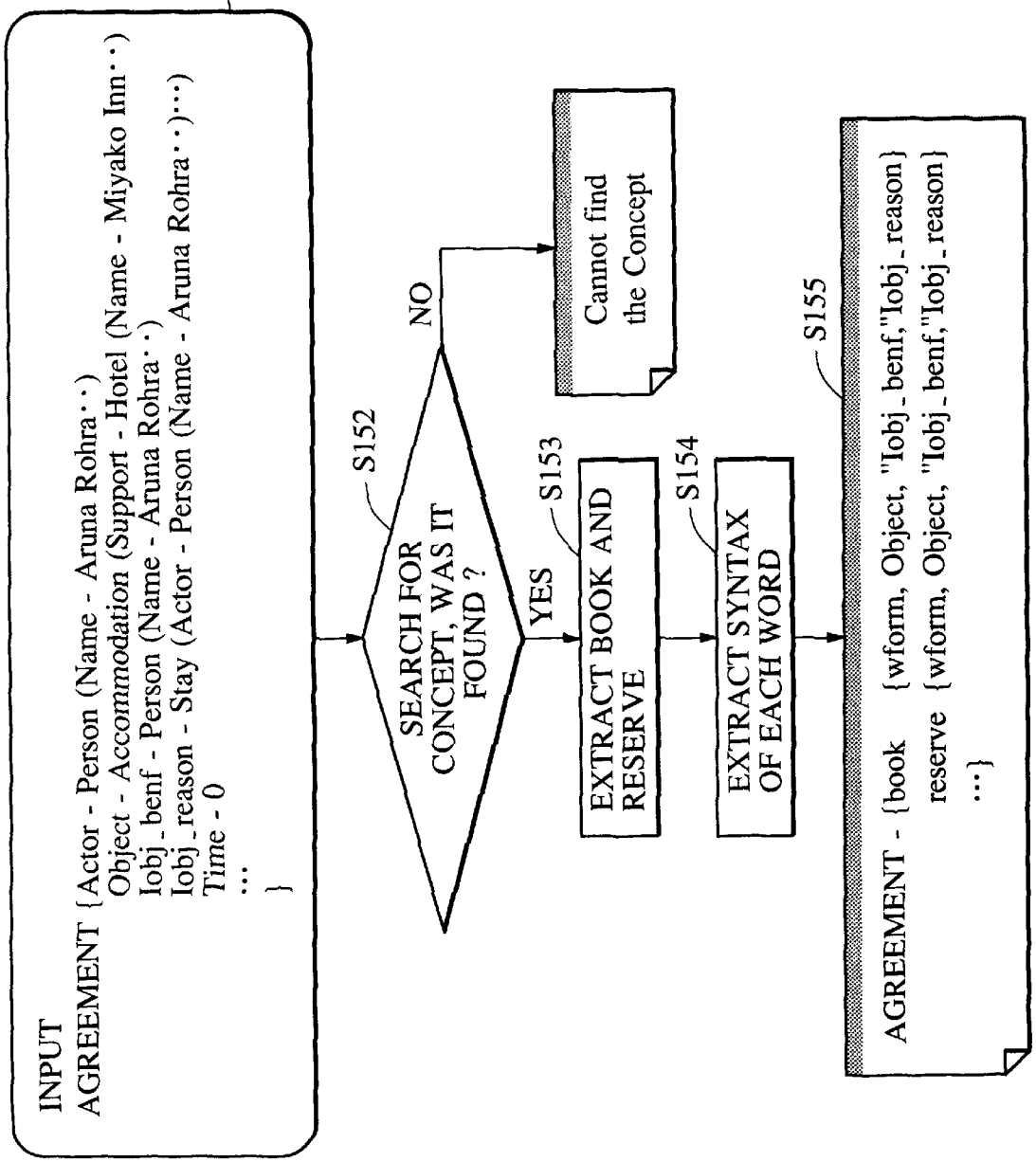
FIG. 64 is a flow chart of a process for searching for a word corresponding to concept "AGREEMENT"

FIG. 64 is a flow chart of a process for searching for a word corresponding to concept "AGREEMENT". In step S151 the concept "AGREEMENT" and conditions are inputted to the system to set an output of a word. In step S152 the concept portion 534 of the dictionary 33 is searched for to search for the inputted concept "AGREEMENT". Since a multiplicity of concepts "AGREEMENT" exist as shown in FIG. 58, two word tags book2 and reserve1 satisfy the conditions. In step S153 words "book" and "reserve" corresponding to the respective word tags are extracted from the form portion 531. In step S154 syntax information for each word is extracted from the grammar portion 533 shown in FIG. 57 in accordance with the word tag. In step S155 the words and syntax information are outputted. If no concept could be found in step S152, an error message is displayed in step S156.

Figure 65:
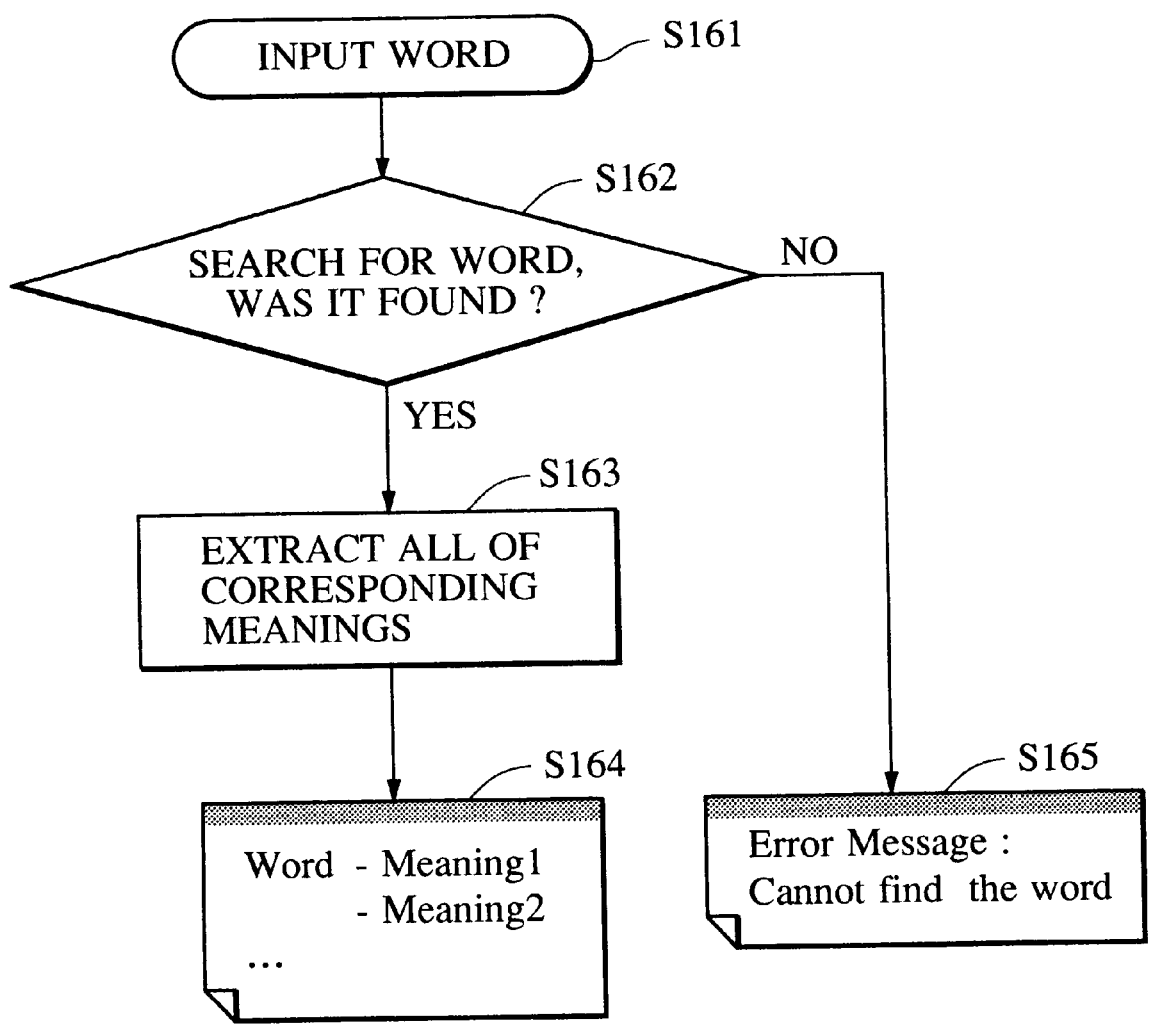
FIG. 65 is a flow chart of a process for searching for a meaning corresponding to a word.

FIG. 65 is a flow chart of a process for searching for the meaning of the word. In step S161 a word in a natural language is inputted to the system to set an output of a meaning. In step S162 the form portion of the dictionary is searched for to search for the inputted word. If the word could be found, all meanings corresponding to the word tag in the form portion are extracted in step S163. In step S164 the extracted meanings are outputted. If no word could be found in step S162, an error message is displayed in step S165.

Figure 66:
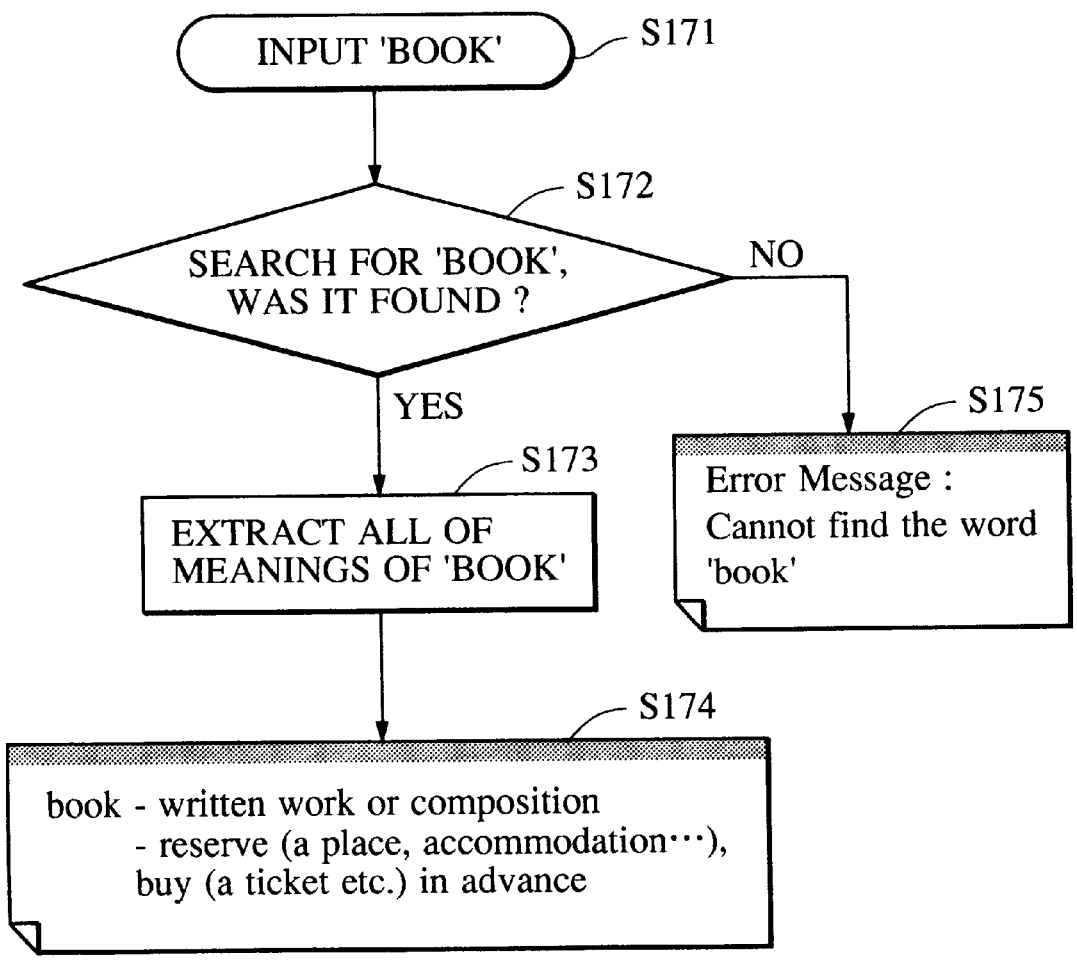
FIG. 66 is a flow chart of a process for searching for a meaning corresponding to the word "book"

FIG. 66 is a flow chart of a process for searching for a meaning corresponding to the word "book". In step S171 the word "book" is inputted to the system to set an output of a meaning. In step S172 the form portion 531 of the dictionary 33 is searched for to search for the inputted word "book". Since the word "book" has two word tags book1 and book2 as shown in FIG. 4, meanings corresponding to the word tags are extracted from the meaning portion 535 shown in FIG. 59 in step S173. In step S174, the meanings are outputted. If the word "book" could not be found in step S172, an error message is displayed in step S175.

Figure 67:
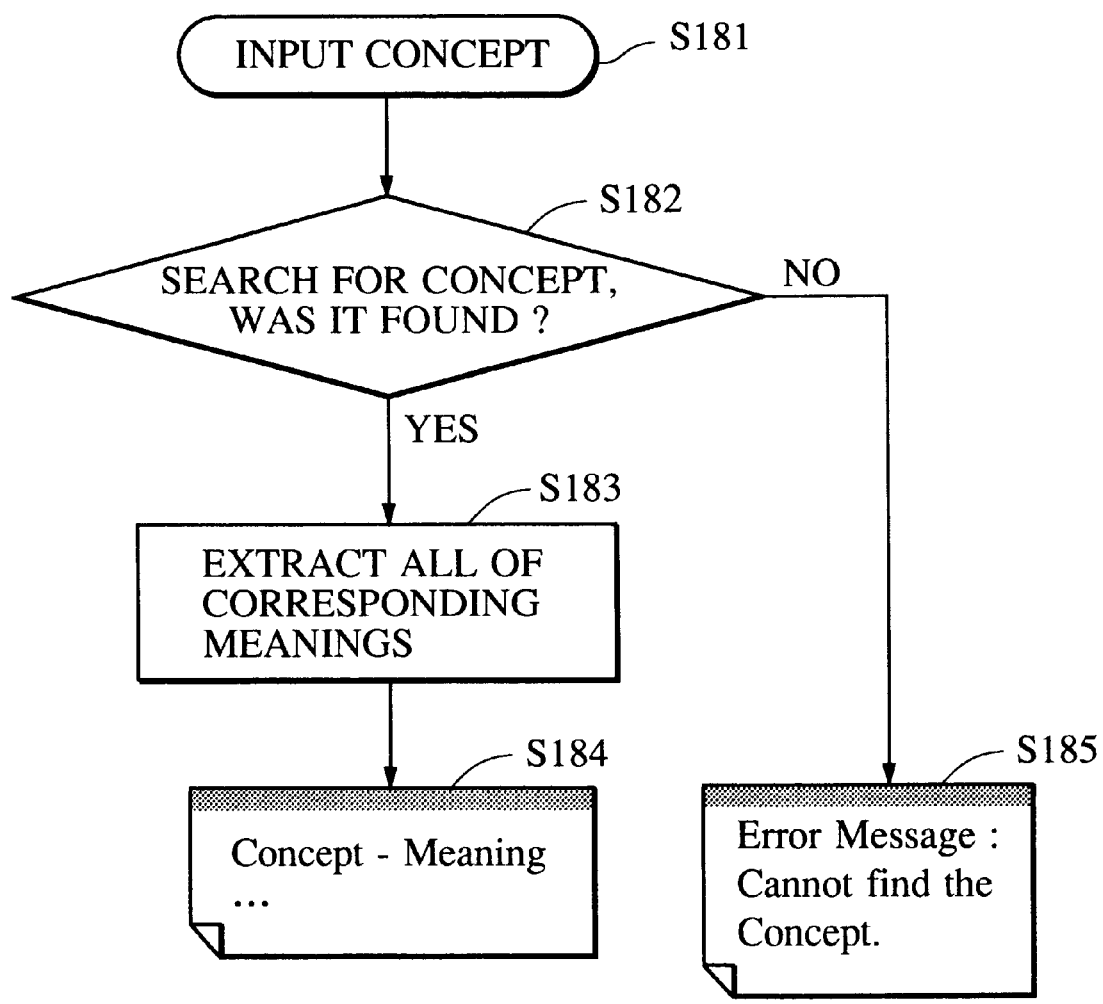
FIG. 67 is a flow chart of a process for searching for a meaning corresponding to a concept.

FIG. 67 is a flow chart of a process for searching for a meaning corresponding to a concept, In step S181 a concept is inputted to the system to set an output of a meaning. In step S182 the concept portion 534 of the dictionary 33 is searched for to search for the inputted concept. If the concept could be found, all meanings corresponding to the word tag in the concept portion 534 are extracted from,the meaning portion 535 in step S183. In step S184 the extracted meaning are outputted. If the concept could not be found in step S182, an error message is displayed in step S185.

Figure 68:
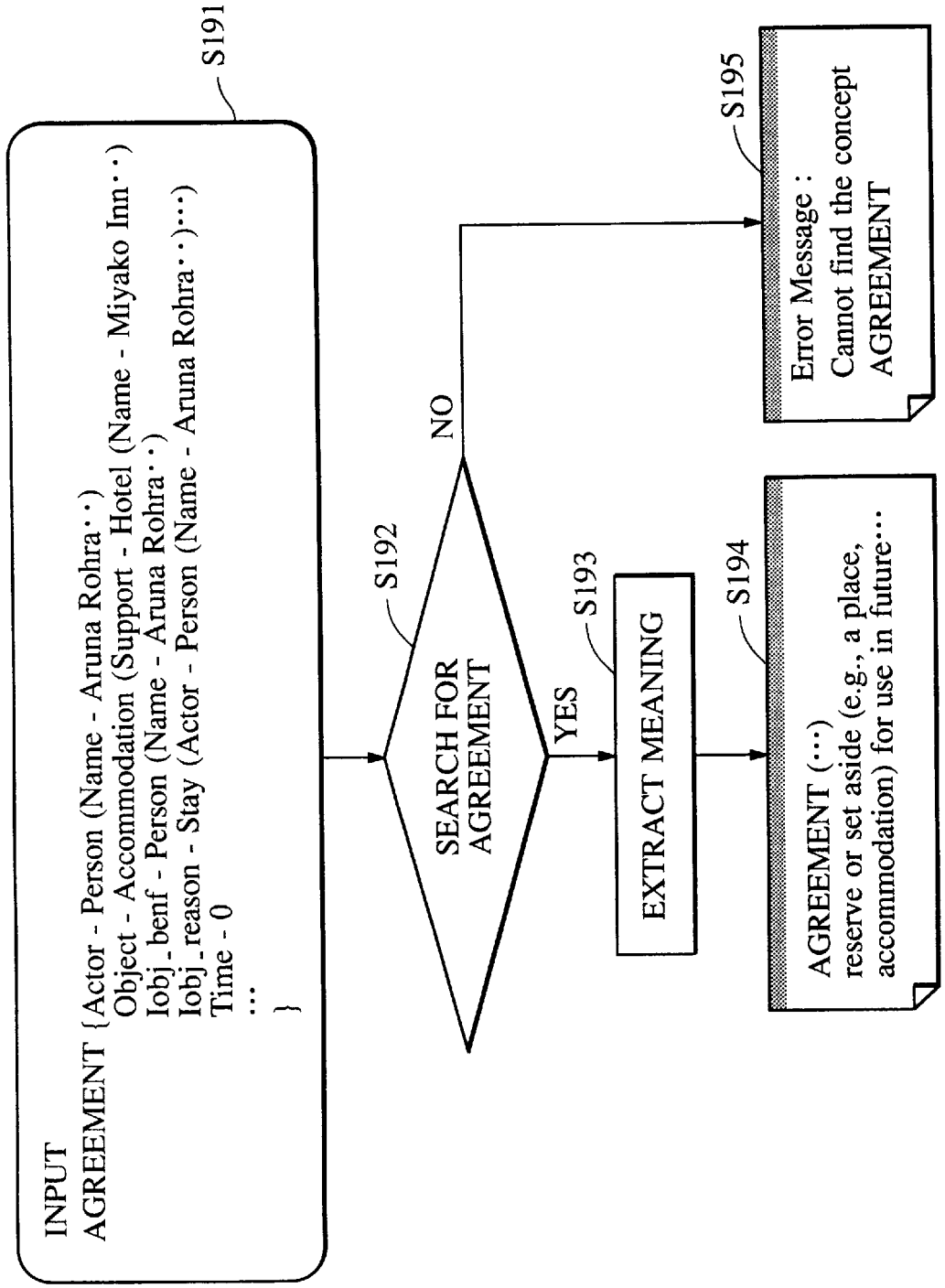
FIG. 68 is a flow chart of a process for searching for a meaning corresponding to the concept "AGREEMENT"

FIG. 68 is a flow chart of a process for searching for a meaning corresponding to the concept "AGREEMENT". In step S191 the concept "AGREEMENT" is inputted to the system to set an output of a meaning. In step S192 the concept portion 534 of the dictionary 33 is searched for to search for the inputted concept "AGREEMENT". Although a multiplicity of concepts "AGREEMENT" exist as shown in FIG. 58, two word tags book2 and reversel satisfy the conditions. Therefore, the meanings corresponding to the respective word tags are extracted from the meaning portion 535 shown in FIG. 59 in step S193. In step S194 the meanings are outputted. If the concept "AGREEMENT" could not be found in step S192, an error message is displayed in step S195.

Figure 69:
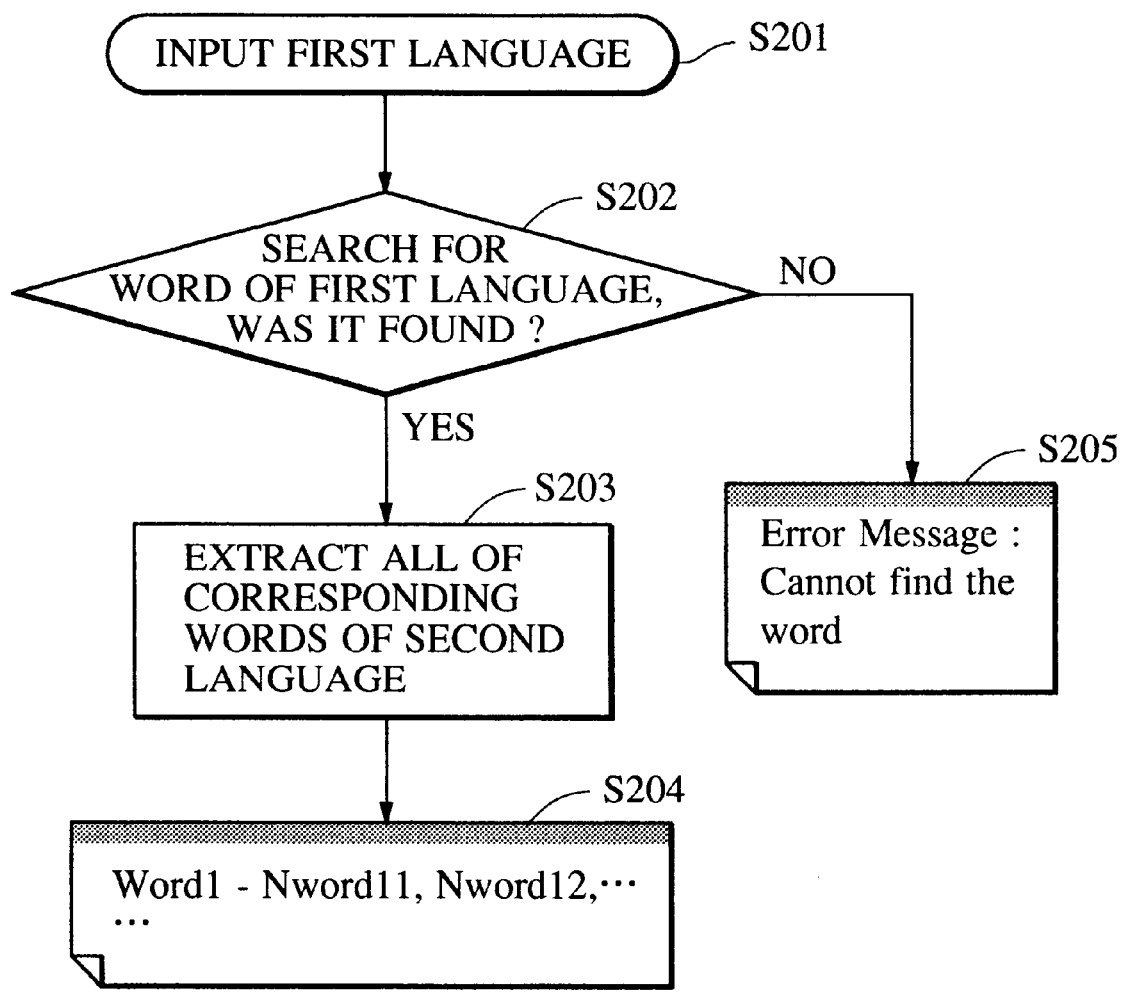
FIG. 69 is a flow chart of a process for searching for a word in a second language corresponding to a word in a first language.

FIG. 69 is a flow chart of a process for searching for a word in a second language with respect to a first language. In step S201 a word in a first language is inputted to the system to set an output of a word in a natural language of a second language. In step S202 the form portion of the dictionary of the first language is searched for to search for the inputted word. If the word could he found, all words corresponding to the word tag in the form portion are extracted from the form portion of the dictionary in the second language in step S203. In step S204 the extracted words are outputted. If the word could not be found in step S202, an error message is displayed in step S205.

Figure 70:
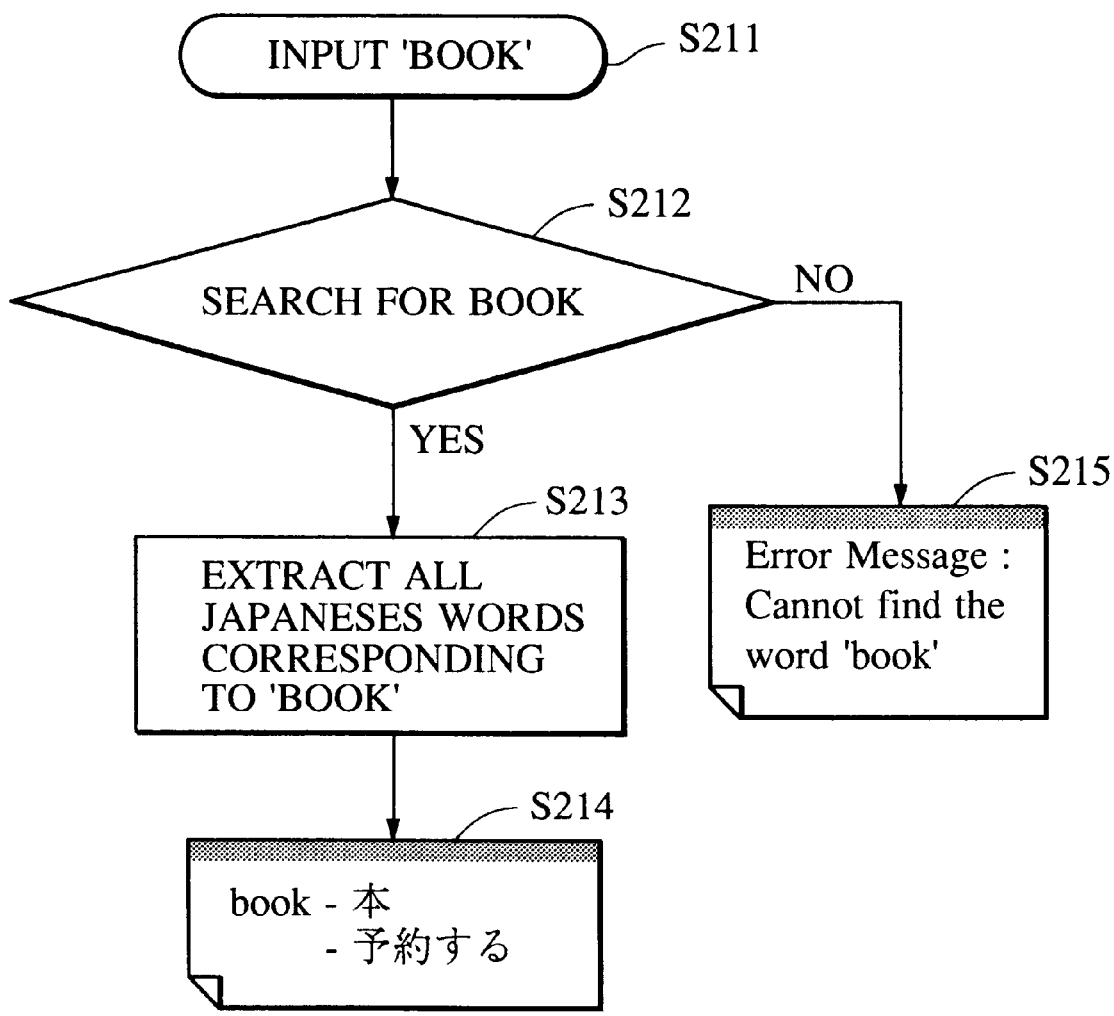
FIG. 70 is a flow chart of a process for searching for a Japanese word corresponding to an English word "book"

FIG. 70 is a flow chart of a process for searching for a Japanese word corresponding to the English word "book". In step S211 the English word "book" is inputted to the system to set an output of a word translated into Japanese. In step S212 the form portion of the English dictionary is searched for to search for the inputted word "book". Since the word "book" has two word tags book1 and book2 as shown in FIG. 55, Japanese words 本 and 予約する corresponding to the respective word tags, are extracted from the form portion 541 of the Japanese dictionary In step S214 the extracted words are outputted. If the word "book" could not be found in step S212, an error message is displayed in step S215.

Figure 71:
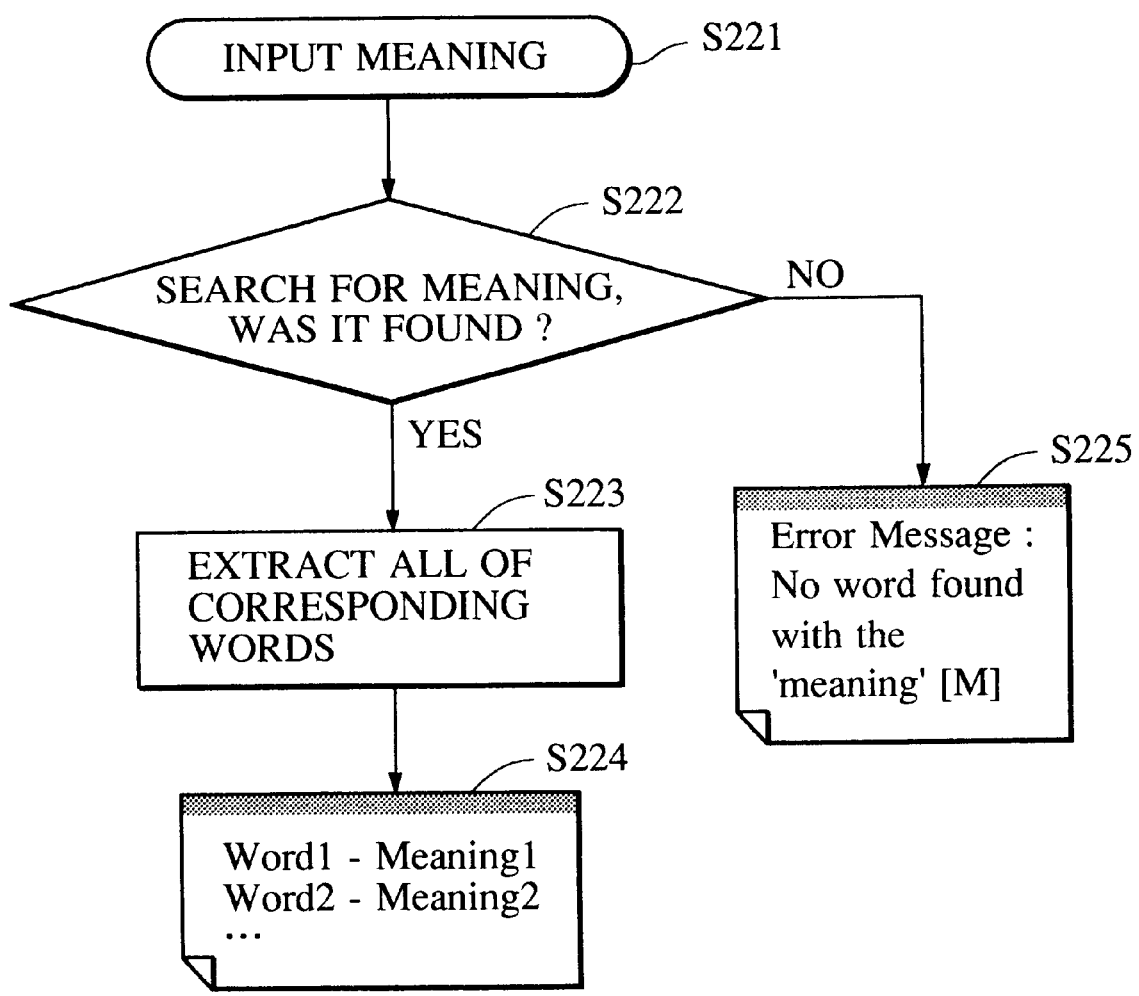
FIG. 71 is a flow chart of a process for searching for a word corresponding to a meaning.

FIG. 71 is a flow chart of a process for searching for a word corresponding to a meaning. In step S221 a meaning for describing a word is inputted to the system to set an output of a word in a natural language. In step S222 the meaning portion 535 of the dictionary 33 is searched for to search for the inputted meaning. If the meaning could be found, all words corresponding to the word tag in the meaning portion 535 are extracted from the form portion 531 in step S223. In step S224 the extracted words and their meanings are outputted. If the meaning could not be found in step S222, an error message is displayed in step S165.

Figure 72:
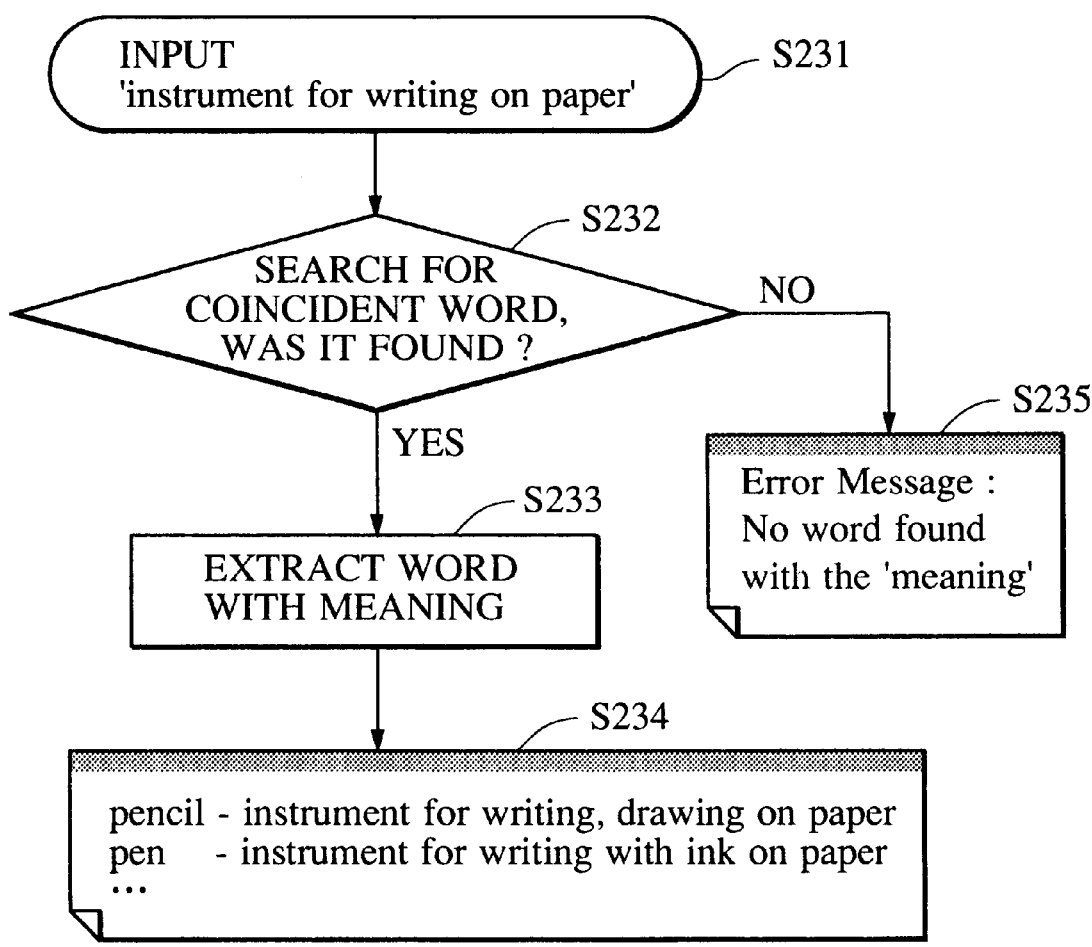
FIG. 72 is a flow chart of a process for searching for a word corresponding to meaning "instrument for writing on paper"

FIG. 72 is a flow chart of a process for searching for a word corresponding to meaning "instrument for writing on paper". In step S231 the meaning "instrument for writing on paper" is inputted to the system to set an output of a word. In step S232 the meaning portion 535 of the dictionary 33 is searched for to search for the inputted meaning "instrument for writing on paper". Since two word tags "pencil1" and "pen1" satisfy it as shown in FIG. 59, words corresponding to the respective word tags are extracted from the form portion 531 shown in FIG. 55 in step S233. In step S234 the extracted words and the meanings in the meaning portion are outputted. If the meaning "instrument for writing on paper" could not be found in step S232, an error message is displayed in step S235.

Figure 73:
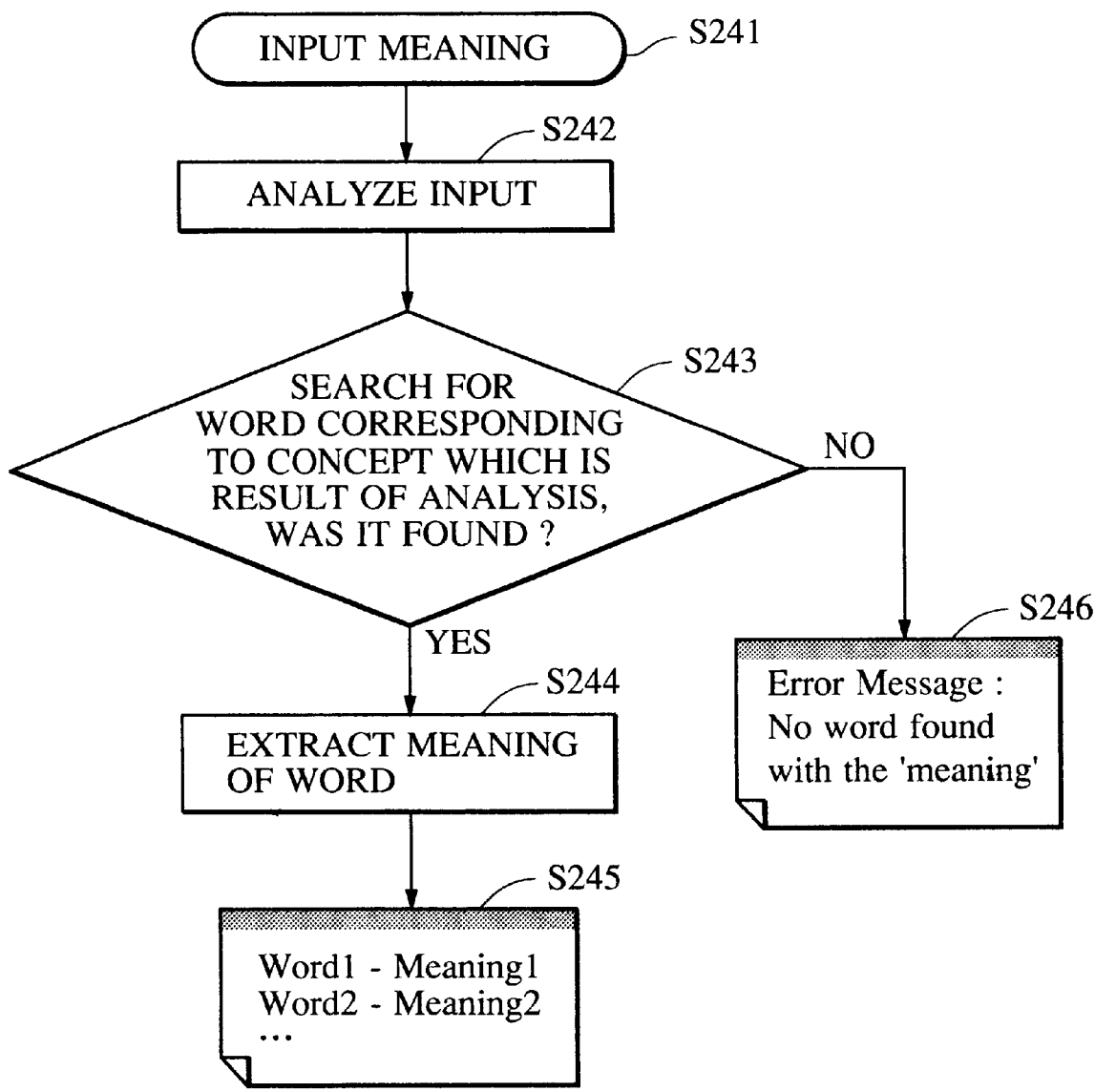
FIG. 73 is a flow chart of a process for searching for a word corresponding to a meaning.

FIG. 73 is a flow chart of a process for searching for a word corresponding to a meaning. This embodiment is different from the embodiments shown in FIGS. 71 and 72 in view of analyzing the inputted meaning In step S241 the meaning for describing a word is inputted to the system to set an output of a word in a natural language. In step S242 the inputted meaning is analyzed to acquire a corresponding concept. In step S243 the concept portion of the dictionary is searched for to search for the concept, which is a-result of the analysis. If the concept could be found, all words corresponding to the word tag in the concept portion are extracted from the form portion and all of corresponding meaning arc extracted from the meaning portion in step S244. In step S245 the extracted words and their meanings are outputted. If the concept could not be found in step S243, an error message is displayed in step 5246.

Figure 74:
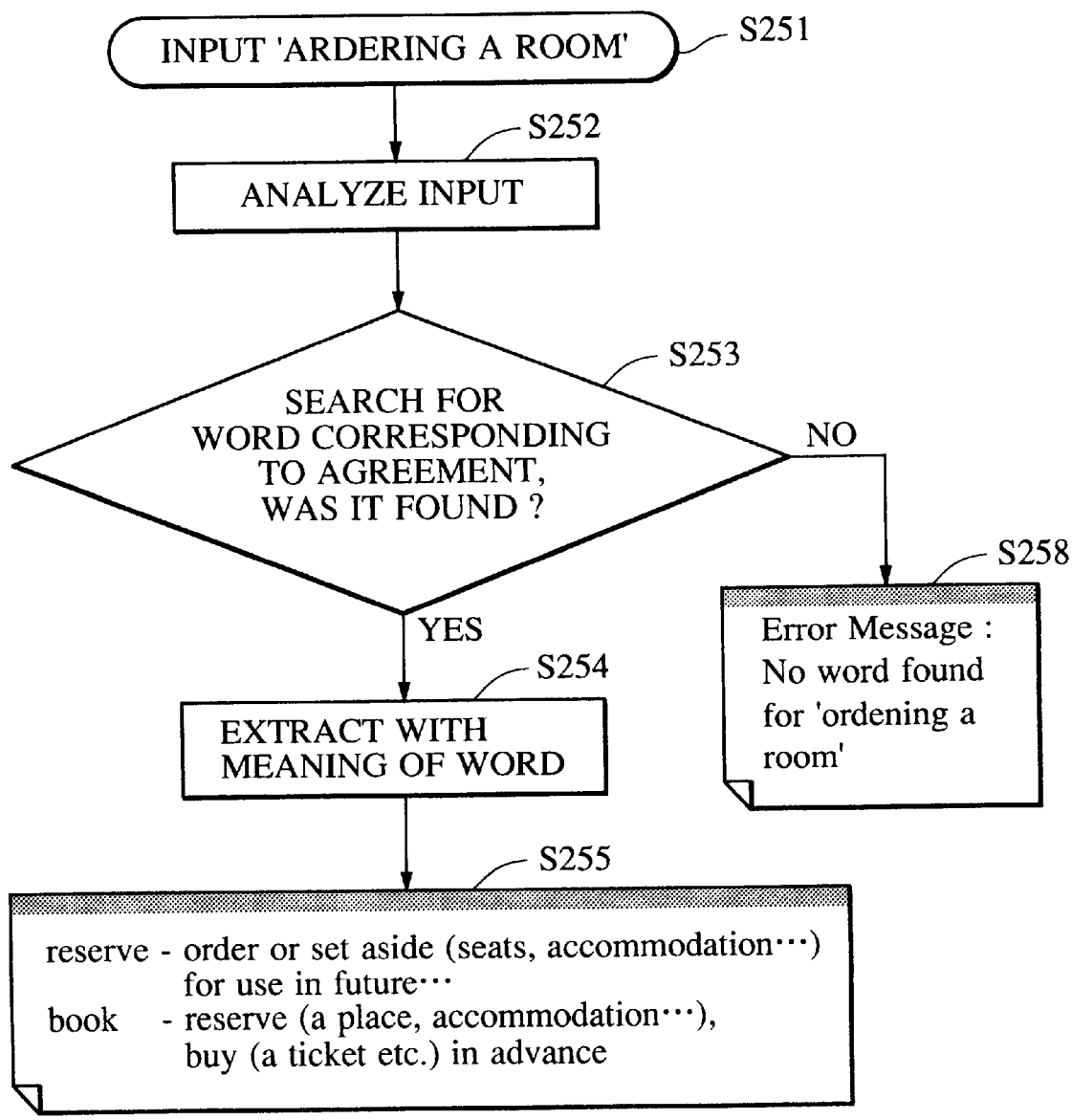
FIG. 74 is a flow chart of a process for searching for a word corresponding to meaning "ordering a room"

FIG. 74 is a flow chart of a process for searching for a word corresponding to meaning "ordering a room". In step S251 the meaning "ordering a room" is inputted to the system to set an output of a word. In step S252 the inputted meaning is analyzed to acquire corresponding concept "AGREEMENT". In step S253 the concept portion 534 of the dictionary 33 is searched for to search for the concept "AGREEMENT", which is a result of the analysis. Although a multiplicity of concepts "AGREEMENT" exist as shown in FIG. 58, two word tags "book2" and "reserve1" satisfy the conditions. Therefore, words corresponding to the word tag are extracted from the form portion and meanings corresponding to the word tag are extracted from the meaning portion 535 shown in FIG. 59 in step S254. In step S255, the words and their meanings are outputted. If the concept "AGREEMENT" could not be found in step S253, an error message is displayed in step S256.

As described above, according to the embodiments of the present invention, in accordance with a variety of language information items, for example, a word, a concept or one of meanings, a corresponding one can be searched for.

Moreover, one dictionary can be used in a variety of sub-systems and therefore a load of a portion for supplying the dictionary to the sub-system can be reduced. In a general system using a plurality of sub-systems of the foregoing type, information acquired in, for example, an analyzing portion, can be supplied to another sub-system so as to be used.

Examples of a process for completing information of an input by making a reference to the knowledge base 24 will now be described specifically.

EXAMPLE 1

Input: write to Boris at ABC corporation

FIG. 76 shows an input from the CA 21 to the pre-understander 23 in the foregoing case. The validity of the draft instance is confirmed as described above. Slot IObject-Beneficiary of MTRANS in C1, that is, the validation of C2 requires searching for the knowledge base 24 shown in FIG. 6. As a result of searching for the knowledge base 24, a unique instance is searched for in the data base shown in FIG. 75 so that the information is completed. FIG. 77 shows C2, which has been completed.

EXAMPLE 2

An input shown in FIG. 78 is performed to the system. The menu handler 22 generates a concept similar to that according to Example 1. Since the order of writing the name is different among countries, the system has, as knowledge, a model for correcting a user's error in the foregoing viewpoint. If first name, for example, "Boris" is input as the family name as shown in FIG. 78, the system corrects the foregoing error when it performs the process. The result of the process is similar to that resulted in Example 1.

EXAMPLE 3

Input: meet John Smith, Duke University

Figure 80:
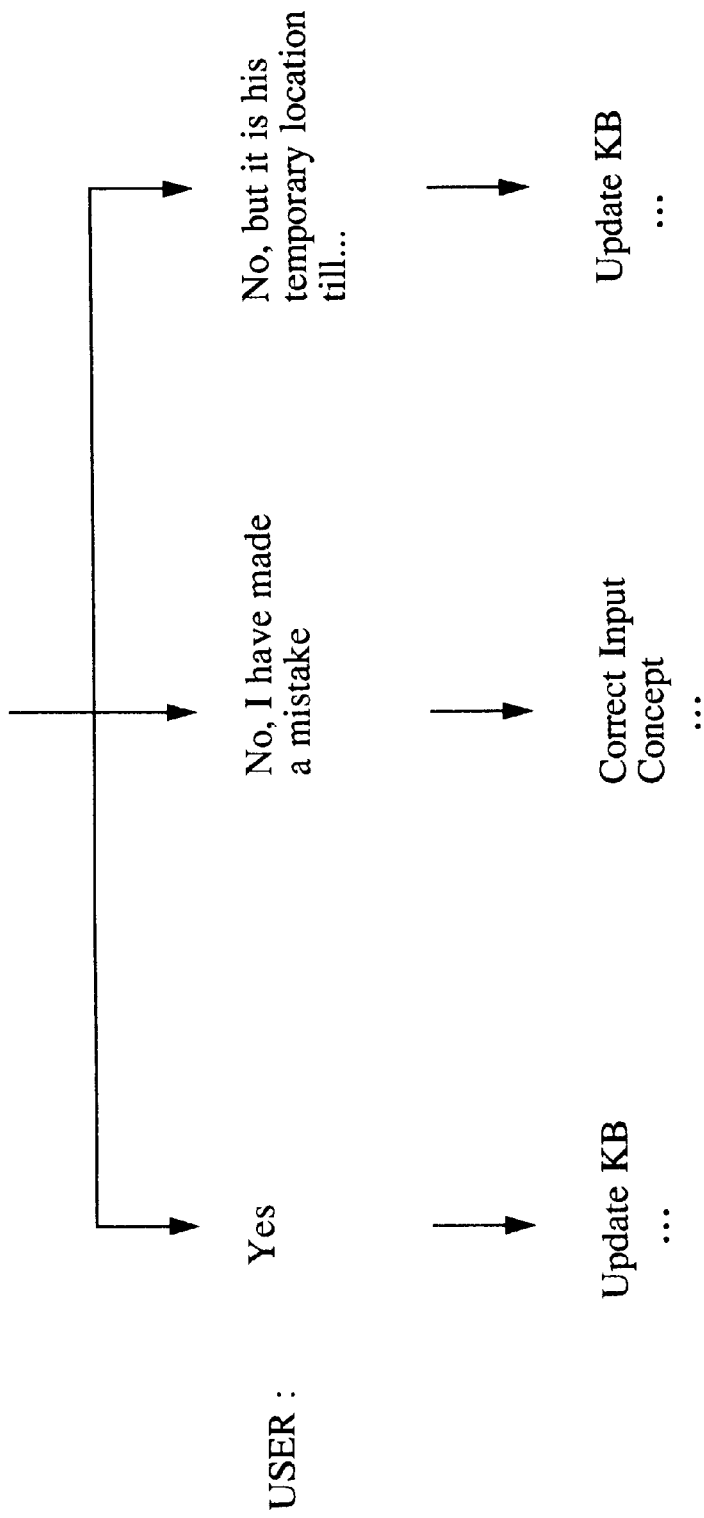
FIG. 80 shows an example of a dialogue process between the system and a user.

FIG. 79 shows a draft instance generated by the CA 21. Referring to FIG. 79, as for concept C4, that is, as for a person, the pre-understander 23 makes a reference to the knowledge base 24 shown in FIG. 75. Since a partial matching with data that John Smith is at Rochestter University is confirmed, a dialogue process between the system and the user as shown in FIG. 80 is started.

EXAMPLE 4

Input: meet you after 10th

FIG. 81 shows a draft instance generated by the CA 21. Referring to FIG. 81, as for concept C7, that is TIME, the pre-understander 23 completes the time in accordance with the rule to validate the same. If the date (present time), on which the system is operated, is Apr. 15, 1993, the pre-understander 23 infers that the inputted data is in the future and it is May 10, 1993. A final instance is shown in FIG. 82.

EXAMPLE 5

Input: meet you at Boris's office

FIG. 83 shows a draft instance generated by the CA 21. Referring to FIG. 83, as for concept C8 (MEET), the slot of Support is filled with the relationship that the meeting place is the Boris's office. Therefore, the pre-understander 23 acquires the actual instance of the Boris's office from the knowledge base. As a result, a final instance as shown in FIG. 84 is acquired.

EXAMPLE 6

Input: come Delhi

Even after an analysis has been performed by the CA 21, the concept of Delhi is not added to another concept but it is remained. Since Delhi can be a slot for Iofj-direc or From, the pre-understander 23 tries to resolve this in accordance with the context or the knowledge base 24. If the place in which the speaker lives at Delhi and the speaker makes a requirement to the receiptor, an inference is made that the speaker requests the receiptor to visit Delhi and completion is performed to achieve this. A confirmation to a user whether the inference is correct may be performed prior to performing the completion.

EXAMPLE 7 input: discuss after AAAI conference on NLP

FIG. 85 shows a draft instance generated by the CA 21. Referring to FIG. 85, whether the main theme of concept C11 (XTRANS) is NLP or AAAI conference, that is, whether the input is discuss on NLP or AAAI conference on NLP is fuzzy. The pre-understander 23 therefore accesses the knowledge base to search for the theme of the AAAI conference. If the searched theme is not NLP, the pre-understander 23 infers that the NLP is the main theme and corrects the instance of "conference".

As described above, according to the embodiments of the present invention, if input information indicating a concept is incomplete, the incomplete information can be detected and completed by the system.

According to the embodiments of the present invention, if input information indicating a concept is fuzzy, the fuzzy portion can be detected and resolved by the system.

If the foregoing functions according to the present invention can be performed, the present invention can be applied to a single apparatus, a system consisting of a plurality of apparatuses and a structure in which the process is performed by supplying a program to an apparatus or a system.

Although the invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. An information processing system comprising:
   input means for inputting information representing a concept;
   a knowledge base for storing knowledge including rules for completion of the concept;
   detection means which refers to conditions of the rules for completion in said knowledge base to detect an incomplete portion of the inputted information supplied from said input means;
   completing means for completing the incomplete portion detected by said detection means by referring to actions of the rules for completion in said knowledge base; and
   output means for outputting the inputted information, the incomplete portion of which having been completed by said completing means.

2. An information processing system according to claim 1, further comprising query means for making a query to a user about the incomplete portion in a case where the incomplete portion cannot be completed by said completing means.

3. An information processing system according to claim 1, wherein said input means comprises natural language input means for inputting information in a natural language and analyzing means, which analyzes the natural language information inputted by said natural language input means, to output information indicating a concept.

4. An information processing system according to claim 1, wherein said input means comprises item input means for inputting, for an item, information indicating a concept of a type corresponding to a type of information of the item.

5. An information processing system according to claim 1, further comprising:
   second detection means for referring to said knowledge base to detect an ambiguous portion of the inputted information supplied from said input means; and
   resolving means for resolving the ambiguous portion detected by said second detection means by referring to said knowledge base.

6. An information processing method comprising the steps of:
   inputting information representing a concept;
   a knowledge based for storing knowledge including rules for completion of concept;
   detecting an incomplete portion of the information inputted in said inputting step by referring to conditions of rules for completion of concept stored in a knowledge base;
   completing the incomplete portion detected in said detecting step by referring to actions of the rules for completion in said knowledge base; and outputting the inputted information, the incomplete portion of which having been completed in said completing step.

7. An information processing method according to claim 6, further comprising the step of making a query to a user about the incomplete portion in a case where the incomplete portion cannot be completed in said completing step.

8. An information processing method according to claim 6, wherein said inputting step comprises a natural language input step for inputting information in a natural language and an analyzing step for analyzing the natural language information inputted in said natural language input step to output information indicating a concept.

9. An information processing method according to claim 6, wherein said input step comprises an item input step for inputting, for an item, information indicating a concept of a type corresponding to a type of information of the item.

10. An information processing method according to claim 6, further comprising the steps of:

searching an ambiguous portion of the information inputted in said inputting step by referring to said knowledge base; and resolving the ambiguous portion detected in said searching step by referring to said knowledge base; and outputting the inputted information, the fuzzy portion of which has been resolved in said resolving step.

11. An information processing system comprising:

concept input means for inputting information representing a word, a concept associated with a word, and a meaning of a word;

a concept knowledge base storing knowledge of concepts associated with words and expressed by words and conditions for use;

a meaning knowledge base storing knowledge of the meanings of the words;

a grammar knowledge base storing knowledge of relationships among words in a case where the words are used in a sentence;

instruction means for instructing the searching of the concept knowledge data base and/or the meaning knowledge data base when a word is input by said input means, and for instructing the searching of the meaning knowledge data base and/or the grammar knowledge data base when a concept is input by said input means, and for instructing the searching of the grammar knowledge data base and/or the concept knowledge data base when a meaning is input by said input means;

searching means for searching the concept knowledge data base and/or the meaning knowledge data base when a word is input by said input means, for searching the meaning knowledge data base and/or the grammar knowledge data base when a concept in input by said input means, and for searching the grammar knowledge data base and/or the concept knowledge data base when a meaning is input by said input means all in accordance with the instructing of said instruction means; and output means for outputting a result of search performed by said searching means.

12. An information processing system comprising:

a knowledge base for storing values of predetermined and plural attributes of objects and categories of the objects, wherein each object has associated therewith a plurality of attribute slots, wherein each attribute slot defines a different attribute of the object and includes a value of the attribute, wherein the attribute slots can also include a pointer identifying an attribute of another object providing further information about the attribute of the attribute slot including the pointer;

instruction means for instructing the reading of an attribute slot and its associated value;

reading means for reading the one attribute slot and its associated value as instructed by said instruction means, from said knowledge base; and control means for controlling said reading means to read the attribute of the another object pointed by a pointer in said knowledge base in response to said reading means reading the pointer.

13. An information processing system according to claim 12, wherein each object is associated with at least one concept, wherein predetermined and plural attributes are provided in attribute slots of each object for each concept to which each object belongs.

14. An information processing system comprising:

a knowledge base for storing values of predetermined and plural attributes of objects and categories of the objects, wherein each object has associated therewith a plurality of attribute slots, wherein each attribute slot defines a different attribute of the object and includes data further specifying the attribute, wherein at least one attribute is shared by a plurality of objects, wherein the data of the plurality of objects further specifying the at least one shared attribute is arranged and stored hierarchically in said knowledge base;

instruction means for instructing the reading of the at least one shared attribute of two objects of the plurality of objects;

reading means for reading an attribute slot of two objects which comprises the at least one shared attribute as instructed by said instruction means from said knowledge base; and determining means for reading the hierarchically arranged data further specifying the at least one shared attribute to determine a common portion of the hierarchically arranged data shared by the read attribute slots of the two objects.

15. An information processing system according to claim 14, wherein said determining means determines data further specifying the shared attribute common to and higher in the hierarchy of the hierarchically arranged data than the data further specifying the attribute of the two read objects.

16. An information processing system according to claim 14, wherein each object is associated with at least one concept, wherein predetermined and plural attributes are provided in attribute slots of each object for each concept to which each object belongs.

17. An information processing system according to claim 14, wherein one of said predetermined and plural attributes includes identifying information of an object higher or lower than the object.

* * * * *

UNITED STATES PATENT AND TRADEMARK OFFICE
CERTIFICATE OF CORRECTION

PATENT NO. : 5,957,520

DATED : September 28, 1999

INVENTOR(S) : ARUNA ROHRA SUDA, ET AL.

It is certified that error appears in the above-identified patent and that said Letters Patent is hereby corrected as shown below:

ON THE COVER PAGE:

After Section [73]

Please insert the following text:

--[*] CPA: This patent issued on a continued prosecution application filed under 37 C.F.R. § 1.53(d), and is subject to the twenty year patent term provisions of 35 U.S.C. § 154(a)(2).--

In the Abstract At Section [57]:

Line 9, "upper" should read --higher--.

SHEET 6 OF THE DRAWINGS, IN FIGURE 5:

At step S507, "INFERED?" should read --INFERRED?--.

SHEET 8 OF THE DRAWINGS, IN FIGURE 7:

"PARTIAL" should read --PARTIALLY--.

SHEET 9 OF THE DRAWINGS, IN FIGURE 8:

In step S803, "FULL-FILLED" should read --FULFILLED--.

UNITED STATES PATENT AND TRADEMARK OFFICE
CERTIFICATE OF CORRECTION

PATENT NO. : 5,957,520

DATED : September 28, 1999

INVENTOR(S) : ARUNA ROHRA SUDA, ET AL.

It is certified that error appears in the above-identified patent and that said Letters Patent is hereby corrected as shown below:

SHEET 10 OF THE DRAWINGS, IN FIGURE 9:

Line 11, "lesser"" should read --less"--.
Line 17, "Buslness" should read --Business--.
Line 18, "it not" should read --it is not--, and "Natlonal" should read --National--.
Line 26, "langauge" should read --language--, and "mistake" should read --mistakes--.

SHEET 12 OF THE DRAWINGS, IN FIGURE 11:

"consummable" should read --consumable--.

SHEET 15 OF THE DRAWINGS:

In Fig. 14A,
    At slot S10, "Hobbles /" should read --Hobbies /--, and
    At slot S12, "<Childern" should read "<Children--.
In Fig. 14B, at slot S5, "Hiranuma2-4-7)" should read
    --Hiranuma 2-4-7)--.

SHEET 17 OF THE DRAWINGS, IN FIGURE 16:

At slot S5, "consummable" should read --consumable--.

UNITED STATES PATENT AND TRADEMARK OFFICE
CERTIFICATE OF CORRECTION

PATENT NO. : 5,957,520

DATED : September 28, 1999

INVENTOR(S) : ARUNA ROHRA SUDA, ET AL.

It is certified that error appears in the above-identified patent and that said Letters Patent is hereby corrected as shown below:

SHEET 20 OF THE DRAWINGS, IN FIGURE 19A:

At slot S5, "<Journale>" should read --<Journals>--.

SHEET 27 OF THE DRAWINGS, IN FIGURE 26:

"Domonstration," should read --Demonstration,--.

SHEET 36 OF THE DRAWINGS, IN FIGURE 35:

Line 1, "reservo," should read --reserve,--.
Line 17,"wonder" should read --wonder,--.
Line 18 "learm," should read --learn,--.

SHEET 43 OF THE DRAWINGS, IN FIGURE 42:

At row "Int. Mech." and column "Action", "graep)" should read --grasp)--.

SHEET 44 OF THE DRAWINGS, IN FIGURE 43:

In row "ACONFIG", "perfer," should --prefer--.
In row "MSTATE", "forsee," should read --foresee,--, and "intereset," should read -- interest,--.
In row "PCONFIG", "tobe," should read --to be,--.

UNITED STATES PATENT AND TRADEMARK OFFICE
CERTIFICATE OF CORRECTION

PATENT NO.    :   5,957,520

DATED         :   September 28, 1999

INVENTOR(S) :   ARUNA ROHRA SUDA, ET AL.

It is certified that error appears in the above-identified patent and that said Letters Patent is hereby corrected as shown below:

SHEET 52 OF THE DRAWINGS, IN FIGURE 50B:

In section "(a)", "45min" should read --45 min.--, and "fight..." should read --flight...--.
In section "(b)", "It" should read --It is--.
In section "(e)", "Ciry" should read --City--.

SHEET 53 OF THE DRAWINGS, IN FIGURE 51:

In step S511, "Compiter Design" should read --Computer Design--, and "Compiter Science" should read --Computer Science--.
In step S514, "Compiter Science" should read --Computer Science--.

SHEET 54 OF THE DRAWINGS, IN FIGURE 52:

At "P011: Country", "japan" should read --Japan--.

SHEET 63 OF THE DRAWINGS, IN FIGURE 60:

At slot S1, "s Name" should read --a Name--.

SHEET 73 OF THE DRAWINGS, IN FIGURE 70:

In step 213, "JAPANESES" should read --JAPANESE--.

SHEET 77 OF THE DRAWINGS, IN FIGURE 74:

In step S251, "'ARDERING" should read --'ORDERING--.
In step S258, "'ordening" should read --'ordering--.

UNITED STATES PATENT AND TRADEMARK OFFICE
CERTIFICATE OF CORRECTION

PATENT NO.  : 5,957,520

DATED       : September 28, 1999

INVENTOR(S) : ARUNA ROHRA SUDA, ET AL.

It is certified that error appears in the above-identified patent and that said Letters Patent is hereby corrected as shown below:

COLUMN 1:

Line 10, "resolving" should read --resolve--.
Line 23, "that" should read --for--.

COLUMN 4:

Line 29, "country" should read --Country--.

COLUMN 5:

Line 5, "upper" should read --higher--.
Line 8, "upper" should read --higher--.
Line 13, "upper" should read --higher--.
Line 27, "conjugations" should read --conjugation--.

COLUMN 7:

Line 64, "completer" should read --completor--.

COLUMN 9:

Line 3, "organism" should read --organisms--.
Line 26, "cash)," should read --cash)),--.
Line 56, "person remains the name slot" should read --person's name is in the name slot--.

COLUMN 10:

Line 6, "obj(design," should read --Obj(design,--.

UNITED STATES PATENT AND TRADEMARK OFFICE
CERTIFICATE OF CORRECTION

PATENT NO. : 5,957,520

DATED : September 28, 1999

INVENTOR(S) : ARUNA ROHRA SUDA, ET AL.

It is certified that error appears in the above-identified patent and that said Letters Patent is hereby corrected as shown below:

COLUMN 11:

Line 4, "an animated for performing a plan" should read --a person to form a plan and--.
Line 12, "MOPS" should read --MOP--.
Line 13, "to resolving" should read --for resolving--.
Line 55, "there" should read --these--.

COLUMN 12:

Line 59, "is acquired" should read --to be acquired--.

COLUMN 13:

Line 64, "534 In" should read --534. In--.

COLUMN 15:

Line 51, "output If" should read --output. If--.

COLUMN 16:

Line 15, "531 In" should read --531. In--.
Line 19, "could not" should read --could--.
Line 66, "from.the" should read --from the--.

COLUMN 17:

Line 38, "dictionary In" should read --dictionary. In--.

UNITED STATES PATENT AND TRADEMARK OFFICE
CERTIFICATE OF CORRECTION

PATENT NO. : 5,957,520

DATED : September 28, 1999

INVENTOR(S) : ARUNA ROHRA SUDA, ET AL.

It is certified that error appears in the above-identified patent and that said Letters Patent is hereby corrected as shown below:

COLUMN 18:

Line 4, "meaning In" should read --meaning. In--.
Line 9, "a-result" should read --a result--.
Line 13, "arc" should read --are--.

COLUMN 19:

Line 13, "Rochestter" should read --Rochester--.
Line 33, "the Boris's" should read --at Boris's--.
Line 34, "of the" should read --of--.
Line 45, "lives at" should read --lives is at--.
Line 54, "input:" should read --Input:--.
Line 58, "discuss" should read --discussed--.

COLUMN 21:

Line 57, "in input" should read --is input--.

Signed and Sealed this

Twenty-ninth Day of August, 2000

Attest:

Q. TODD DICKINSON

*Attesting Officer*      *Director of Patents and Trademarks*